(12) United States Patent
Kaufman et al.

(10) Patent No.: US 10,025,801 B2
(45) Date of Patent: Jul. 17, 2018

(54) SYSTEMS AND METHODS FOR AUTOMATICALLY GENERATING USER INTERFACE ELEMENTS FOR COMPLEX DATABASES

(71) Applicant: Michael Philip Kaufman, New York, NY (US)

(72) Inventors: Michael Philip Kaufman, New York, NY (US); Micah Philip Silverman, Huntington Station, NY (US)

(73) Assignee: Michael Philip Kaufman, New York, NY (US)

( * ) Notice: Subject to any disclaimer, the term of this patent is extended or adjusted under 35 U.S.C. 154(b) by 110 days.

(21) Appl. No.: 14/324,414

(22) Filed: Jul. 7, 2014

(65) Prior Publication Data

US 2015/0019593 A1 Jan. 15, 2015

Related U.S. Application Data

(60) Continuation of application No. 13/385,913, filed on Mar. 14, 2012, now Pat. No. 8,775,478, which is a
(Continued)

(51) Int. Cl.
*G06F 17/30* (2006.01)
*G06F 7/00* (2006.01)
(Continued)

(52) U.S. Cl.
CPC ...... *G06F 17/30289* (2013.01); *G06F 3/0481* (2013.01); *G06F 3/0484* (2013.01);
(Continued)

(58) Field of Classification Search
CPC ......... G06F 17/30286; G06F 17/30864; G06F 17/30289
(Continued)

(56) References Cited

U.S. PATENT DOCUMENTS 4,961,139 A 10/1990 Hong et al.
5,006,978 A 4/1991 Neches
(Continued)

FOREIGN PATENT DOCUMENTS

EP 0795151 B1 2/2002
WO 96/17286 A2 6/1996
(Continued)

OTHER PUBLICATIONS

Astrahan et al. "System R: Relational Approach to Database Management" ACM Transactions on Database Systems, vol. 1, No. 2, Jun. 1976, pp. 97-137.
(Continued)

*Primary Examiner* — Shahid Alam
(74) *Attorney, Agent, or Firm* — Van Court & Aldridge LLP

(57) ABSTRACT

In one embodiment, a software system automatically generates a fully functional user interface (UI) based upon any underlying schema within a relational database management system (RDBMS). The UI derives from an automated interrogation of the schema, and comprises all mode displays (e.g., browse, search, edit, add) for all tables, along with integrated mechanisms for representing, navigating and managing relationships across tables. It utilizes a hierarchical "context stack" for suspending the working state of a particular table while "drilling down" to work with related-table information and (potentially) return relevant changes to the base table. The UI presentation resolves cross-table relationships so as to supplant internal key fields from the primary table with corresponding descriptive fields derived from the related tables. Techniques are also provided to enhance and extend the internal representation of table structures, constraints, relationships and special require-
(Continued)

ments ("business rules") for improved discovery of the schema structure via automated interrogation.

22 Claims, 35 Drawing Sheets

Related U.S. Application Data continuation of application No. 12/930,849, filed on Jan. 19, 2011, now Pat. No. 8,161,081, which is a division of application No. 11/925,236, filed on Oct. 26, 2007, now Pat. No. 7,885,981, which is a continuation of application No. 10/428,209, filed on Apr. 30, 2003, now Pat. No. 7,318,066, which is a continuation of application No. PCT/US01/42867, filed on Oct. 31, 2001, and a continuation of application No. 09/703,267, filed on Oct. 31, 2000, now abandoned.

(60) Provisional application No. 60/276,385, filed on Mar. 16, 2001.

(51) Int. Cl.
  *G06F 3/0481* (2013.01)
  *G06F 3/0484* (2013.01)

(52) U.S. Cl.
  CPC .......... *G06F 7/00* (2013.01); *G06F 17/30286* (2013.01); *G06F 17/30864* (2013.01); *Y10S 707/912* (2013.01)

(58) Field of Classification Search
  USPC ........................................................ 707/802
  See application file for complete search history.

(56) References Cited

U.S. PATENT DOCUMENTS

| | | | |
|---|---|---|---|
| 5,353,401 A | 10/1994 | Iizawa et al. | |
| 5,355,474 A | 10/1994 | Thuraisngham et al. | |
| 5,414,834 A | 5/1995 | Alexander et al. | |
| 5,418,957 A | 5/1995 | Narayan | |
| 5,495,567 A | 2/1996 | Iizawa et al. | |
| 5,499,371 A | 3/1996 | Henninger et al. | |
| 5,550,971 A | 8/1996 | Brunner et al. | |
| 5,553,218 A | 9/1996 | Li et al. | |
| 5,615,367 A | 3/1997 | Bennett | |
| 5,627,979 A | 5/1997 | Chang et al. | |
| 5,657,460 A | 8/1997 | Egan et al. | |
| 5,684,964 A | 11/1997 | Powers et al. | |
| 5,742,813 A | 4/1998 | Kavanagh et al. | |
| 5,778,356 A | 7/1998 | Heiny | |
| 5,778,375 A * | 7/1998 | Hecht ............... | G06F 17/30595 707/802 |
| 5,787,416 A | 7/1998 | Tabb | |
| 5,799,310 A | 8/1998 | Anderson et al. | |
| 5,802,514 A | 9/1998 | Huber | |
| 5,812,134 A | 9/1998 | Pooser et al. | |
| 5,835,910 A | 11/1998 | Kavanagh et al. | |
| 5,838,965 A | 11/1998 | Kavanagh et al. | |
| 5,873,093 A | 2/1999 | Williamson et al. | |
| 5,940,819 A | 8/1999 | Beavin et al. | |
| 5,950,190 A | 9/1999 | Yeager et al. | |
| 5,970,490 A | 10/1999 | Morgenstern | |
| 6,016,394 A | 1/2000 | Walker | |
| 6,026,388 A | 2/2000 | Liddy et al. | |
| 6,035,300 A | 3/2000 | Cason et al. | |
| 6,052,681 A | 4/2000 | Harvey | |
| 6,061,515 A | 5/2000 | Chang et al. | |
| 6,105,027 A | 8/2000 | Schneider et al. | |
| 6,154,750 A | 11/2000 | Roberge | |
| 6,199,068 B1 | 3/2001 | Carpenter | |
| 6,275,824 B1 | 8/2001 | O'Flaherty et al. | |
| 6,279,008 B1 | 8/2001 | Ng et al. | |
| 6,292,827 B1 | 9/2001 | Raz | |
| 6,446,062 B1 | 9/2002 | Levine et al. | |
| 6,487,552 B1 | 11/2002 | Lei et al. | |
| 6,502,092 B1 | 12/2002 | Ensor | |
| 6,513,047 B1 | 1/2003 | Talley | |
| 6,539,369 B2 | 3/2003 | Brown | |
| 6,591,272 B1 | 7/2003 | Williams | |
| 6,609,122 B1 | 8/2003 | Ensor | |
| 6,738,077 B1 | 5/2004 | Wendker et al. | |
| 6,993,533 B1 | 1/2006 | Barnes | |
| 7,062,502 B1 | 6/2006 | Kesler | |
| 7,401,094 B1 | 7/2008 | Kesler | |
| 2001/0034733 A1 | 10/2001 | Prompt et al. | |
| 2001/0037331 A1 | 11/2001 | Lloyd | |
| 2002/0169767 A1 | 11/2002 | Harvey | |
| 2004/0024776 A1 | 2/2004 | Moore et al. | |
| 2004/0193652 A1 | 9/2004 | Wendker et al. | |

FOREIGN PATENT DOCUMENTS

| | | |
|---|---|---|
| WO | 97/02673 | 1/1997 |
| WO | 97/31451 | 8/1997 |

OTHER PUBLICATIONS

Atkins et al., "Oracle Designer Generation", 1999, 1210 pages.
Atkins, "Advanced Forms Generation Techniques—Approaching 100% Generation", 2000, 10 pages.
Atkins, "I'm Off to See the Wizard: Generating a 'Wizard' Interface From Designer2000", 2000, 7 pages.
Atkins, "Oracle Designer Webserver Generator Tips and Tricks" ECO '99, 1999, 13 pages.
Atkins, "Overview of the Oracle Designer System Generation Process", 1999, 8 pages.
Balter, "Mastering Microsoft Access 2000 Development", Jul. 1999, 1395 pages.
Codd, "A Relational Model of Data for Large Shared Data Banks." Communications of the ACM, vol. 13, No. 6, Jun. 1970, pp. 377-387.
Cox et al., "Quick Course in Microsoft Access 2000", 1999, 3 pages.
Eddy et al., "SAMS Teach Yourself Microsoft Access 2000 in 24 Hours", May 1999, 434 pages.
G.B. Shelly, Introduction to dBASE III Plus, Internet Reference. pp. 10-12, http://www.wlu.ca/about.wwwccs/software/database/dbaselll.shtml (accessed Dec. 27, 2001).
Grebnev, PHPGem, PHPGenerator Modified v 2.3, Internet Reference, http://phpgem.ru.net:8101/index.php3 (accessed Oct. 31, 2000).
Habraken, "The Complete Idiot's Guide to Microsoft Access 2000", May 1999, 415 pages.
Harder et al., "Supporting Adaptable Technical Information Systems in Heterogenous Environments—Using WWW and ORDBMS," IEEE Computer Society, Sep. 1, 1997, pp. 295-303, Los Alamitos, CA, US.
Hardie, C. "DB.sub.—Browser," http://www.summersault.com/software/db.sub—browser/,website printout Feb. 9, 2004.
International Business Machines, DB2 Table Editor, v 4.3, Internet Reference, http://www-3.ibm.com/software/data/db2imstools/html/tabledit.html (accessed Mar. 21, 2002).
Janssen et al., "Generating User Interfaces from Data Models and Dialogue Net Specifications," INTERCHI '93, Apr. 1993, 6 pages.
Koletze et al., "Oracle Designer Handbook", 1999, 3 pages.
Lulushi, "Oracle Developer/2000 Forms: The Practitioner's Guide", 1999, 3 pages.
Microsoft Access 1.0 User's Guide 187, 214 (1992), 5 pages.
Microsoft Corporation, Microsoft Access versions 1.0 through 2007 ("Microsoft Access"), v1.0 (1992), v2.0 (1993), v95 (1995), v1997 (1997), v2000 (Jun. 1999), v2002 (May 31, 2001), v2003 (Nov. 27, 2003), v2007 (Jan. 27, 2007), 4 pages.
Oracle Corporation, "Oracle Designer 6i New Features", Oct. 2000, 12 pages.
Oracle Corporation, Oracle Designer v2, v6, v9 and v10 ("Oracle Designer"), v2 (a.k.A. "2000" and "2K") (1996), v6 (before Jun. 1999), v9 (2001), and v10 (2005), 218 pages.

(56) References Cited

OTHER PUBLICATIONS

Papiani et al., "Automatically Generating World-Wide Web Interfaces to Relational Databases", Nov. 29, 1996, 15 pages.
Petit et al. "Towards the Reverse Engineering of Denormalized Relational Databases." IEEE, 1996, pp. 218-227.
Summersault, "Search on Subscriber (Current)," http://www.lifetimetv.com/cgi/internal/search.cgi?db=Subscriber, website printout Feb. 9, 2004.
The Authoritative Dictionary of IEEE Standards Terms, pp. 268 and 951 (7th ed. 2000).
Zamyatin et al., "Difficulties and Advantages of Access to Corporative Information in Internet," Science and Technology, Proceedings of the 4th Korea-Russia International Symposium, 2000, pp. 112-117, vol. 2.
"UML Misses the Boat", David Hay, Mar. 7, 1999; 7 pages.
"Using Dynamic SQL in Oracle Forms", Thomas Corbley, Mar. 7, 1999; 7 pages.
"Using JDBC with Oracle", Andrew J. Debkowski, Mar. 7, 1999; 11 pages.
"Using Oracle Designer for Database Administration", Leslie M. Tierstein, Mar. 7, 1999; 14 pages.
"Using Oracle Designer to Create Transactional Web Applications", Abinash Tripathy, Mar. 7, 1999; 17 pages.
"Using PL/SQL8 to Eliminate Database Pipes", Bulusu Lakshman, Mar. 7, 1999; 8 pages.
"Using Set Operators to Speed up Complex Queries", James Lopatosky, Mar. 7, 1999; 8 pages.
"Web-enabling Oracle Developer Applications", Bonnie Vermillion, Mar. 7, 1999; 10 pages.
Access 2003 All-in-One Desk Reference for Dummies, Alan Simpson et al. (2003); 844 pages.
Access 97 Bible, Cary Prague et al. (1997); 1172 pages.
Mastering Microsoft Access 2000 Development, Alison Batter (Jul. 1999); 1395 pages.
Oracle Designer Generation, Kenneth Atkins et al. (1999); 1228 pages.
"24 x 7: Contingency in the Real World", James Viscusi & Rachel Carmichael, Mar. 7, 1999; 6 pages.
"A Remarkable Little Library for Forms 5", Chester Young, Mar. 7, 1999; 10 pages.
"Are We There Yet? Automated Data Acquisition for Data Warehouses", Jeffrey Bertman, Mar. 7, 1999; 13 pages.
"Automatic Code Generation of Complex Business Rules", Paul Dorsey, Mar. 7, 1999; 11 pages.
"Automating Oracle", Michael R. Ault, Mar. 7, 1999; 11 pages.
"Bstat/Estat: Eight to Eighty", John Hough, Mar. 7, 1999; 11 pages.
"Client/Server to Web Deployment via Oracle Designer", Leslie M. Tierstein, Mar. 7, 1999; 14 pages.
"Client-side Development Options", Debbie Wong, Mar. 7, 1999; 7 pages.
"Client-side Filters, LOVs, and Pop-Lists", I. Michael Snyder, Mar. 7, 1999; 8 pages.
"Convert Mainframe Applications into New Applications", Orest Roman Swystun, Mar. 7, 1999; 6 pages.
"Data Mart Implementation: A Case Study", Anissa Stevens, Mar. 7, 1999; 7 pages.
"Data Mining and Knowledge Discovery—an Overview", David M. Grube, Mar. 7, 1999; 6 pages.
"Data Warehousing: Tools of the Trade", Kim Moulton, Mar. 7, 1999; 4 pages.
"DB Phone Home—How to Create an Oem Event", Marlene Theriault, Mar. 7, 1999; 9 pages.
"Defragging the Large Information Repository", Michael Abbey, Mar. 7, 1999; 4 pages.
"Develop JavaBeans Using Jdeveloper", Joe Greenwald, Mar. 7, 1999; 6 pages.
"Dynacode: Adventures in Dynamic SQL Programming", Anthony Vuolo & Mark Lacatena & Thomas Swendener, Mar. 7, 1999; 3 pages.
"Effective Application Testing Methodology and Standards", Edward Van Orden, Mar. 7, 1999; 5 pages.
"Eliminating Tedious Work for the Oracle Web Developer", David Oranchak, Mar. 7, 1999; 17 pages.
"Enterprise Solutions", Charles M. Davis, Mar. 7, 1999; 6 pages.
"Function Points for Database Administration", Michael J. Hillanbrand, II, Mar. 7, 1999; 3 pages.
"Getting the Most Out of Oracle8 on Windows NT", Meghraj Thakkar, Mar. 7, 1999; 14 pages.
"How Good Are Your Statistics?", William Schott, Mar. 7, 1999; 12 pages.
"How to Write an Oracle Security Plan", Marlene Theriault, Mar. 7, 1999; 15 pages.
"Index Update: New Index Features in Oracle8", Mary Hunsaker Gable, Mar. 7, 1999; 7 pages.
"Integrating Java, Corba, and the Web", Joe Greenwald, Mar. 7, 1999; 5 pages.
"Investigating the Multiple Buffer Pool Feature of Oracle8", John Beresniewicz, Mar. 7, 1999; 11 pages.
"Making the Transition from ERDs to UML and Oracle's Object Database Designer", Paul Dorsey, Mar. 7, 1999; 7 pages.
"Managing Business by the Rules", David Hay, Mar. 7, 1999; 7 pages.
"Oracle Discoverer Viewer for the Web—Cyber Drilling Comes of Age", Steve Vandivier, Mar. 7, 1999; 6 pages.
"Oracle Loader—Exploiting the Power", Bill Smedley, Mar. 7, 1999; 3 pages.
"Oracle Payment Server", Dixie Hill & Jane Sowerby, Mar. 7, 1999; 8 pages.
"Oracle Web Application Server: Beyond the Manual", Walter Romanski, Mar. 7, 1999; 6 pages.
"Oracle8 Contention on NT", Meghraj Thakkar, Mar. 7, 1999; 9 pages.
"Oracle8 for Developers: What You Need to Know", John King, Mar. 7, 1999; 10 pages.
"Oracle8 Object Relational Database: Not a Tool, but a Toolbox", Kalpana Malligere, Mar. 7, 1999; 13 pages.
"Partitioning Tables With User Defined Datatypes", Gary D. Cook, Mar. 7, 1999; 5 pages.
"PL/SQL Web Agent Tips and Techniques", John C. Flack, Mar. 7, 1999; 9 pages.
"Rebuilding an Oracle Database", Earl Shaffer, Mar. 7, 1999; 5 pages.
"Script Crypt", Ben Lis, Mar. 7, 1999; 11 pages.
"Secure Remote Database Administration", Michael J. Hillanbrand, II & Edward Haskins, Mar. 7, 1999; 5 pages.
"Securing Data in the Server", Eric Evans, Mar. 7, 1999; 8 pages.
"Securing Web Access to Database Applications with Views", Beth Wolfset, Mar. 7, 1999; 7 pages.
"Successful System Generation from Oracle Designer", Ken Atkins, Mar. 7, 1999; 14 pages.
"Tablespace Recovery Using an Operating System Backup", Brenda Mattrella & James Stone, Mar. 7, 1999; 18 pages.
"Ten Sure Fire Ways to Fail at Data Warehousing", Bonnie O'Neil & John Dakin, Mar. 7, 1999; 8 pages.
"The Central Data Store—Sharing Data", Hank Petroskey & Matt Maher & Laurie Hambley, Mar. 7, 1999; 5 pages.
"The Oracle Reports 3.0 Layout Model", Chandra A Dorsey, Mar. 7, 1999; 9 pages.
"Trick Oracle's Two-Phase Commit and Salvage Your Propagation Procedures", Anand Raj, Mar. 7, 1999; 5 pages.
"Turn Simple Database Queries into a Powerful Data Warehouse", Ricardo Diez & Juan A Padilla, Mar. 7, 1999; 6 pages.
Infringement Contentions in Case No. 16-CV-02880 concerning U.S. Appl. No. 7,885,981 (43 pages), Aug. 23, 2016.
Invalidity Contentions in Case No. 16-CV-02880-LTS concerning U.S. Appl. No. 7,885,981 (18 pages), Sep. 20, 2016.
Petition for Inter Partes Review of U.S. Appl. No. 7,885,981 [IPR2017-01141] (92 pages), Mar. 24, 2017.
Petition for Inter Partes Review of U.S. Appl. No. 7,885,981 [IPR2017-01142] (102 pages), Mar. 24, 2017.

\* cited by examiner

| # | Country Number | Country Name | Region | Entered by Users | Entry Date | Modified by Users | Last Modified Date |
|---|---|---|---|---|---|---|---|
| 10 | 26 | Greece | EMEA | Kaufman, Michael Philip | 10/17/2001 17:21:22 | Kaufman, Michael Philip | 10/17/2001 17:21:22 |
| 11 | 16 | Ireland | EMEA | Kaufman, Michael Philip | 10/17/2001 17:10:10 | Kaufman, Michael Philip | 10/17/2001 17:10:10 |
| 12 | 19 | Italy | EMEA | Kaufman, Michael Philip | 10/17/2001 17:14:38 | Kaufman, Michael Philip | 10/17/2001 17:14:38 |
| 13 | 29 | Norway | EMEA | Kaufman, Michael Philip | 10/17/2001 17:22:42 | Kaufman, Michael Philip | 10/17/2001 17:22:42 |
| 14 | 22 | Poland | EMEA | Kaufman, Michael Philip | 10/17/2001 17:16:28 | Kaufman, Michael Philip | 10/17/2001 17:16:28 |
| 15 | 14 | Scotland | EMEA | Kaufman, Michael Philip | 10/17/2001 17:09:10 | Kaufman, Michael Philip | 10/17/2001 17:09:10 |
| 16 | 20 | Spain | EMEA | Kaufman, Michael Philip | 10/17/2001 17:14:55 | Kaufman, Michael Philip | 10/17/2001 17:14:55 |
| 17 | 30 | Sweeden | EMEA | Kaufman, Michael Philip | 10/17/2001 17:22:59 | Kaufman, Michael Philip | 10/17/2001 17:22:59 |
| 18 | 27 | Turkey | EMEA | Kaufman, Michael Philip | 10/17/2001 17:21:38 | Kaufman, Michael Philip | 10/17/2001 17:21:38 |
| 19 | 2 | USA | NAR West | Kaufman, Michael Philip | 10/12/2001 17:53:31 | Kaufman, Michael Philip | 10/12/2001 17:53:31 |
| 20 | 15 | Wales | EMEA | Kaufman, Michael Philip | 10/17/2001 17:09:34 | Kaufman, Michael Philip | 10/17/2001 17:09:34 |
| 21 | 25 | Yugoslavia | EMEA | Kaufman, Michael Philip | 10/17/2001 17:20:46 | Kaufman, Michael Philip | 10/17/2001 17:20:46 |

FIG. 9C

Browse ⊙ Search○ OPPORTUNITY   CONTACT EVENT  PEOPLE

Select table to browse ▼

COUNTRY [EDIT] → STATE OR PROVINCE [BROWSE]—906
908

SCHEMALIVE

912— BROWSING STATE OR PROVINCE
FOR COUNTRY #2

State Or Province options:  FULL BROWSE,  NEW SEARCH, OR  ADD—910

Page 1 of 7 (totaling 51 records @ 8 rows per page)      [Reset Rows]

| # | State or Province Number | State or Province ID | State or Province Name | Country | Entered by Users | Entry Date | Modified by Users | Last Modified Date |
|---|---|---|---|---|---|---|---|---|
| 1 | | AL | Alabama | USA | Kaufman, Michael Philip | 10/13/2001 2:17:47 | Kaufman, Michael Philip | 10/13/2001 2:17:47 |
| 2 | | AK | Alaska | USA | Kaufman, Michael Philip | 10/13/2001 2:17:48 | Kaufman, Michael Philip | 10/13/2001 2:17:48 |
| 3 | | AZ | Arizona | USA | Kaufman, Michael Philip | 10/13/2001 2:17:48 | Kaufman, Michael Philip | 10/13/2001 2:17:48 |
| 4 | | AR | Arkansas | USA | Kaufman, Michael Philip | 10/13/2001 2:17:48 | Kaufman, Michael Philip | 10/13/2001 2:17:48 |
| 5 | | CA | California | USA | Kaufman, Michael Philip | 10/13/2001 2:17:48 | Kaufman, Michael Philip | 10/13/2001 2:17:48 |
| 6 | | CO | Colorado | USA | Kaufman, Michael Philip | 10/13/2001 2:17:48 | Kaufman, Michael Philip | 10/13/2001 2:17:48 |
| 7 | | CT | Connecticut | USA | Kaufman, Michael Philip | 10/13/2001 2:17:48 | Kaufman, Michael Philip | 10/13/2001 2:17:48 |
| 8 | | DE | Delaware | USA | Kaufman, Michael Philip | 10/13/2001 2:17:48 | Kaufman, Michael Philip | 10/13/2001 2:17:48 |

[Next 8 Rows]  [Bottom of List]

FIG. 9D

SYSTEMS AND METHODS FOR AUTOMATICALLY GENERATING USER INTERFACE ELEMENTS FOR COMPLEX DATABASES

CROSS-REFERENCE TO RELATED APPLICATIONS

This application is a continuation of U.S. patent application Ser. No. 13/385,913, filed Mar. 14, 2012, now U.S. Pat. No. 8,775,478, which was a continuation of U.S. patent application Ser. No. 12/930,849, filed Jan. 29, 2011, now U.S. Pat. No. 8,161,081 B2, which was a divisional of U.S. patent application Ser. No. 11/925,326, filed Oct. 26, 2007, now U.S. Pat. No. 7,885,981 B2, which was a continuation of U.S. patent application Ser. No. 10/428,209, filed Apr. 30, 2003, now U.S. Pat. No. 7,318,066 B2, which was a continuation of International Application No. PCT/US01/42867, filed Oct. 31, 2001, which claims the benefit under 35 U.S.C. §§ 120 and 365(e) of the filing date of U.S. patent application Ser. No. 09/703,267, filed Oct. 31, 2000 and also claims the benefit under 35 U.S.C. § 119(e) of U.S. Provisional Pat. App. Ser. No. 60/376,385, filed Mar. 16, 2001. The entire disclosure of each of the foregoing patents and patent applications, including without limitation the written description, abstract, claims, drawings, and CDROM Appendix in each such patent and patent application, and the computer source code and scripts set forth at pages 43-222 of the specification on file in the application Ser. No. 10/428,209, are hereby incorporated by reference herein.

COMPUTER PROGRAM LISTING

The computer program listing appendix submitted on compact disc is hereby incorporated by reference. The compact disc contains the following directory structure:

| File Name and Path | Date of Creation | Size in Bytes |
| --- | --- | --- |
| PROV 2001 SRC/AUIFACOLD/AddEditForm.jsp | Mar. 15, 2001 | 24,564 |
| PROV 2001 SRC/AUIFACOLD/Browse.jsp | Mar. 16, 2001 | 23,324 |
| PROV 2001 SRC/AUIFACOLD/DoAddEdit.jsp | Jul. 2, 2014 | 11,312 |
| PROV 2001 SRC/AUIFACOLD/DoViewGenerator.jsp | Mar. 14, 2001 | 1,486 |
| PROV 2001 SRC/AUIFACOLD/Error500.jsp | Mar. 14, 2001 | 3,337 |
| PROV 2001 SRC/AUIFACOLD/ExpiredSession.jsp | Mar. 14, 2001 | 3,625 |
| PROV 2001 SRC/AUIFACOLD/OutOfSequence.jsp | Mar. 14, 2001 | 3,810 |
| PROV 2001 SRC/AUIFACOLD/showSession.jsp | Mar. 14, 2001 | 5,032 |
| PROV 2001 SRC/AUIFACOLD/common/EmptyParamCheck.jsp | Mar. 14, 2001 | 564 |
| PROV 2001 SRC/AUIFACOLD/common/EntryPoints.jsp | Mar. 15, 2001 | 159 |
| PROV 2001 SRC/AUIFACOLD/common/GlobalFooter.jsp | Mar. 14, 2001 | 89 |
| PROV 2001 SRC/AUIFACOLD/common/GlobalHeaderHTML.jsp | Mar. 14, 2001 | 8,230 |
| PROV 2001 SRC/AUIFACOLD/common/GlobalHeaderVARS.jsp | Mar. 14, 2001 | 528 |
| PROV 2001 SRC/AUIFACOLD/WEB-INF/classes/common/debug.java | Mar. 14, 2001 | 1,248 |
| PROV 2001 SRC/AUIFACOLD/WEB-INF/classes/dbUtils/CustomCaps.java | Mar. 14, 2001 | 211 |
| PROV 2001 SRC/AUIFACOLD/WEB-INF/classes/dbUtils/CustomDrillDown.java | Mar. 14, 2001 | 1,215 |
| PROV 2001 SRC/AUIFACOLD/WEB-INF/classes/dbUtils/CustomDropDown.java | Mar. 14, 2001 | 1,227 |
| PROV 2001 SRC/AUIFACOLD/WEB-INF/classes/dbUtils/CustomDropDownComponent.java | Mar. 14, 2001 | 868 |
| PROV 2001 SRC/AUIFACOLD/WEB-INF/classes/dbUtils/DataDictionary.java | Mar. 14, 2001 | 3,766 |
| PROV 2001 SRC/AUIFACOLD/WEB-INF/classes/dbUtils/DataDictionaryServlet.java | Mar. 14, 2001 | 5,844 |
| PROV 2001 SRC/AUIFACOLD/WEB-INF/classes/dbUtils/DataDictionaryTD.java | Mar. 14, 2001 | 8,238 |
| PROV 2001 SRC/AUIFACOLD/WEB-INF/classes/dbUtils/MasterDetail.java | Mar. 14, 2001 | 2,412 |
| PROV 2001 SRC/AUIFACOLD/WEB-INF/classes/dbUtils/MasterDetailServlet.java | Mar. 14, 2001 | 3,547 |
| PROV 2001 SRC/AUIFACOLD/WEB-INF/classes/dbUtils/SQLUtil.java | Mar. 14, 2001 | 1,690 |
| PROV 2001 SRC/AUIFACOLD/WEB-INF/classes/dbUtils/TableDescriptor.java | Mar. 14, 2001 | 19,181 |
| PROV 2001 SRC/AUIFACOLD/WEB-INF/classes/dbUtils/ViewGenerator.java | Mar. 15, 2001 | 16,539 |
| PROV 2001 SRC/AUIFACOLD/WEB-INF/classes/HTMLUtils/TableDescriptorDisplay.java | Mar. 15, 2001 | 26,692 |
| PROV 2001 SRC/AUIFACOLD/WEB-INF/sessionUtils/ManageSession.java | Mar. 14, 2001 | 1,246 |
| PROV 2001 SRC/AUIFACOLD/WEB-INF/sessionUtils/StackElement.java | Mar. 14, 2001 | 4,691 |
| PROV 2001 SRC/AUIFACOLD/WEB-INF/sessionUtils/StackTag.java | Mar. 15, 2001 | 7,282 |
| PROV 2001 SRC/AUIFACOLD/WEB-INF/sessionUtils/StackTagExtraInfo.java | Mar. 14, 2001 | 600 |
| PROV 2001 SRC/AUIFACOLD/WEB-INF/taglib/DisplayStack.tld | Mar. 11, 2001 | 453 |
| PROV 2001 SRC/AUIFACOLD/WEB-INF/taglib/showStack.tld | Mar. 11, 2001 | 453 |
| PROV 2001 SRC/AUIFACOLD/WEB-INF/taglib/stack.tld | Mar. 11, 2001 | 1,112 |
| PROV 2001 SRC/AUIFACOLD/WEB-INF/taglib/view.tld | Mar. 11, 2001 | 839 |
| PROV 2001 SRC/AUIFACOLD/WEB-INF/tagUtils/ViewTag.java | Mar. 14, 2001 | 2,173 |
| PROV 2001 SRC/AUIFACOLD/WEB-INF/tagUtils/ViewTagExtraInfo.java | Mar. 14, 2001 | 689 |
| PROV 2001 SRC/SQL/create-column_comments.sql | Mar. 16, 2001 | 1,699 |
| PROV 2001 SRC/SQL/create-indexes.sql | Mar. 16, 2001 | 18,492 |
| PROV 2001 SRC/SQL/create-procedures.sql | Mar. 16, 2001 | 800 |
| PROV 2001 SRC/SQL/create-sequences.sql | Mar. 16, 2001 | 2,730 |
| PROV 2001 SRC/SQL/create-tables.sql | Mar. 16, 2001 | 15,742 |
| PROV 2001 SRC/SQL/create-table_comments.sql | Mar. 16, 2001 | 3,581 |
| PROV 2001 SRC/SQL/create-views.sql | Mar. 16, 2001 | 851 |
| PROV 2001 SRC/SQL/generate-indexes.sql | Mar. 16, 2001 | 370 |
| TextFiles/c-c_c.sql | Oct. 31, 2000 | 697 |
| TextFiles/c-p.sql | Oct. 31, 2000 | 288 |
| TextFiles/c-s.sql | Oct. 31, 2000 | 1,241 |
| TextFiles/c-t.sql | Oct. 31, 2000 | 4,495 |
| TextFiles/c-t_c.sql | Oct. 31, 2000 | 558 |
| TextFiles/create-column_comments.sql | Oct. 31, 2000 | 697 |
| TextFiles/create-procedures.sql | Oct. 31, 2000 | 288 |
| TextFiles/create-sequences.sql | Oct. 31, 2000 | 1,241 |
| TextFiles/create-tables.sql | Oct. 31, 2000 | 4,495 |
| TextFiles/create-table_comments.sql | Oct. 31, 2000 | 558 |

-continued

| File Name and Path | Date of Creation | Size in Bytes |
|---|---|---|
| TextFiles/javadoc.tgz | Oct. 31, 2000 | 26,011 |
| TextFiles/SQL1.PRN | Oct. 31, 2000 | 6,461 |
| TextFiles/TEMP-PRN | Oct. 31, 2000 | 7,587 |
| TextFiles/AUIFACOLD/AddEditForm.jsp | Oct. 31, 2000 | 26,207 |
| TextFiles/AUIFACOLD/Browse.jsp | Oct. 31, 2000 | 24,916 |
| TextFiles/AUIFACOLD/DoAddEdit.jsp | Oct. 31, 2000 | 17,411 |
| TextFiles/AUIFACOLD/Error500.jsp | Oct. 31, 2000 | 2,525 |
| TextFiles/AUIFACOLD/showSession.jsp | Oct. 31, 2000 | 4,893 |
| TextFiles/AUIFACOLD/common/GlobalFooter.jsp | Sep. 4, 2000 | 1 |
| TextFiles/AUIFACOLD/common/GlobalHeaderHTML.jsp | Oct. 30, 2000 | 5,762 |
| TextFiles/AUIFACOLD/common/GlobalHeaderVARS.jsp | Oct. 31, 2000 | 375 |
| TextFiles/AUIFACOLD/WEB-INF/web.xml | Oct. 28, 2000 | 4,731 |
| TextFiles/AUIFACOLD/WEB-INF/classes/db.properties | Oct. 31, 2000 | 1,221 |
| TextFiles/AUIFACOLD/WEB-INF/classes/dbUtils/CustomDrillDown.java | Oct. 31, 2000 | 1,048 |
| TextFiles/AUIFACOLD/WEB-INF/classes/dbUtils/DataDictionary.java | Oct. 31, 2000 | 4,216 |
| TextFiles/AUIFACOLD/WEB-INF/classes/dbUtils/DataDictionaryServlet.java | Oct. 31, 2000 | 5,659 |
| TextFiles/AUIFACOLD/WEB-INF/classes/dbUtils/DataDictionaryTD.java | Oct. 31, 2000 | 6,177 |
| TextFiles/AUIFACOLD/WEB-INF/classes/dbUtils/DBConnectionManager.java | Aug. 12, 2000 | 14,078 |
| TextFiles/AUIFACOLD/WEB-INF/classes/dbUtils/MasterDetail.java | Oct. 31, 2000 | 2,943 |
| TextFiles/AUIFACOLD/WEB-INF/classes/dbUtils/MasterDetailServlet.java | Oct. 31, 2000 | 3,645 |
| TextFiles/AUIFACOLD/WEB-INF/classes/dbUtils/SQLUtil.java | Oct. 12, 2000 | 757 |
| TextFiles/AUIFACOLD/WEB-INF/classes/dbUtils/TableDescriptor.java | Oct. 31, 2000 | 16,747 |
| TextFiles/AUIFACOLD/WEB-INF/classes/dbUtils/ViewGenerator.java | Oct. 12, 2000 | 13,510 |
| TextFiles/AUIFACOLD/WEB-INF/classes/HTMLUtils/TableDescriptorDisplay.java | Oct. 31, 2000 | 23,080 |
| TextFiles/AUIFACOLD/WEB-INF/sessionUtils/StackElement.java | Oct. 28, 2000 | 4,622 |
| TextFiles/AUIFACOLD/WEB-INF/sessionUtils/StackTag.java | Oct. 30, 2000 | 7,045 |
| TextFiles/AUIFACOLD/WEB-INF/sessionUtils/StackTagExtraInfo.java | Oct. 18, 2000 | 397 |
| TextFiles/AUIFACOLD/WEB-INF/taglib/stack.tld | Oct. 30, 2000 | 1,071 |
| TextFiles/AUIFACOLD/WEB-INF/taglib/view.tld | Oct. 27, 2000 | 808 |
| TextFiles/AUIFACOLD/WEB-INF/tagUtils/ViewTag.java | Oct. 27, 2000 | 2,098 |
| TextFiles/AUIFACOLD/WEB-INF/tagUtils/ViewTagExtraInfo.java | Oct. 27, 2000 | 671 |
| TextFiles/Javadoc/doc/allclasses-frame.html | Oct. 31, 2000 | 2,291 |
| TextFiles/Javadoc/doc/deprecated-list.html | Oct. 31, 2000 | 3,803 |
| TextFiles/Javadoc/doc/help-doc.html | Oct. 31, 2000 | 7,327 |
| TextFiles/Javadoc/doc/index-all.html | Oct. 31, 2000 | 45,124 |
| TextFiles/Javadoc/doc/index.html | Oct. 31, 2000 | 785 |
| TextFiles/Javadoc/doc/overview-frame.html | Oct. 31, 2000 | 1,228 |
| TextFiles/Javadoc/doc/overview-summary.html | Oct. 31, 2000 | 4,557 |
| TextFiles/Javadoc/doc/overview-tree.html | Oct. 31, 2000 | 6,950 |
| TextFiles/Javadoc/doc/package-list | Oct. 31, 2000 | 44 |
| TextFiles/Javadoc/doc/packages.html | Oct. 31, 2000 | 671 |
| TextFiles/Javadoc/doc/serialized-form.html | Oct. 31, 2000 | 15,314 |
| TextFiles/Javadoc/doc/stylesheet.css | Oct. 31, 2000 | 1,269 |
| TextFiles/Javadoc/doc/dbUtils/CustomDrillDown.html | Oct. 31, 2000 | 10,618 |
| TextFiles/Javadoc/doc/dbUtils/DataDictionary.html | Oct. 31, 2000 | 9,622 |
| TextFiles/Javadoc/doc/dbUtils/DataDictionaryServlet.html | Oct. 31, 2000 | 12,203 |
| TextFiles/Javadoc/doc/dbUtils/DataDictionaryTD.html | Oct. 31, 2000 | 12,429 |
| TextFiles/Javadoc/doc/dbUtils/DBConnectionManager.html | Oct. 31, 2000 | 11,382 |
| TextFiles/Javadoc/doc/dbUtils/MasterDetail.html | Oct. 31, 2000 | 8,946 |
| TextFiles/Javadoc/doc/dbUtils/MasterDetailServlet.html | Oct. 31, 2000 | 12,231 |
| TextFiles/Javadoc/doc/dbUtils/package-frame.html | Oct. 31, 2000 | 1,454 |
| TextFiles/Javadoc/doc/dbUtils/package-summary.html | Oct. 31, 2000 | 5,828 |
| TextFiles/Javadoc/doc/dbUtils/package-tree.html | Oct. 31, 2000 | 5,648 |
| TextFiles/Javadoc/doc/dbUtils/SQLUtil.html | Oct. 31, 2000 | 8,560 |
| TextFiles/Javadoc/doc/dbUtils/ableDescriptor.html | Oct. 31, 2000 | 32,949 |
| TextFiles/Javadoc/doc/dbUtils/ViewGenerator.html | Oct. 31, 2000 | 10,364 |
| TextFiles/Javadoc/doc/HTMLUtils/JspBase.html | Oct. 31, 2000 | 9,075 |
| TextFiles/Javadoc/doc/HTMLUtils/package-frame.html | Oct. 31, 2000 | 832 |
| TextFiles/Javadoc/doc/HTMLUtils/package-summary.html | Oct. 31, 2000 | 4,654 |
| TextFiles/Javadoc/doc/HTMLUtils/package-tree.html | Oct. 31, 2000 | 4,805 |
| TextFiles/Javadoc/doc/HTMLUtils/TableDescriptorDisplay.html | Oct. 31, 2000 | 20,243 |
| TextFiles/Javadoc/doc/sessionUtils/DisplayStackTag.html | Oct. 31, 2000 | 11,387 |
| TextFiles/Javadoc/doc/sessionUtils/DisplayStackTagExtraInfo.html | Oct. 31, 2000 | 8,994 |
| TextFiles/Javadoc/doc/sessionUtils/ManageSession.html | Oct. 31, 2000 | 9,547 |
| TextFiles/Javadoc/doc/sessionUtils/package-frame.html | Oct. 31, 2000 | 1,153 |
| TextFiles/Javadoc/doc/sessionUtils/package-summary.html | Oct. 31, 2000 | 5,248 |
| TextFiles/Javadoc/doc/sessionUtils/package-tree.html | Oct. 31, 2000 | 5,375 |
| TextFiles/Javadoc/doc/sessionUtils/StackElement.html | Oct. 31, 2000 | 25,403 |
| TextFiles/Javadoc/doc/sessionUtils/StackTag.html | Oct. 31, 2000 | 17,793 |
| TextFiles/Javadoc/doc/sessionUtils/StackTagExtraInfo.html | Oct. 31, 2000 | 8,777 |
| TextFiles/Javadoc/doc/tagUtils/package-frame.html | Oct. 31, 2000 | 817 |
| TextFiles/Javadoc/doc/tagUtils/package-summary.html | Oct. 31, 2000 | 4,534 |
| TextFiles/Javadoc/doc/tagUtils/package-tree.html | Oct. 31, 2000 | 4,643 |
| TextFiles/Javadoc/doc/tagUtils/ViewTag.html | Oct. 31, 2000 | 10,815 |
| TextFiles/Javadoc/doc/tagUtils/ViewTagExtraInfo.html | Oct. 31, 2000 | 8,738 |
| TextFiles/source/AddEditForm.jsp | Oct. 31, 2000 | 25,845 |

-continued

| File Name and Path | Date of Creation | Size in Bytes |
|---|---|---|
| TextFiles/source/AEF.jsp | Oct. 31, 2000 | 25,845 |
| TextFiles/source/Browse.jsp | Oct. 31, 2000 | 24,916 |
| TextFiles/source/DAE.jsp | Oct. 31, 2000 | 17,411 |
| TextFiles/source/DoAddEdit.jsp | Oct. 31, 2000 | 17,411 |
| TextFiles/source/Error500.jsp | Oct. 31, 2000 | 2,525 |
| TextFiles/source/showSession.jsp | Oct. 31, 2000 | 4,893 |
| TextFiles/source/ss.jsp | Oct. 31, 2000 | 4,893 |
| TextFiles/source/TEMP-PRN | Oct. 31, 2000 | 38,622 |
| TextFiles/source/tree.prn | Oct. 31, 2000 | 1,204 |
| TextFiles/source/common/gf.jsp | Sep. 04, 2000 | 1 |
| TextFiles/source/common/ghhtml.jsp | Oct. 30, 2000 | 5,762 |
| TextFiles/source/common/ghvars.jsp | Oct. 31, 2000 | 375 |
| TextFiles/source/common/GlobalFooter.jsp | Sep. 04, 2000 | 1 |
| TextFiles/source/common/GlobalHeaderHTML.jsp | Oct. 30, 2000 | 5,762 |
| TextFiles/source/common/GlobalHeaderVARS.jsp | Oct. 31, 2000 | 375 |
| TextFiles/source/common/TEMP-PRN | Oct. 31, 2000 | 6,563 |
| TextFiles/source/WEB-INF/TEMP-PRN | Oct. 31, 2000 | 12,595 |
| TextFiles/source/WEB-INF/web.xml | Oct. 28, 2000 | 4,731 |
| TextFiles/source/WEB-INF/classes/db.p | Oct. 31, 2000 | 1,221 |
| TextFiles/source/WEB-INF/classes/db.properties | Oct. 31, 2001 | 1,221 |
| TextFiles/source/WEB-INF/classes/TEMP-PRN | Oct. 31, 2001 | 7,434 |
| TextFiles/source/WEB-INF/classes/dbUtils/CDD.jav | Oct. 31, 2000 | 1,048 |
| TextFiles/source/WEB-INF/classes/dbUtils/CustomDrillDown.java | Oct. 31, 2000 | 1,048 |
| TextFiles/source/WEB-INF/classes/dbUtils/DataDictionary.java | Oct. 31, 2000 | 4,216 |
| TextFiles/source/WEB-INF/classes/dbUtils/DataDictionaryServlet.java | Oct. 31, 2000 | 5,659 |
| TextFiles/source/WEB-INF/classes/dbUtils/DataDictionaryTD.java | Oct. 31, 2000 | 6,177 |
| TextFiles/source/WEB-INF/classes/dbUtils/DBCMgr.jav | Aug. 12, 2000 | 14,078 |
| TextFiles/source/WEB-INF/classes/dbUtils/DBConnectionManager.java | Aug. 12, 2000 | 14,078 |
| TextFiles/source/WEB-INF/classes/dbUtils/DD.jav | Oct. 31, 2000 | 4,216 |
| TextFiles/source/WEB-INF/classes/dbUtils/DDS.jav | Oct. 31, 2000 | 5,659 |
| TextFiles/source/WEB-INF/classes/dbUtils/DDTD.jav | Oct. 31, 2000 | 6,177 |
| TextFiles/source/WEB-INF/classes/dbUtils/MasterDetail.java | Oct. 31, 2000 | 2,943 |
| TextFiles/source/WEB-INF/classes/dbUtils/MasterDetailServlet.java | Oct. 31, 2000 | 3,645 |
| TextFiles/source/WEB-INF/classes/dbUtils/MD.jav | Oct. 31, 2000 | 2,943 |
| TextFiles/source/WEB-INF/classes/dbUtils/MDS.jav | Oct. 31, 2000 | 3,645 |
| TextFiles/source/WEB-INF/classes/dbUtils/SQLUtil.jav | Oct. 12, 2000 | 757 |
| TextFiles/source/WEB-INF/classes/dbUtils/SQLUtil.java | Oct. 12, 2000 | 757 |
| TextFiles/source/WEB-INF/classes/dbUtils/TableDescriptor.java | Oct. 31, 2000 | 16,747 |
| TextFiles/source/WEB-INF/classes/dbUtils/TD.jav | Oct. 31, 2000 | 16,747 |
| TextFiles/source/WEB-INF/classes/dbUtils/TEMP-PRN | Oct. 31, 2000 | 22,154 |
| TextFiles/source/WEB-INF/classes/dbUtils/vg.jav | Oct. 12, 2000 | 13,510 |
| TextFiles/source/WEB-INF/classes/dbUtils/ViewGenerator.java | Oct. 12, 2000 | 13,510 |
| TextFiles/source/WEB-INF/classes/HTMLUtils/TableDescriptorDisplay.java | Oct. 31, 2000 | 23,080 |
| TextFiles/source/WEB-INF/classes/HTMLUtils/TDS.jav | Oct. 31, 2000 | 23,080 |
| TextFiles/source/WEB-INF/classes/HTMLUtils/TEMP-PRN | Oct. 31, 2000 | 39,699 |
| TextFiles/source/WEB-INF/classes/sessionUtils/SE.jav | Oct. 28, 2000 | 4,622 |
| TextFiles/source/WEB-INF/classes/sessionUtils/StackElement.java | Oct. 28, 2000 | 4,622 |
| TextFiles/source/WEB-INF/classes/sessionUtils/StackTag.jav | Oct. 30, 2000 | 7,045 |
| TextFiles/source/WEB-INF/classes/sessionUtils/StackTag.java | Oct. 30, 2000 | 7,045 |
| TextFiles/source/WEB-INF/classes/sessionUtils/StackTagExtraInfo.java | Oct. 18, 2000 | 397 |
| TextFiles/source/WEB-INF/classes/sessionUtils/STEI.jav | Oct. 18, 2000 | 397 |
| TextFiles/source/WEB-INF/classes/sessionUtils/TEMP-PRN | Oct. 31, 2000 | 6,603 |
| TextFiles/source/WEB-INF/taglib/stack.tld | Oct. 30, 2000 | 1,071 |
| TextFiles/source/WEB-INF/taglib/TEMP-PRN | Oct. 31, 2000 | 7,011 |
| TextFiles/source/WEB-INF/taglib/view.tld | Oct. 27, 2000 | 808 |
| TextFiles/source/WEB-INF/tagUtils/TEMP-PRN | Oct. 31, 2000 | 6,918 |
| TextFiles/source/WEB-INF/tagUtils/ViewTag.jav | Oct. 27, 2000 | 2,098 |
| TextFiles/source/WEB-INF/tagUtils/ViewTag.java | Oct. 27, 2000 | 2,098 |
| TextFiles/source/WEB-INF/tagUtils/ViewTagExtraInfo.java | Oct. 27, 2000 | 671 |
| TextFiles/source/WEB-INF/tagUtils/VTEI.jav | Oct. 27, 2000 | 671 |

BACKGROUND OF THE DISCLOSURE

Field of the Disclosure

The present disclosure relates to the field of data processing, and more particularly to relational computer databases, and to systems and methods for automatically generating without any custom programming a user interface for the database, and/or a complete application utilizing the database, or elements thereof.

Description of the Related Art

Modern databases—and in particular, complex or large databases which serve many concurrent users—are constructed as "client/server" or "n-tier" (client/server/server) systems, wherein specialized components perform separate (and carefully delineated) functions. At a minimum, such systems are generally composed of a "back-end" relational database management system (RDBMS)—which maintains and manipulates information according to requests submitted by other components or software processes (or expert human administrators) via open-standard query languages (i.e., SQL)—and a "front-end" presentation layer or user interface, which mediates the end-users' work with the back-end data.

Developing such a database system consists both in defining the organizational structure to be used by the back-end for storing data (that is, the complement of tables which store data, and the relational links between these tables)—known as a "schema" or "data model"—and in building a front-end program (or "application") via which end-users can manipulate this data (and which communicates with the back-end on the users' behalf). And although the back- and front-end components must be closely synchronized and reflect similar structures, these respective development efforts are typically rather separate—with the requisite synchronization and parallels in structuring being effected only manually.

Moreover, the construction of front-end applications is generally undertaken using conventional third- or fourth-generation computer languages, which require by-hand coding at a very low level of functionality. Current tools for easing the development burden are limited to fairly specific (and, still, fairly low-level) uses—among them, providing more sophisticated or "richer" controls for manipulating individual data elements; associating individual user-interface elements with specific back-end storage locations; or—at best—offering "form generator" or "wizard" facilities to automatically generate the code for a simple UI display which manipulates a single underlying (back-end) data table.

Even with such tools, considerable work remains in building a complete, fully functional UI for a back-end schema of any appreciable size or complexity—especially where industrial-grade performance and reliability is required. And as enterprise-scale data models continue to grow, the attendant explosion of manual-coding requirements quickly becomes unwieldy—and eventually, untenable.

BRIEF SUMMARY OF THE DISCLOSURE

One object of the present disclosure is to provide a complete and fully functional user interface (UI) for any arbitrarily complex or large database schema, without any custom software programming.

A second aspect of the disclosure is that, once a back-end schema has been designed and constructed within the RDBMS, such a system can automatically "interrogate" this schema, and "absorb" its structure into an internal cache (or, at the cost of real-time performance, the internal caching mechanism can be sidestepped).

Another aspect of the disclosure is to provide a system that presents to end-users, for any arbitrarily complex or large database, a comprehensive application through which the back-end can be operated, and through which all conventional database activities—searching, listing, adding, editing—can be supported, across all base-tables comprising the schema.

In another aspect of the disclosure, an application so presented reveals (and enforces) the relational/hierarchical organization among the tables within the back-end via smoothly integrated UI mechanisms which are embedded directly into the base-table screen displays—providing a natural, powerful, and easy-to-use environment for managing complex data relationships and interactions.

One embodiment (the "reference implementation") described herein as an example of a system which may be implemented in accordance with the techniques and principles described in this disclosure, provides a system, currently written in Java and JSP, which automatically and dynamically ("on-the-fly") generates (in HTML, Javascript, and HTTP/CGI code), a fully functional UI system, based upon, and connected directly to, the underlying data model (as instantiated within an Oracle8i SQL RDBMS). The UI in this embodiment is built based on an automated interrogation of the RDBMS, either as needed (on-the-fly) or by building an in-memory representation of the data model. The generated UI in this embodiment comprises all mode displays (e.g., browse, search, edit, and add) for all tables, and a full complement of mechanisms, integrated into the mode displays for representing, navigating, and managing relationships across tables. This embodiment has the capability of creating such a UI where the underlying RDBMS is complex and comprises a plurality of tables, constraints, and relationships. It utilizes a hierarchical "context stack" for maintaining (and suspending) the working state of a particular table (comprising selected record, display "mode", pending form-field entries, in-effect search-filter parameters, Browse-mode scroll position, and any filter constraints imposed from above stack contexts) while "drilling down" across relationships to work with related information (in a possibly constrained working context) and returning relevant changes to the parent-context table, and a corresponding UI convention for displaying and navigating this stack. The embodiment provides a set of rules for traversing/navigating the context stack. It further provides naming conventions and annotational methods for enhancing and extending the representation of table structures, constraints, and relationships within the back-end so as to more fully support revelation of the schema structure through external interrogation.

Other aspects of the disclosure include, for example, techniques for automatically constructing a representation of any database table, wherein all cross-table relationships are resolved so as to supplant internal key fields in the primary table with corresponding descriptive fields derived from the related tables.

Further aspects and applications of the disclosed subject matter will be apparent to those skilled in the art from the drawings and detailed description that follow.

BRIEF DESCRIPTION OF THE DRAWINGS

The following briefly describes the accompanying drawings:

Figure 1:
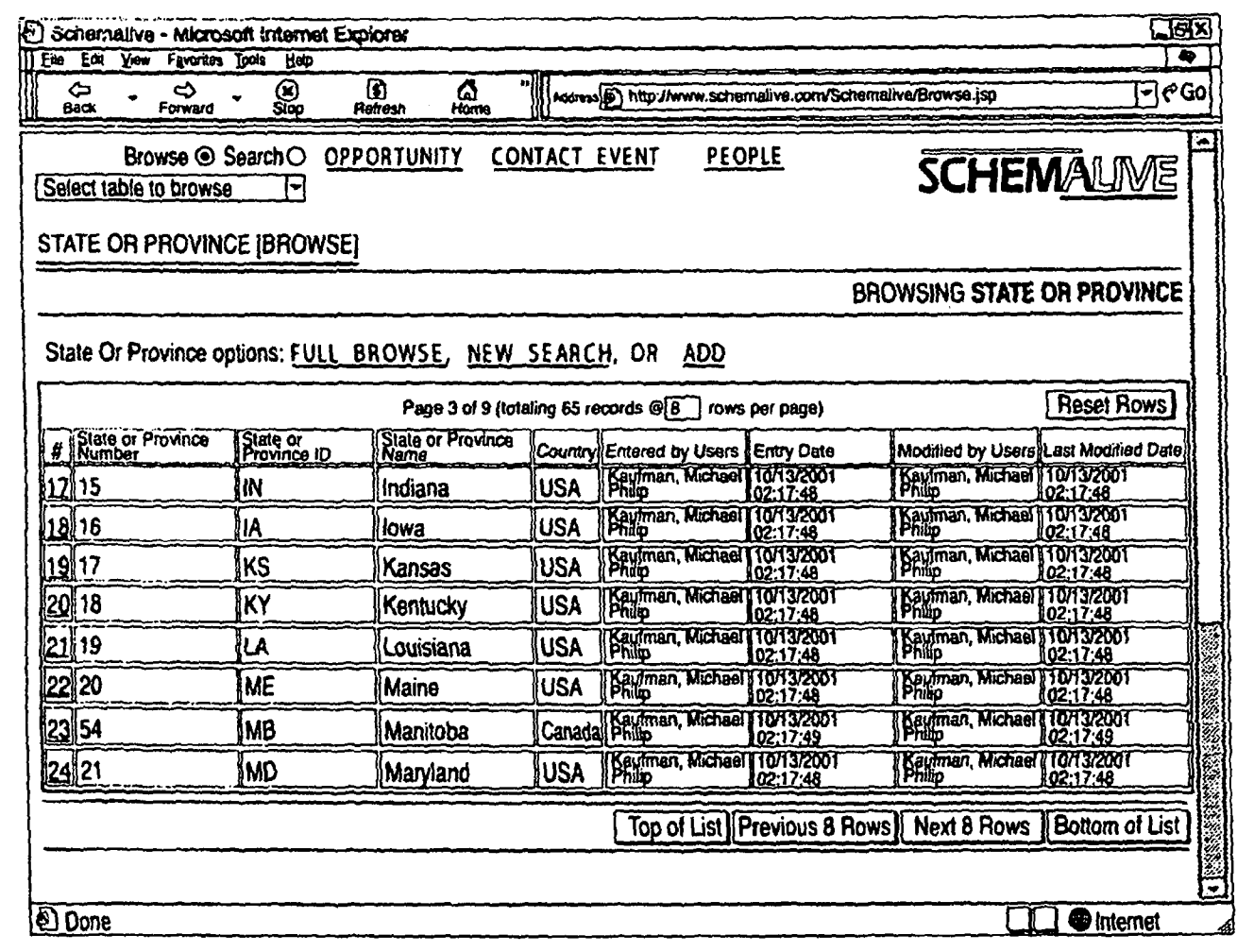

FIG. 1 is a normal "browse mode" display from the reference implementation.

Figure 2:
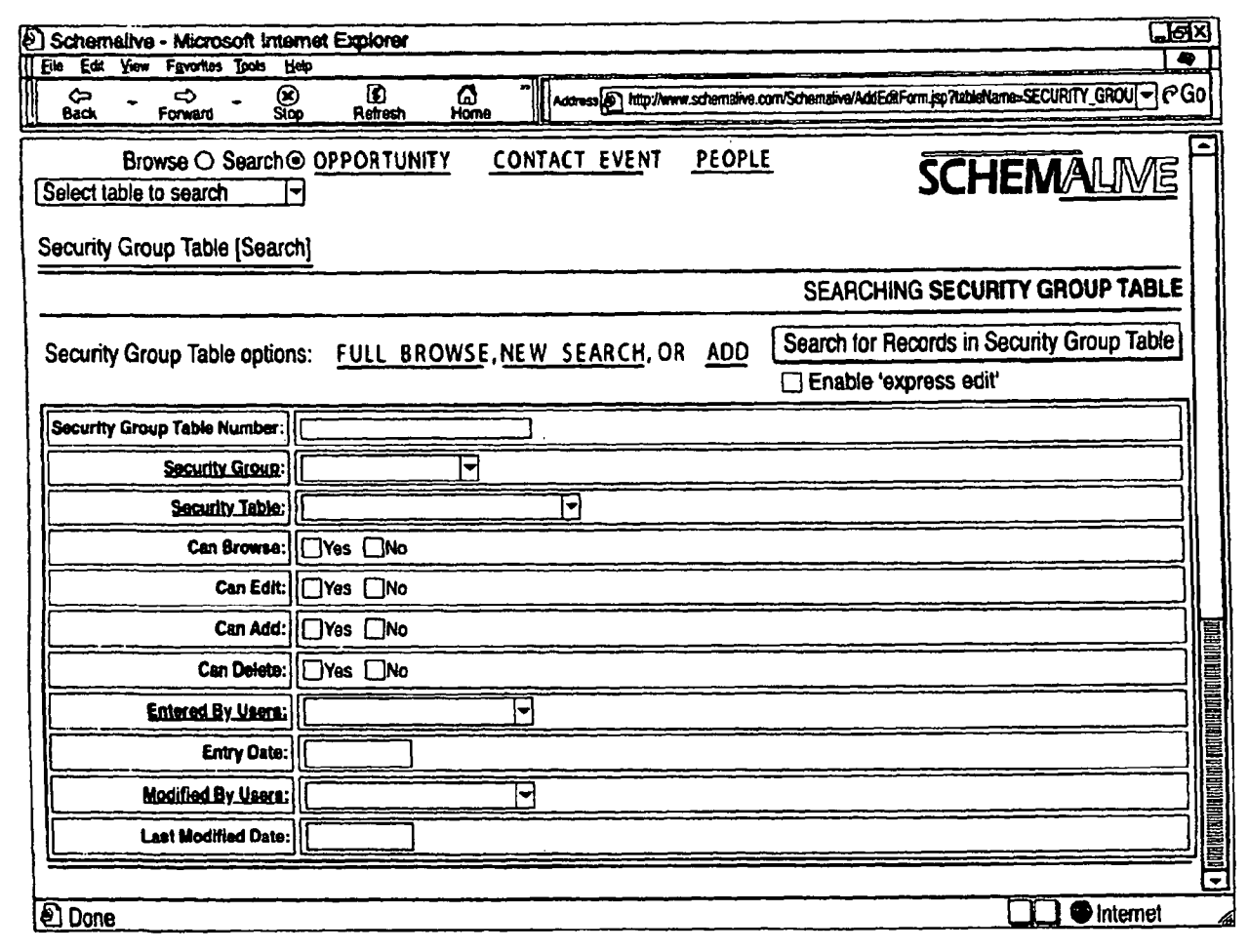

FIG. 2 is a normal "search mode" display from the reference implementation.

Figure 7:
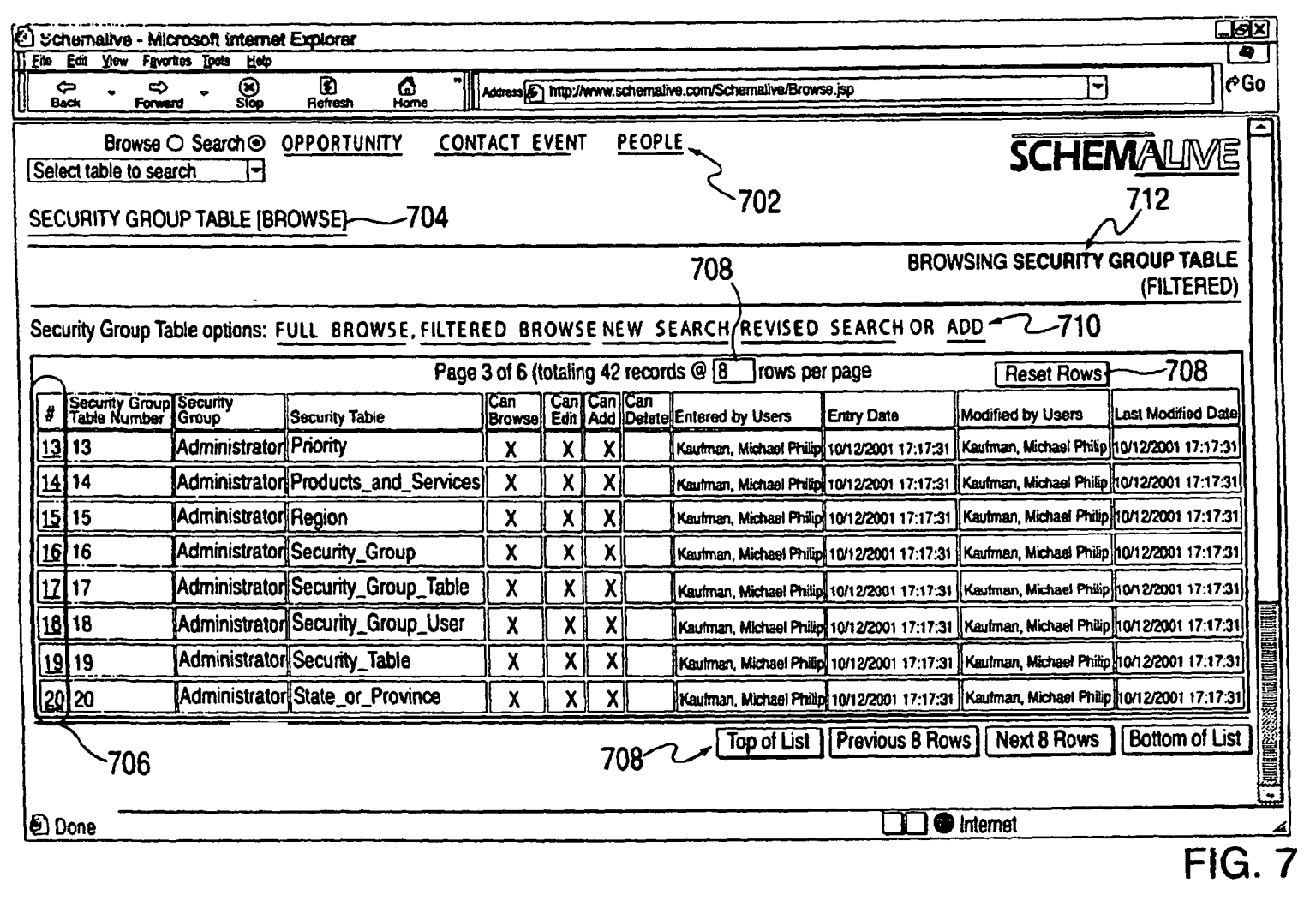

FIG. 7 is an annotated screen dump showing the active elements in a "browse mode" display.

FIGS. 9A-9E show an exemplary "master/detail drill-down" and a doubly-constrained subordinate table search as rendered in the reference implementation.

Figure 3:
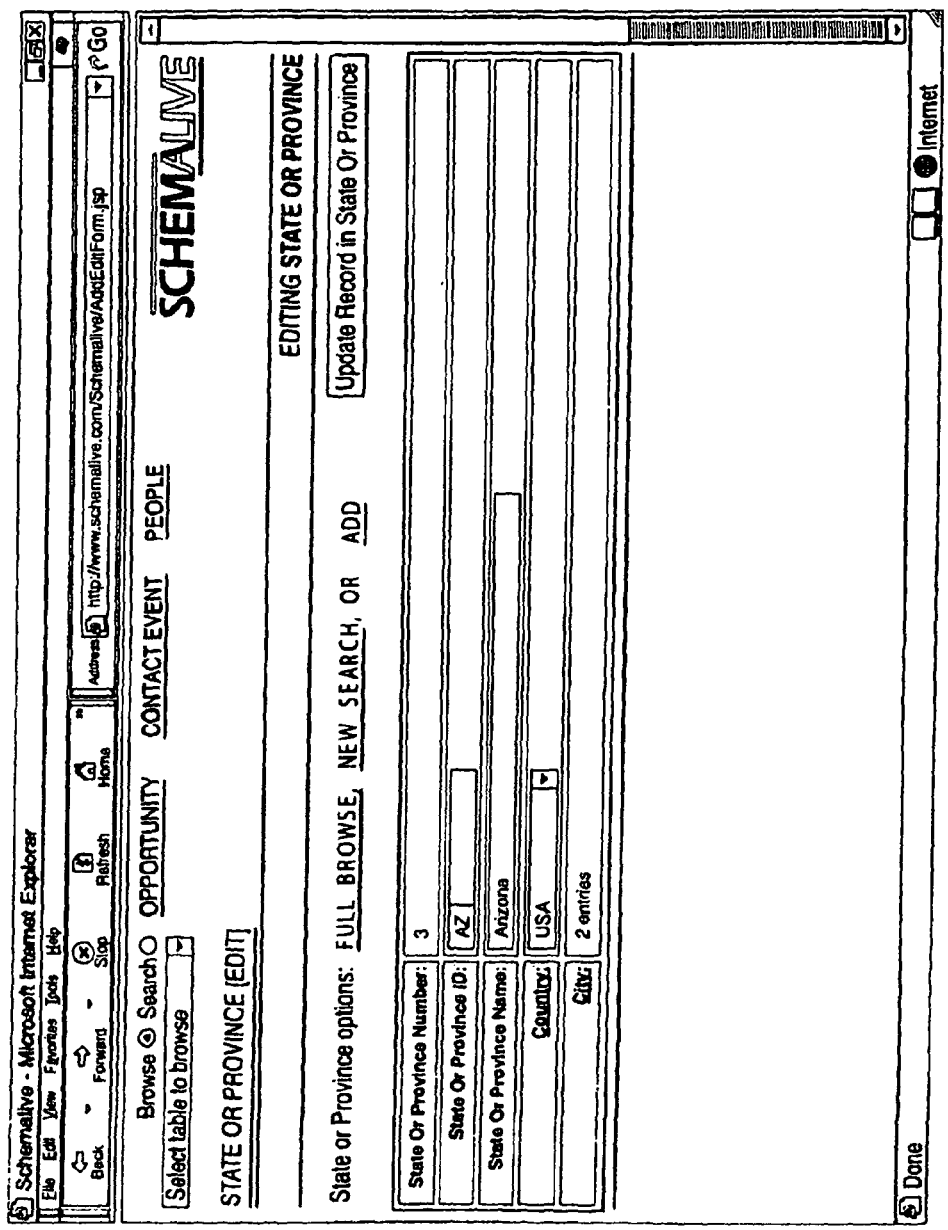
FIG. 3 is a normal "edit mode" display from the reference implementation.
Figure 4:
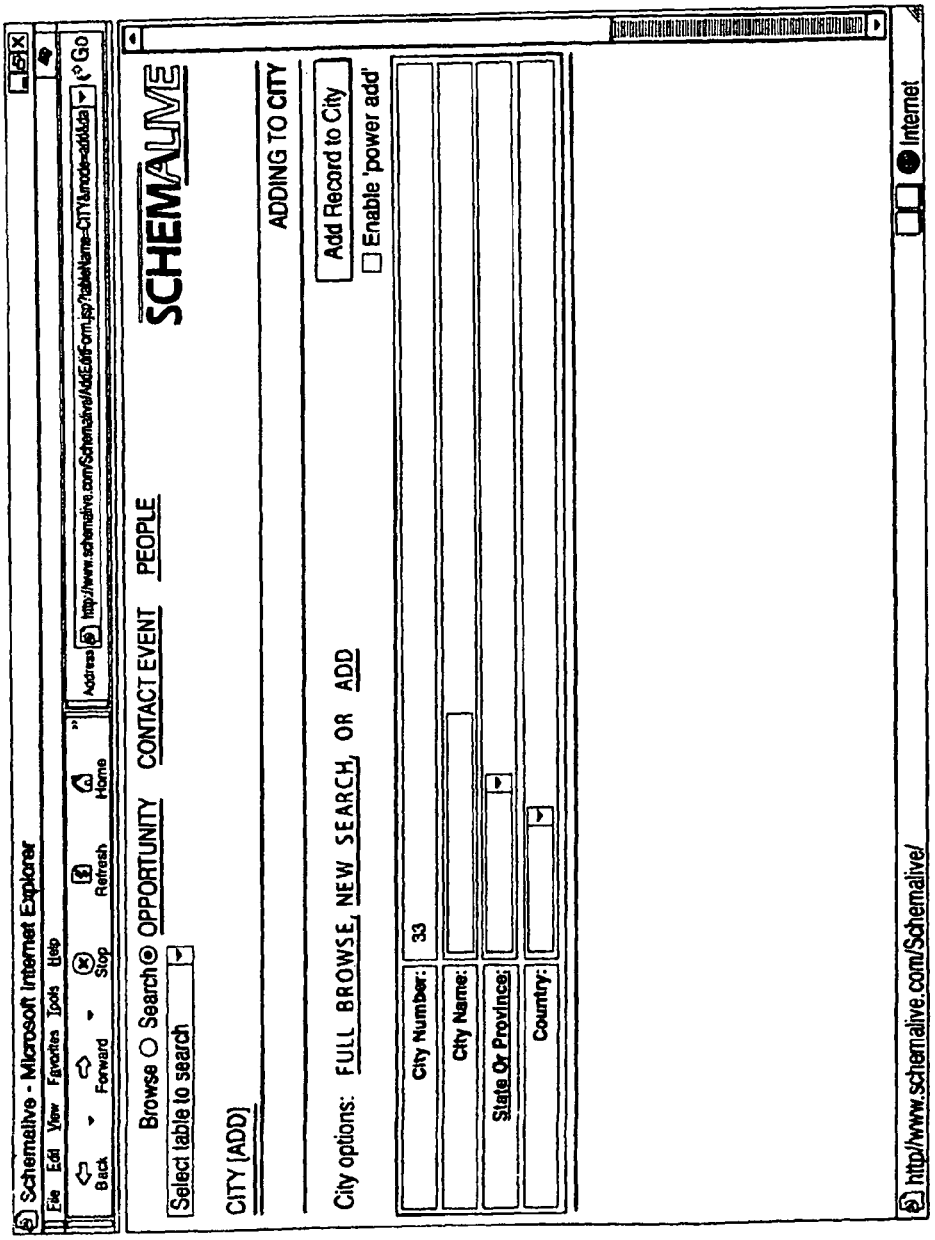
FIG. 4 is a normal "add mode" display from the reference implementation.
Figure 5A:
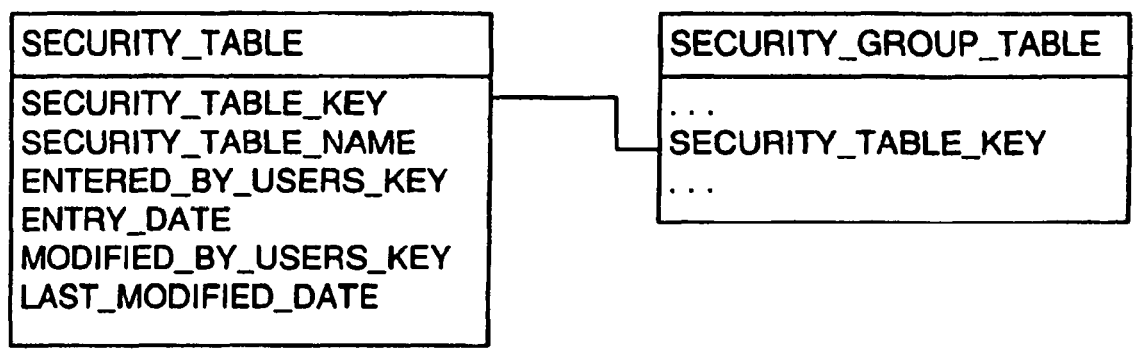
FIGS. 5A-5W are diagrams of the demonstration RDBMS schema from the reference implementation.
Figure 5B:
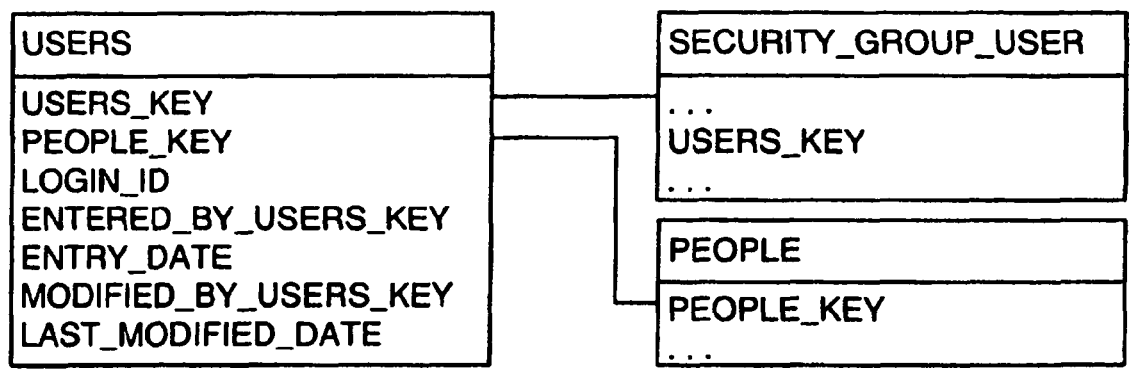
Figure 5C:
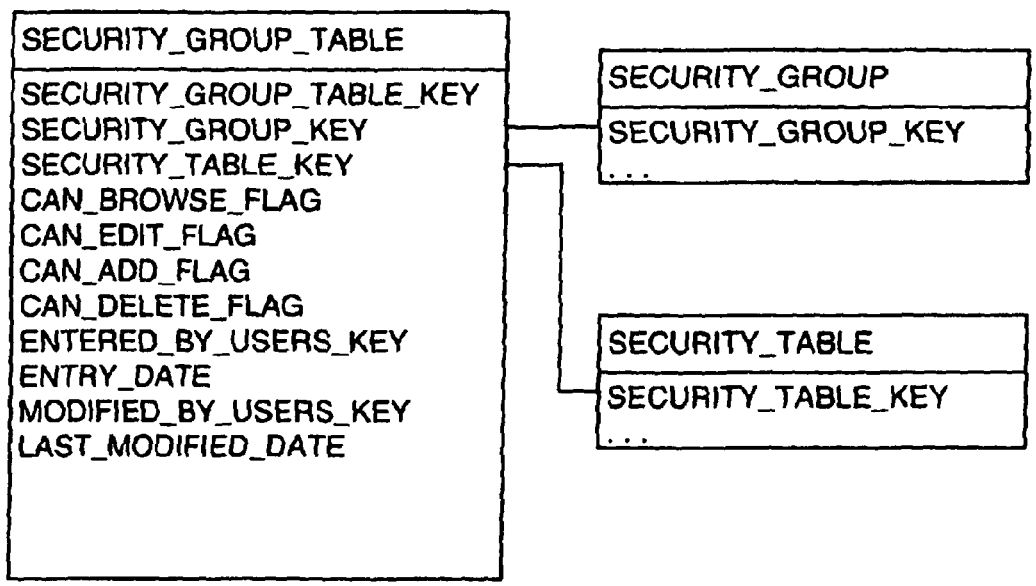
Figure 5D:
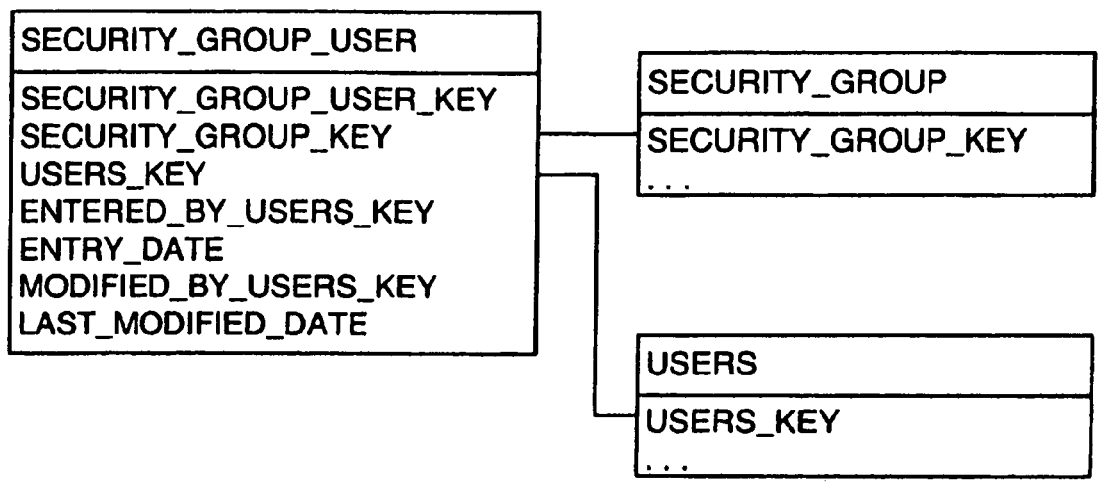
Figure 5E:
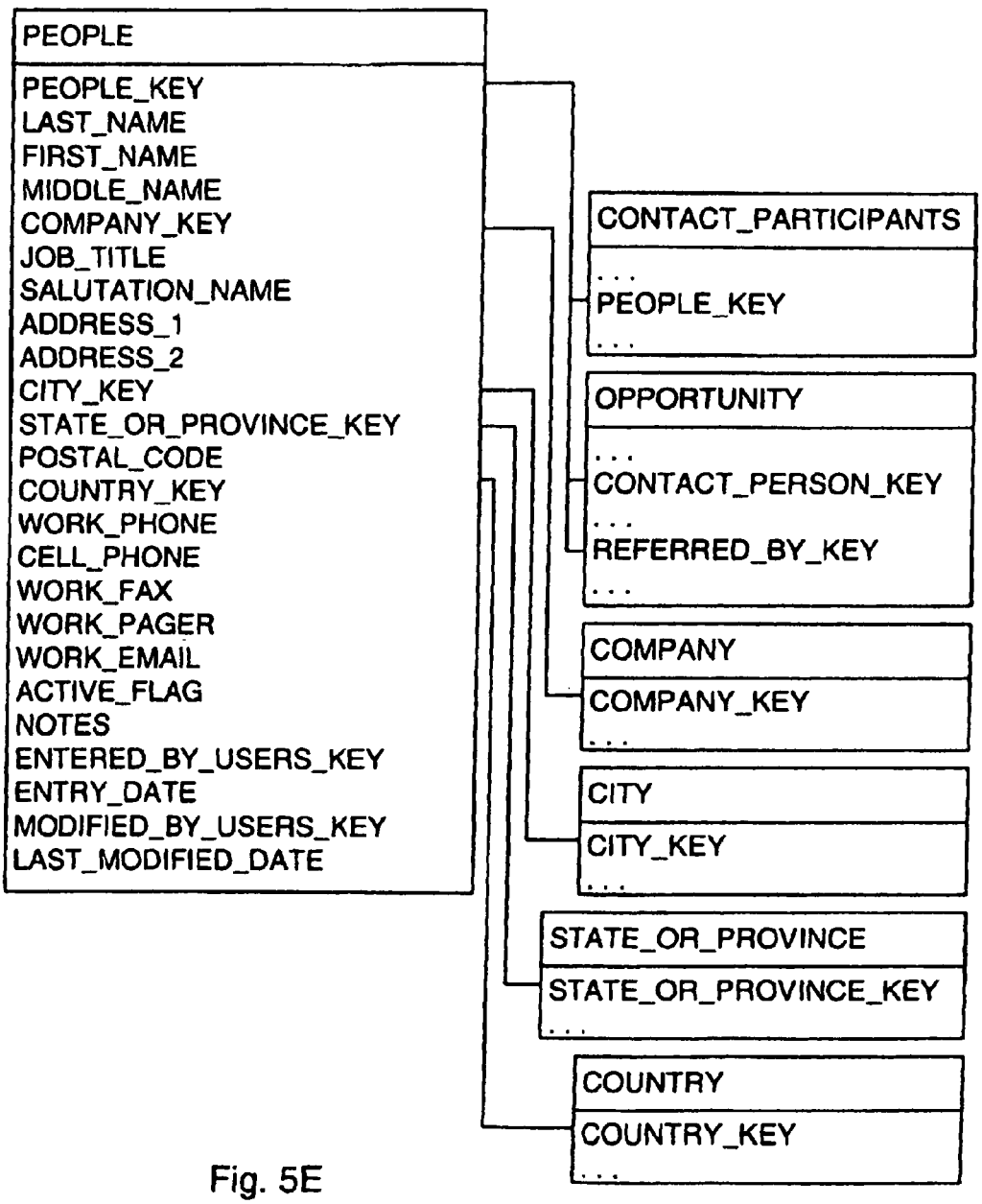
Figure 5F:
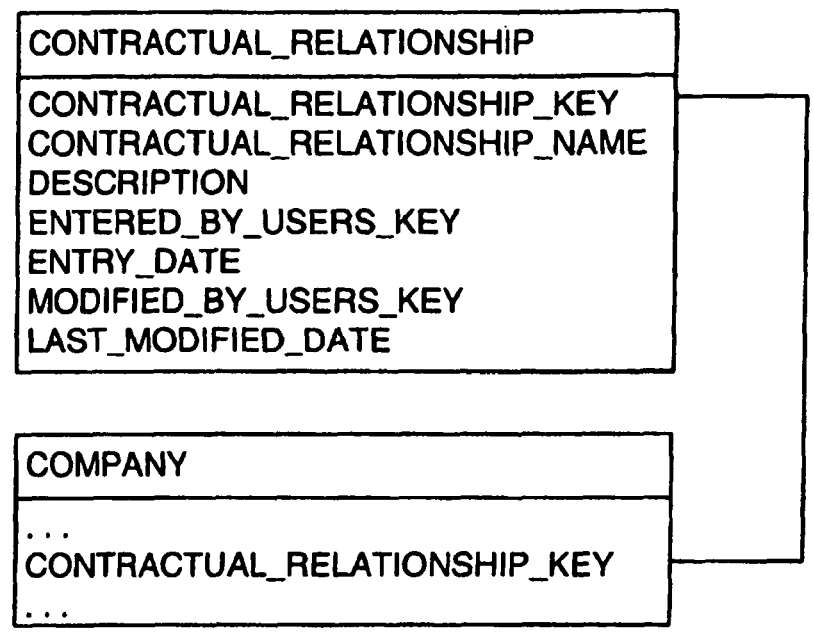
Figure 5G:
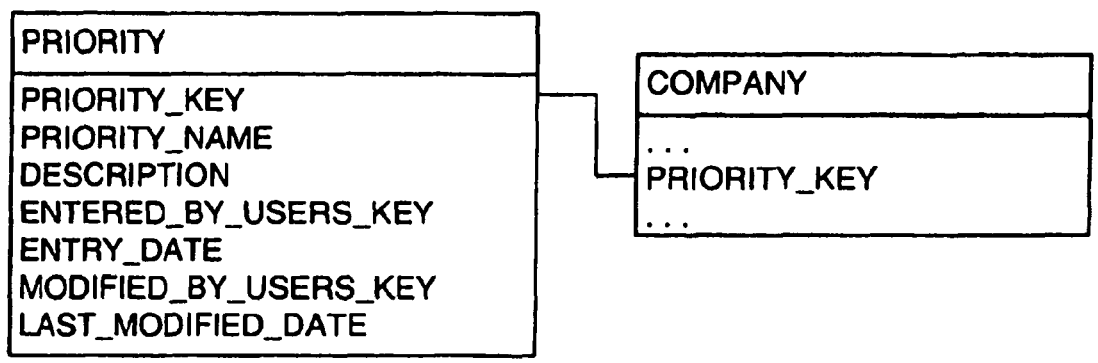
Figure 5H:
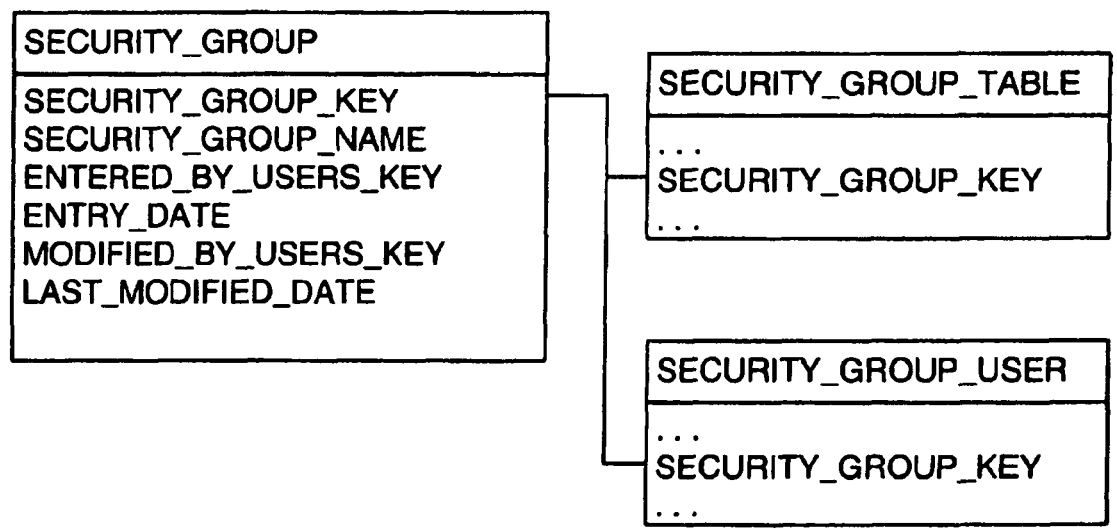
Figure 5I:
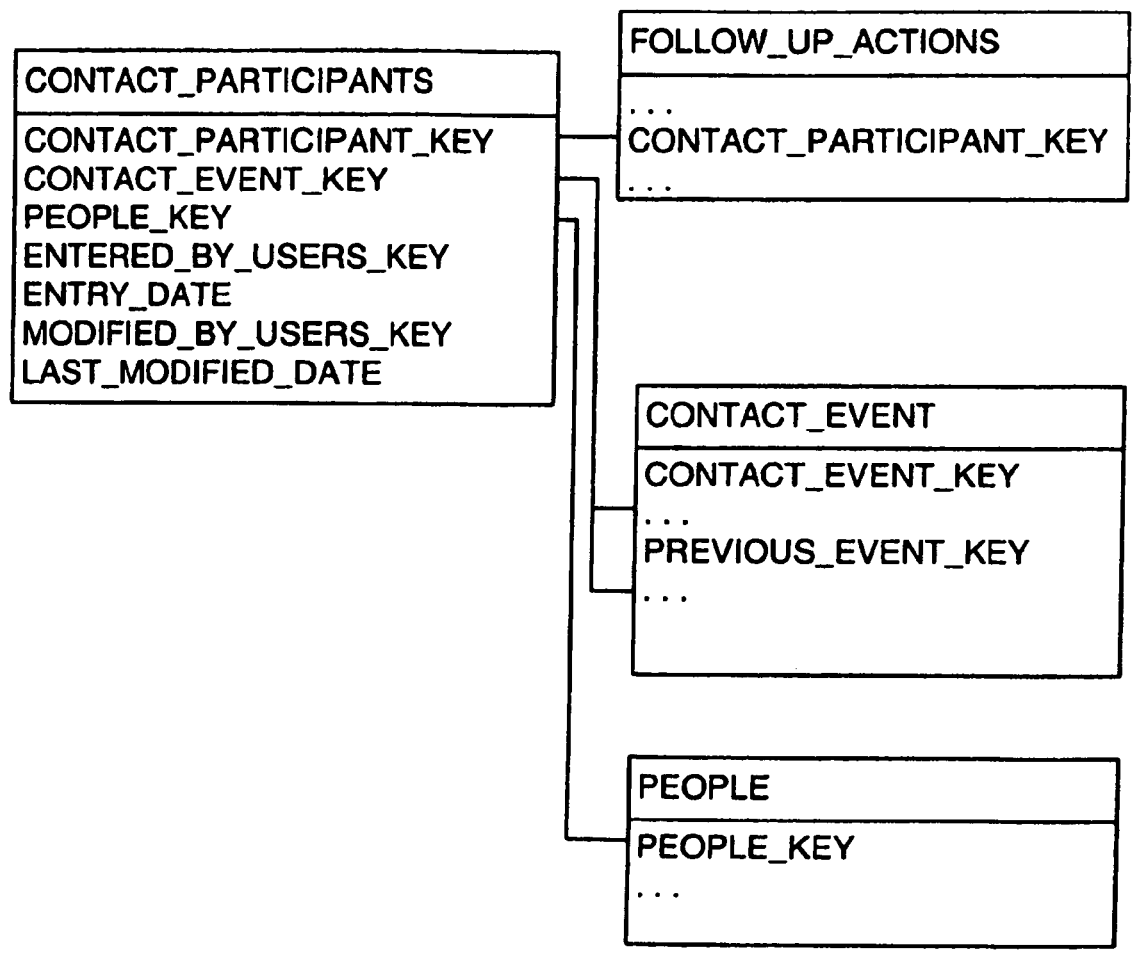
Figure 5J:
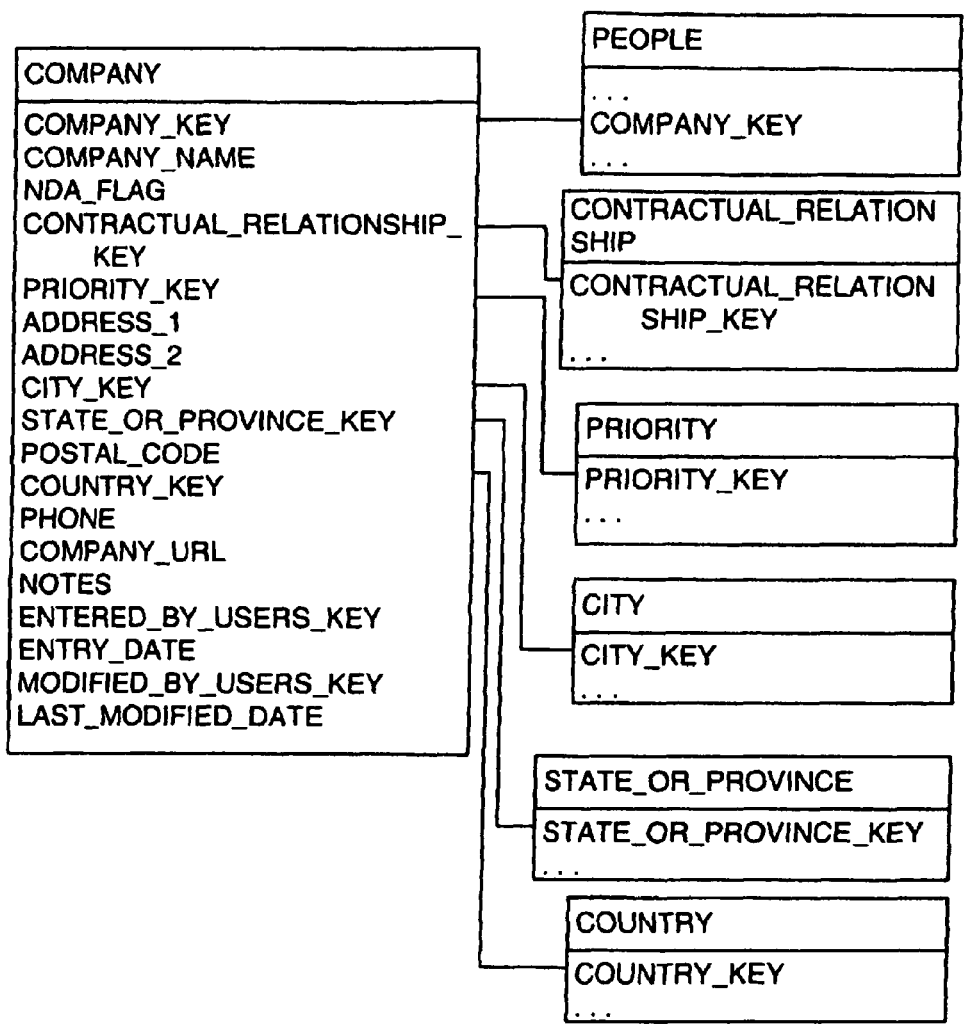
Figure 5K:
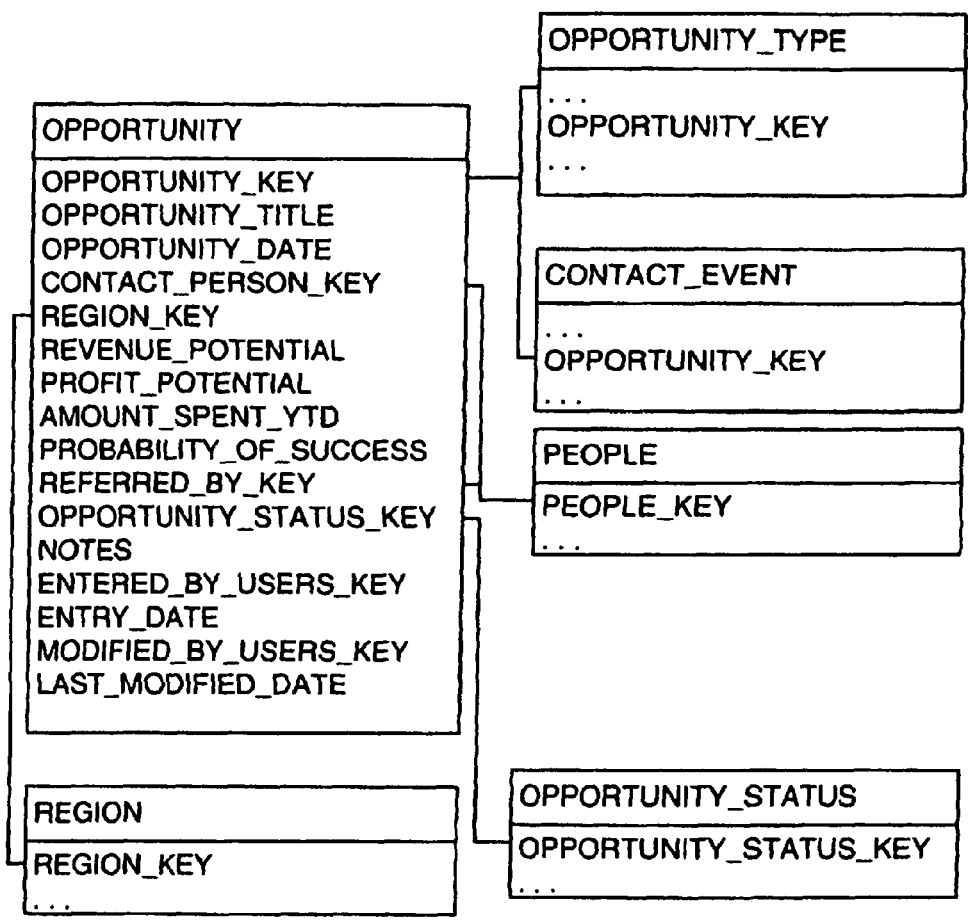
Figure 5L:
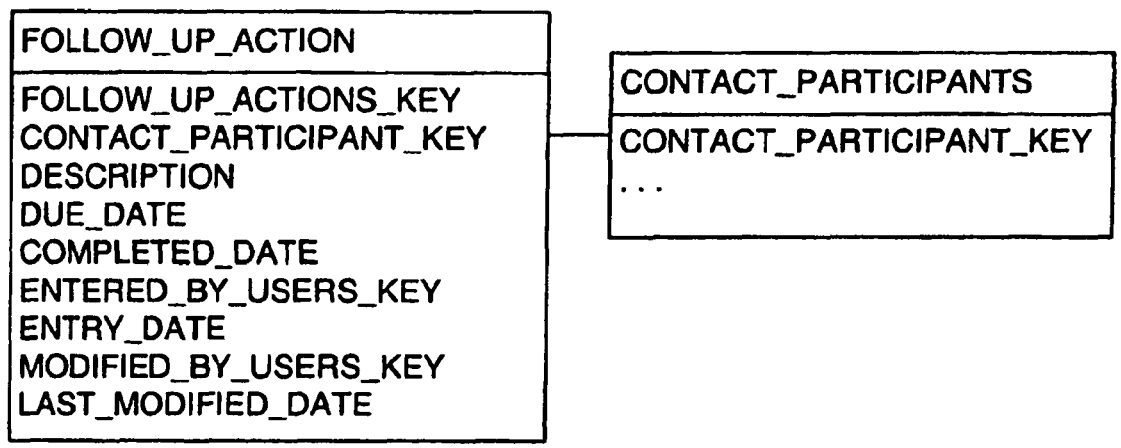
Figure 5M:
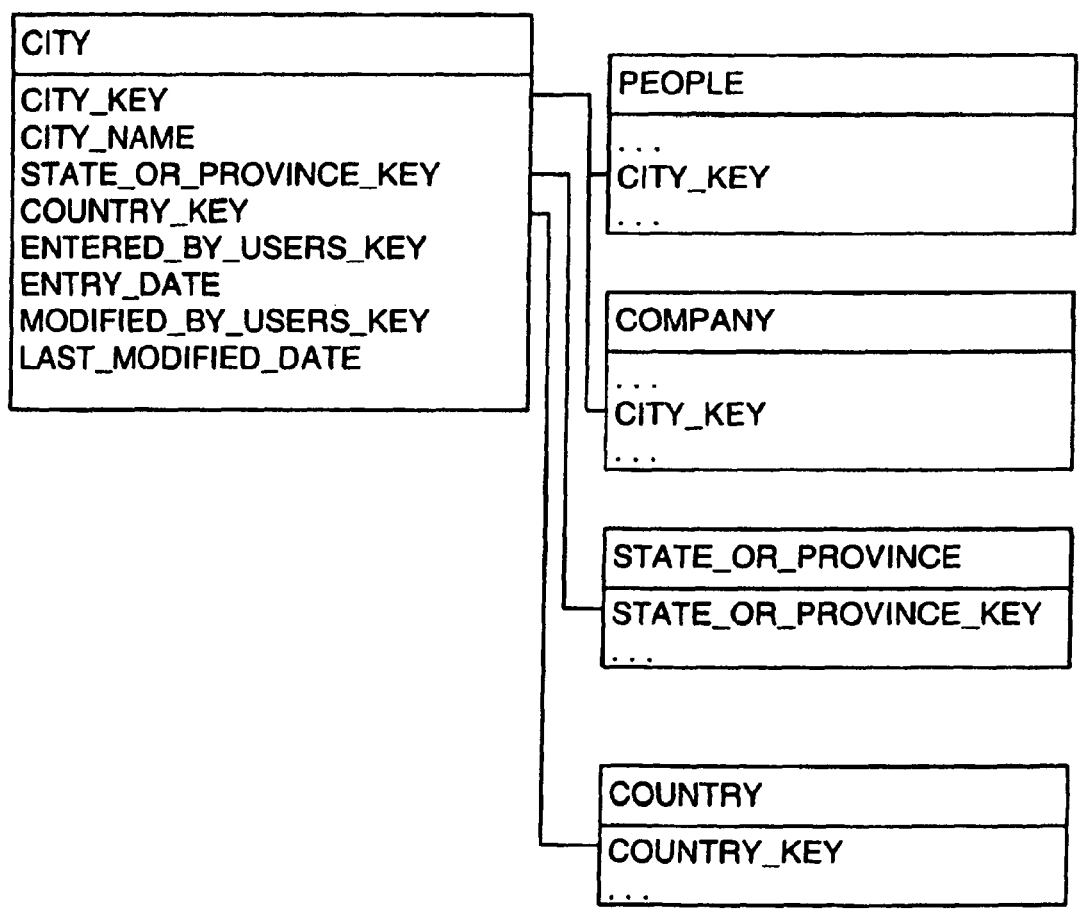
Figure 5:
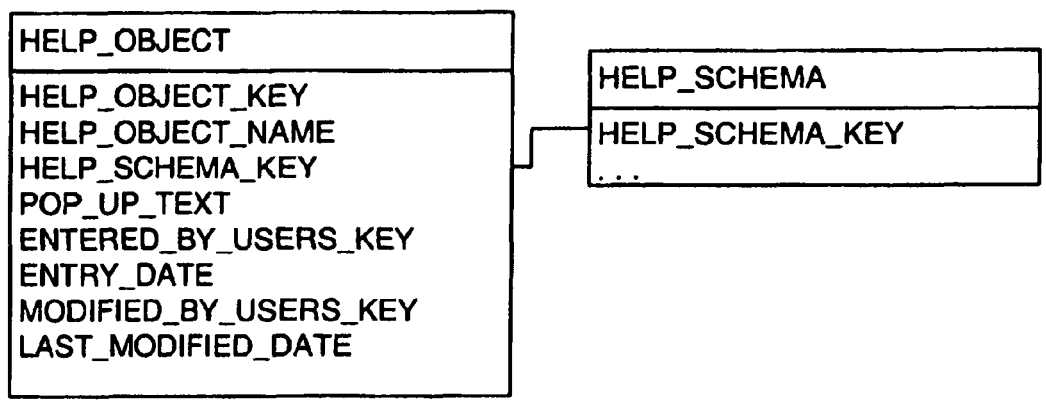
Figure 50:
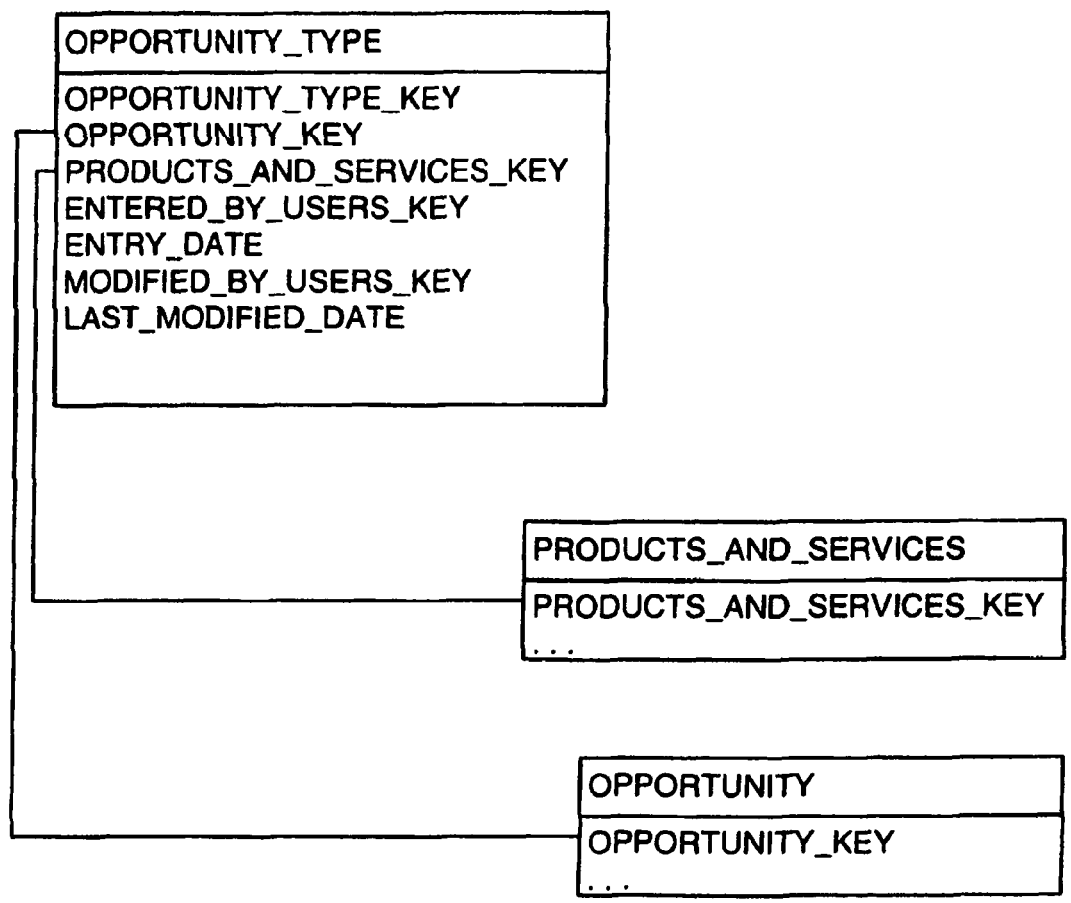
Figure 5P:
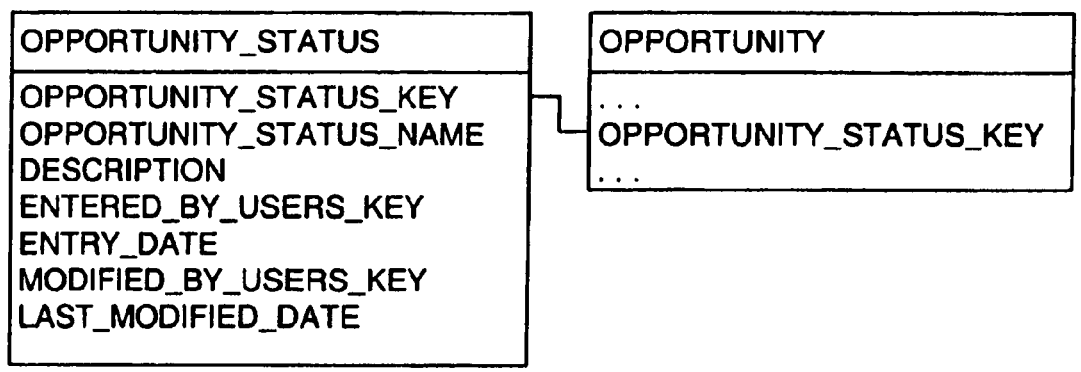
Figure 5Q:
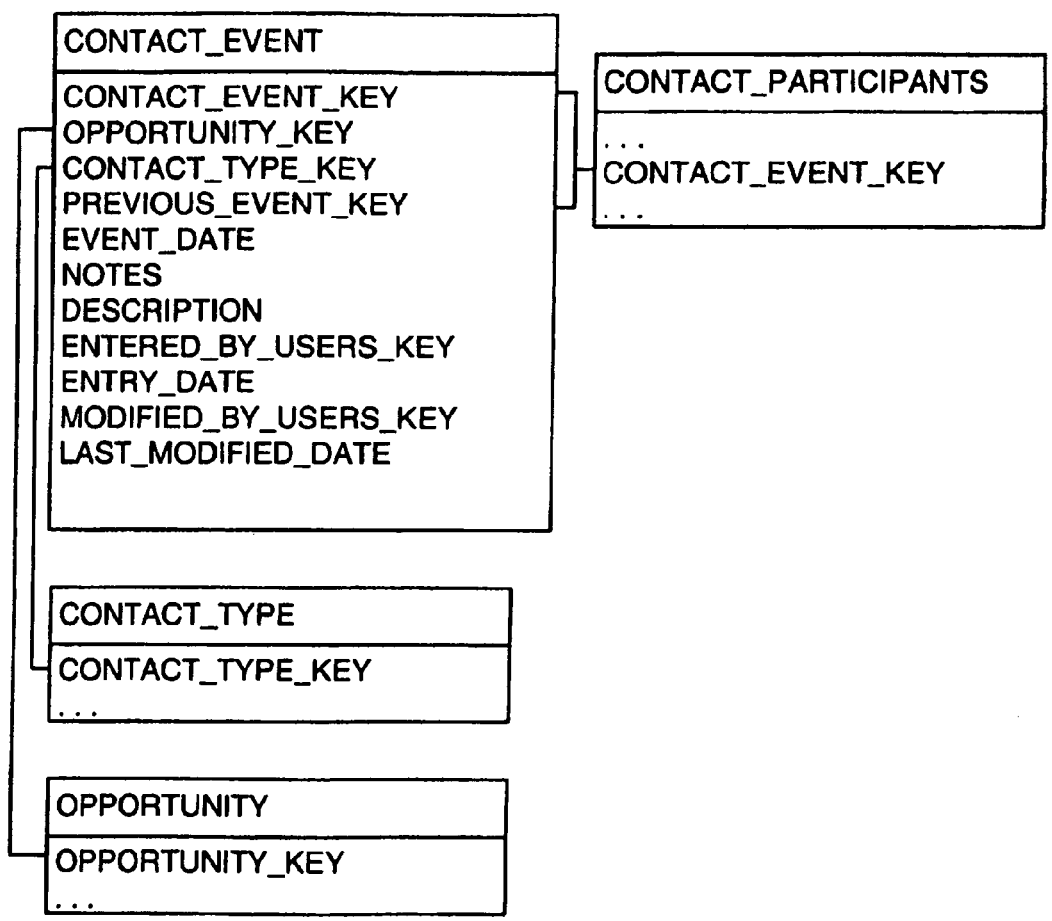
Figure 5R:
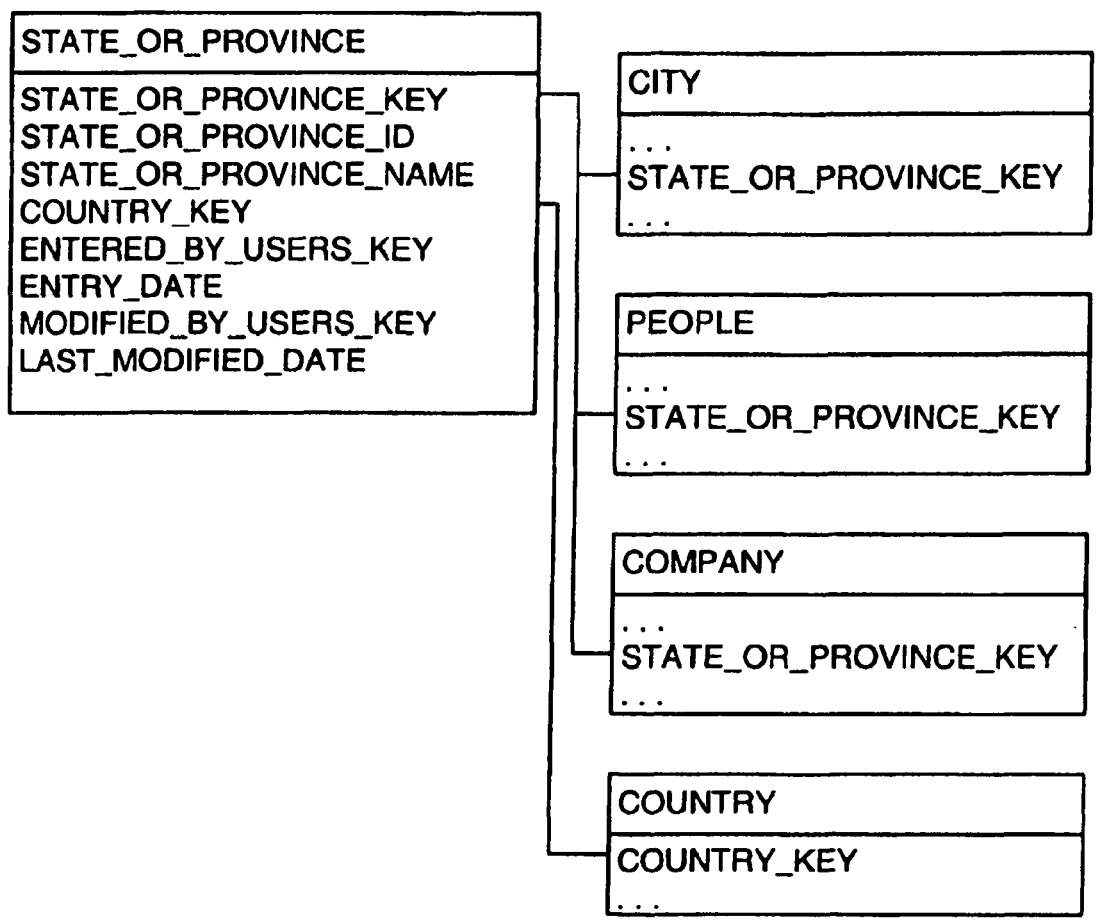
Figure 5S:
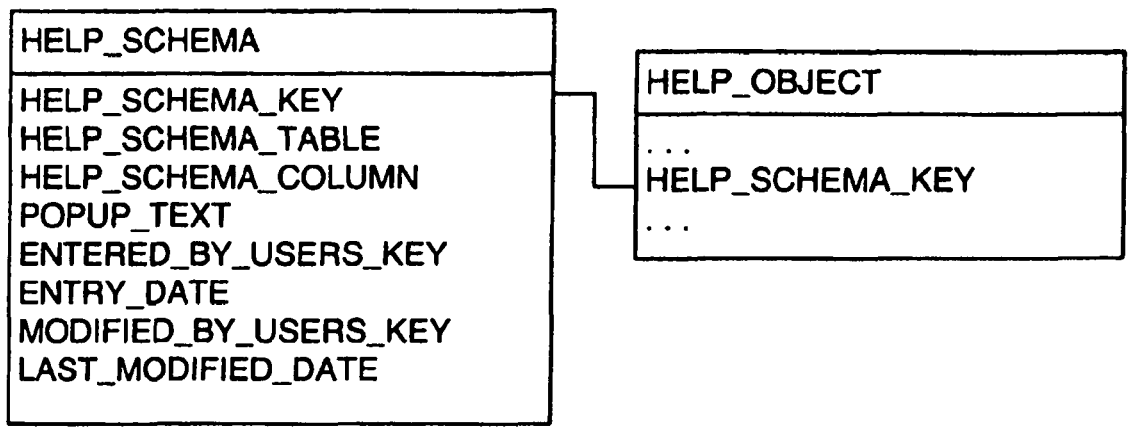
Figure 5T:
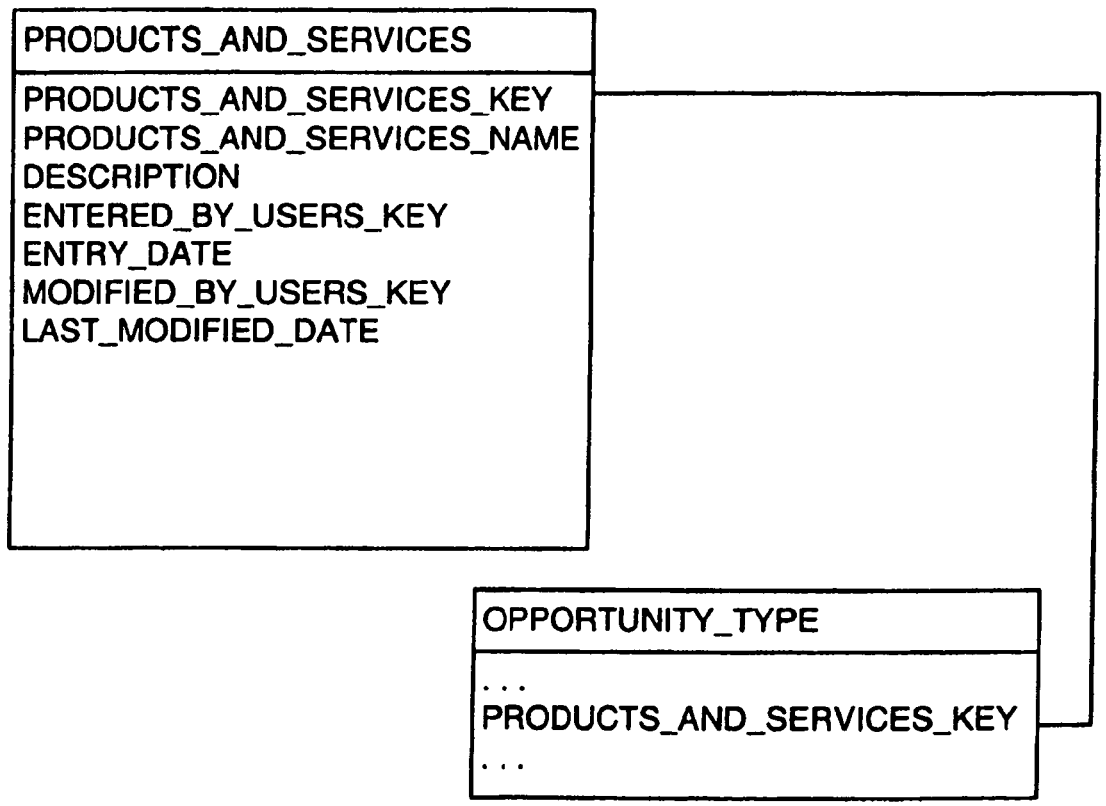
Figure 5U:
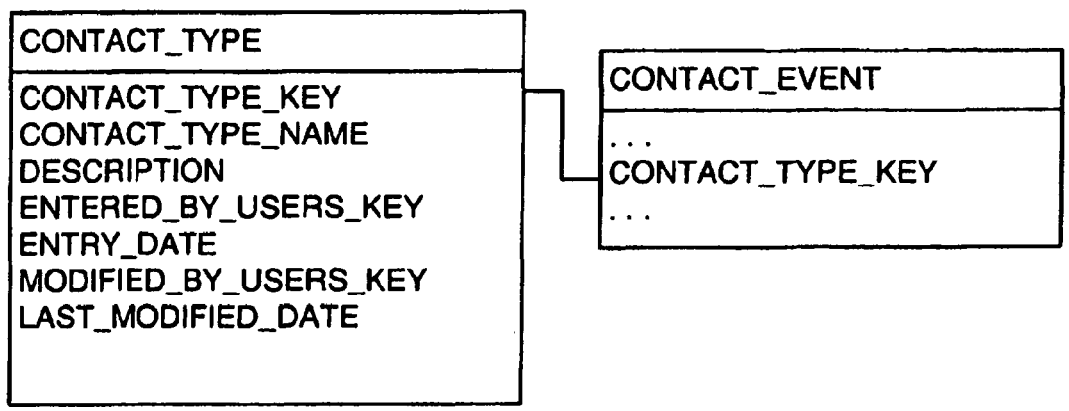
Figure 5V:
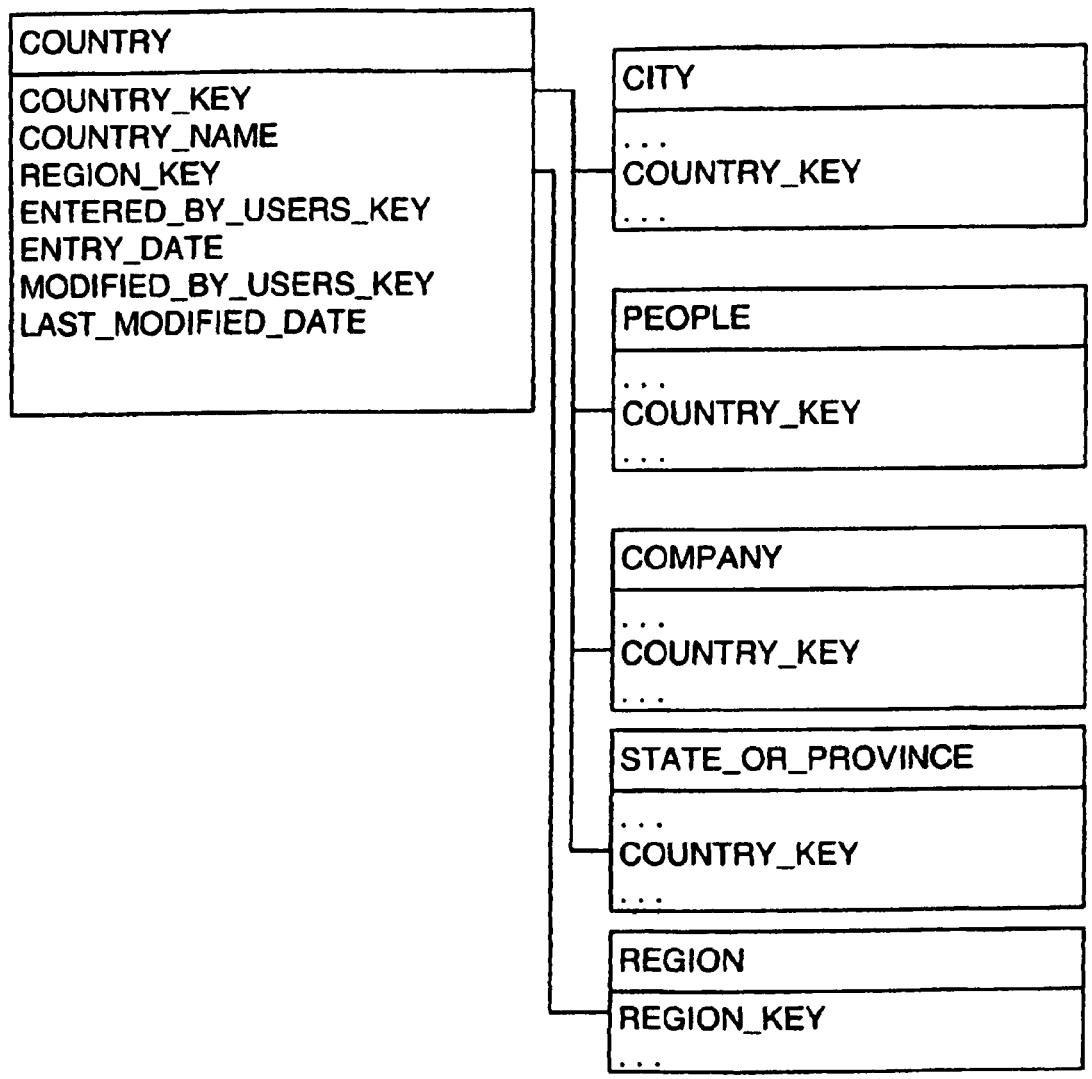
Figure 5W:
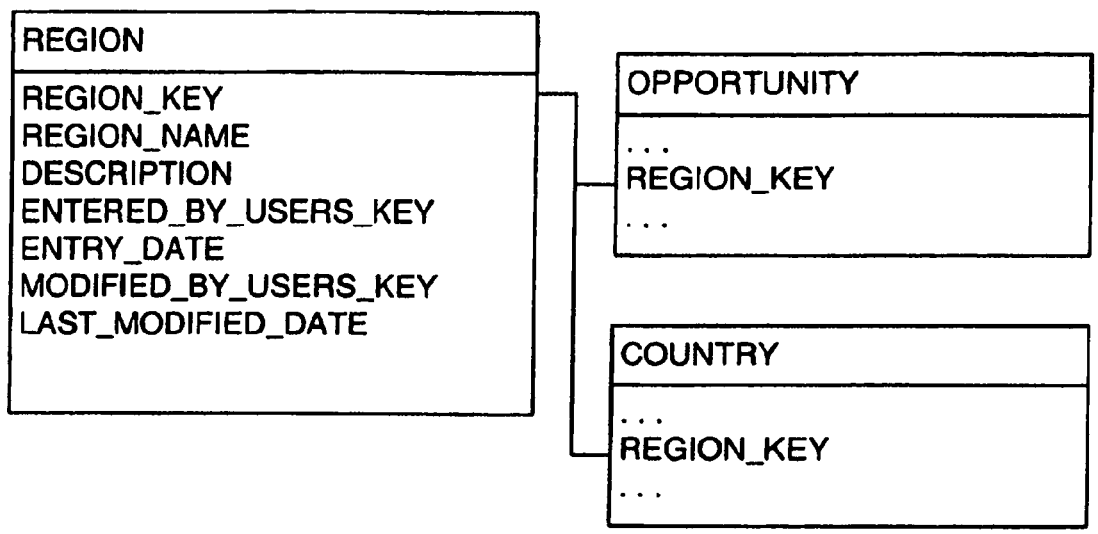

In addition, the complete source code for the reference implementation, and scripts for creating the reference demonstration schema (and demonstrating the extended back-end annotational methods employed) are set forth in the computer program listing appendix (which has been incorporated herein by reference as stated above).

DETAILED DESCRIPTION

The detailed description set forth below is intended to describe various exemplary configurations of the subject technology and is not intended to represent the only configurations in which the subject technology may be practiced. The appended drawings are incorporated herein and constitute a part of the detailed description. The description includes specific details for the purpose of providing a thorough understanding of the subject technology. Numbered lists, as used throughout the description, are meant only to convey grouping and hierarchy among related items, and should not be construed to imply any sequential or ordinal significance. Applicant believes that the features and functional characteristics of the subject technology reflect novel and nonobvious advances over the prior art, and the implementations to achieve the specified features that function in the manner described herein are not limited to the specific details set forth herein.

One embodiment of the disclosed subject matter (the "exemplary embodiment"), as illustrated in FIGS. 1 through 9E, corresponds in most respects to an implementation of this subject matter being developed under the trademark SCHEMALIVE™ which is herein referred to as the "reference implementation." A working and substantially refined embodiment of this subject matter, in the versions in which it existed on the effective filing dates of this disclosure, is further represented substantially in full by the reference-implementation source code files, documentation and scripts in the appendices accompanying and incorporated by reference into this application, as further described in the text that follows. Furthermore, the exemplary embodiment as disclosed herein also includes, in addition, some further developments that have not as yet been rendered in the reference implementation as of said effective filing dates, but which are described herein in detail and thereby constructively reduced to practice.

As can be more fully appreciated by studying the accompanying source code, the exemplary embodiment operates in accordance with a comprehensive and formalized paradigm for presenting a(n end-)user interface to any arbitrarily large or complex relational database schema (or "data model"), as represented via generally accepted data-modeling conventions (comprising the explicit declaration of any cross-table "referential integrity" [RI] constraints, and full exploitation of available native-RDBMS datatype- and constraint-attribute declaration mechanisms) and instantiated within a commercial-grade SQL RDBMS engine (Oracle8i, for example, in the reference implementation). The paradigm encompasses:

1) A set of "modes" for interacting with a(ny) given database table (which modes, taken together, cover all desired end-user operations which may be effected upon such tables), and a corresponding display format ("screen" or "window" architecture) for each mode. These modes comprise:
   1.1) BROWSE (full or filtered, possibly context-constrained) (see FIG. 1)
   1.2) SEARCH (new or revised, full or context-constrained) (see FIG. 2)
   1.3) EDIT (full or context-constrained) (see FIG. 3)
   1.4) ADD (full or context-constrained) (see FIG. 4)
   Certain key screen elements for navigation control/support are shared across all of these displays (see FIGS. 7-8):
   1.5) A TITLE BAR 712, 814, which indicates current mode, current table, context-constraint (if any), and filter indicator (if search-filter is in effect)
   1.6) A TABLE-NAVIGATION HEADER 702, 802, which provides direct "random access" to any system table, in either Browse or Search mode, via either a full (drop-down) list of all (available) system tables or a short list of (clickable) "quick links" to key tables. Use of this header will also reset (and abandon) any nested stack-contexts in effect
   1.7) A CONTEXT-STACK DISPLAY 704, 804, which indicates the active table and mode at each level in the context stack (described below), and also allows direct navigation ("pop-up") to any suspended ("higher") stack-level (with abandonment of all lower levels)
   1.8) A MODE-NAVIGATION BAR 710, 812, which allows the user to move amongst the various available mode displays for the current working table (or "stack level"). The list of available modes varies, dynamically, according to both the user's access rights (described below) and the current state of the working session (i.e., whether a search-filter is currently in effect). The full list of possible mode-navigation options is:
   FULL BROWSE, FILTERED BROWSE, NEW SEARCH, REVISED SEARCH, and ADD. Note that FILTERED BROWSE and REVISED SEARCH appear only when a search-filter is currently in effect; if so, the former restores a Browse-mode display with the most recent filter and scroll-position, while the latter pre-populates a Search-mode display with the current filter parameters
   1.9) Additional MODE-NAVIGATION 706 to allow "edit mode" for a single table record SCROLL NAVIGATION 708 allowing a(n end) user to navigate through all the records in a table and also allowing the user to dynamically change the number of records contained in the webpage displayed (i.e., dynamic page-sizing) HOT LINK 806 for "drill-down" to cross-reference table (e.g., in the embodiment shown in FIG. 8, "Country") HOT LINK 808 for "drill -down" to master-detail table (e.g., in the embodiment shown in FIG. 8, "City") CROSS-REFERENCE FIELD 810 to generate drop-down lists of available foreign-key values (with automatic correlation to display-name labels) FIELD 811 for free-form text entry, to provide automatic client-side data validation according to back-end datatype (for edit/add mode only) SUBMIT BUTTON 816 commits changes, and executes appropriate mode-switch (and stack-context return, if appropriate)
   Note that, although not shown in the reference implementation, DELETE capability is also readily incorporated—as either (or both) true record-removal from the underlying table, and/or record "flagging" for UI suppression (with continued underlying table record retention)—simply by adding (according to the user's access rights, potentially) another pushbutton within the Edit-mode display
2) A set of rules and methods for moving among the modes (and, hence, displays) for a given table (see "mode navigation" in FIG. 7), comprising:
   2.1) Explicit (manual) mode-selection via the mode-navigation bar
   2.2) Browse-to-Edit mode-transition for a specific record, by clicking on a Browse -row's leftmost-column "row label" link
   2.3) Implicit return-to-Browse transitions from other modes:

2.3.1) From Edit mode, upon record commit (UPDATE pushbutton)

2.3.2) From Add-mode, upon record commit (ADD pushbutton), with optional override via an on-screen checkbox setting which "locks" user into Add mode for the current table until checkbox is cleared, or until user explicitly navigates away 2.3.3) From Search mode, upon filter commit (SEARCH pushbutton), with optional override via an on-screen checkbox setting which enables direct Search-to-Edit transitions for single-row result-sets, provided user has requisite edit rights. In the reference implementation, this checkbox setting is session-persistent (that is, it remains in effect until the user's session terminates, so long as the user does not explicitly turn it off); it could as easily be made "sticky" to a variety of degrees—lasting for only a single search, for a single-stack context session, or even across system sessions (via database stored user "preferences")

Figure 6:
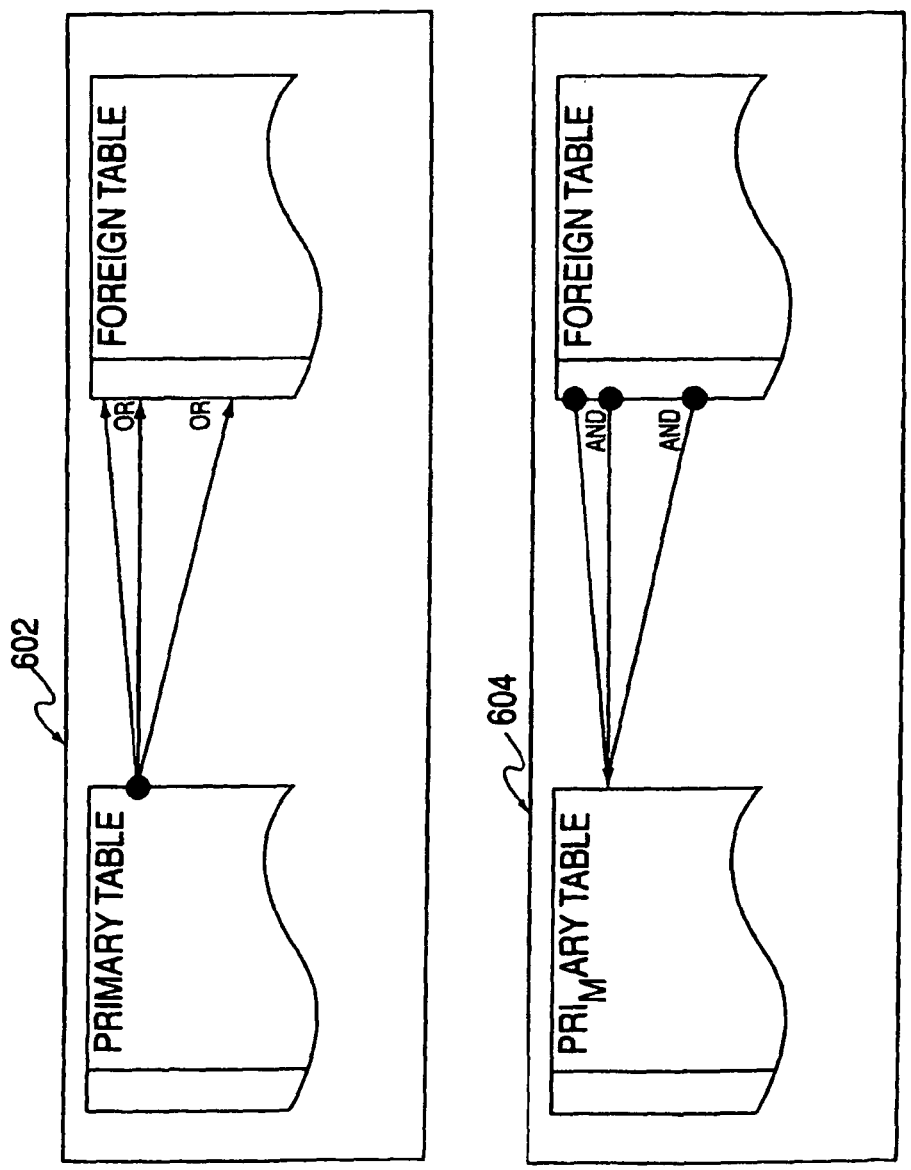
FIG. 6 is a diagram of the relationship types comprised in the paradigm of the present disclosure.
Figure 8:
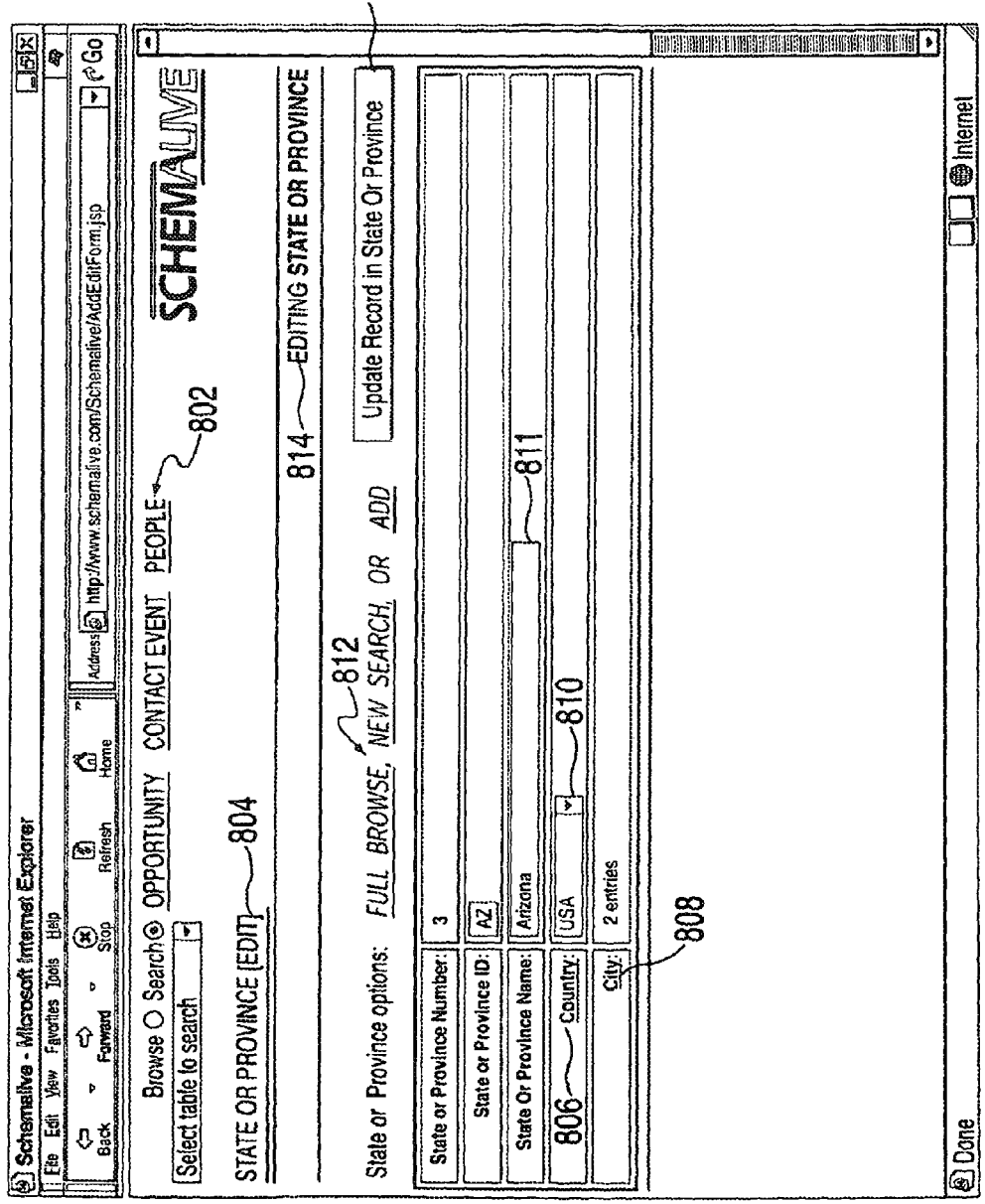
FIG. 8 is an annotated screen dump showing the active elements in an "edit" "add" or "search" mode display.

3) A set of "relationship types" between individual database tables (which types, taken together, cover all desired connections between any two tables), and a corresponding UI convention for representing each type of relationship "in-place" within the (single -table) mode displays. As shown in FIG. 6, these "relationship types" comprise:

3.1) CROSS-REFERENCE 602 (a.k.a. "foreign key" or "FK")—single primary -table record keeps pointer to any single foreign-table record 3.2) MASTER/DETAIL 604 (a.k.a. "parent/child" or "one-to-many")—multiple foreign-table records keep pointers to single primary-table record 4) A set of rules and methods both for extending the representation of any single table (according to its relationships to other tables) (FIGS. 7 and 8), and for managing (and navigating across) these relationships (comprising the resolution, display, and manipulation of cross-referenced elements within a primary table's display context, and the creation or revision of related-table information within the context of a primary table by "drilling down" to a secondary table, constraining the "working context" of that secondary table as necessary, and "passing back" relevant changes to the primary-table context) (see FIG. 9). Said rules and methods comprise:

4.1) Foreign-key fields occurring within a table—that is, fields which contain "keys" that uniquely identify cross referenced records from secondary (a.k.a. "foreign", or "referenced") tables—are automatically "resolved" for display purposes, so as to substitute a corresponding (and, presumably, more meaningful) "name" field from the foreign table record (in lieu of the key value itself —which, per generally accepted data modeling conventions, is generally intentionally devoid of intrinsic meaning):

4.1.1) The paradigm specifies a "default" behavior for determining this name field within the foreign table record, based (optionally) upon a combination of field-naming conventions, field datatype (i.e., character data), field constraints (i.e., unique values), and/or order of appearance within the table definition (i.e., first non primary key field meeting other requirements)

4.1.2) In the reference implementation, this field is the first one whose name ends with "_NAME" —or, in special case handling for tables containing "LAST_NAME", "FIRST_NAME", and "MIDDLE_NAME" columns, a composite "Last, First Middle" value. Additional special case processing supports successive cross referencing through multiple tables until a "_NAME" field is discovered, if (and only if) intervening tables include unique value constrained FK columns. If no name field can be resolved, the UI displays the actual key values (that is, the primary key values from the foreign table) themselves 4.1.3) Alternatively, the rules for determining the name field can themselves be made "soft"—that is, specified once (globally) by a system administrator, and used thereafter to drive all (default) name-field constructions. (See the discussion of naming conventions and annotational methods, below.)

4.1.4) The default behavior for name field resolution can also be overridden with (either or both) "global" and/or "local" custom name definitions for specific tables, as described below (within the discussion of extensions to, and customization of, the baseline UI paradigm)

4.1.5) Auto-resolution of display-names applies to both Browse-mode cells (where a single display-name is derived and substituted for a given foreign-key value), and Add/Edit/Search form-fields (where a dropdown list includes the display-names for all foreign-table records, and UI actions on this list are correlated to the underlying keys)

4.2) For "master" tables in any master/detail relationships (as specified via the core complement of naming conventions and annotational methods, discussed below), record displays incorporate a "pseudo-field" for each associated detail-table, which indicates the number (i.e., count) of corresponding detail (or "child") records belonging to the displayed master (or "parent") record:

4.2.1) In the reference implementation, the master/detail pseudo-fields are included only for Edit-mode displays (so as to allow for streamlined system logic and, therefore, improved run time performance)

Figure 9B:
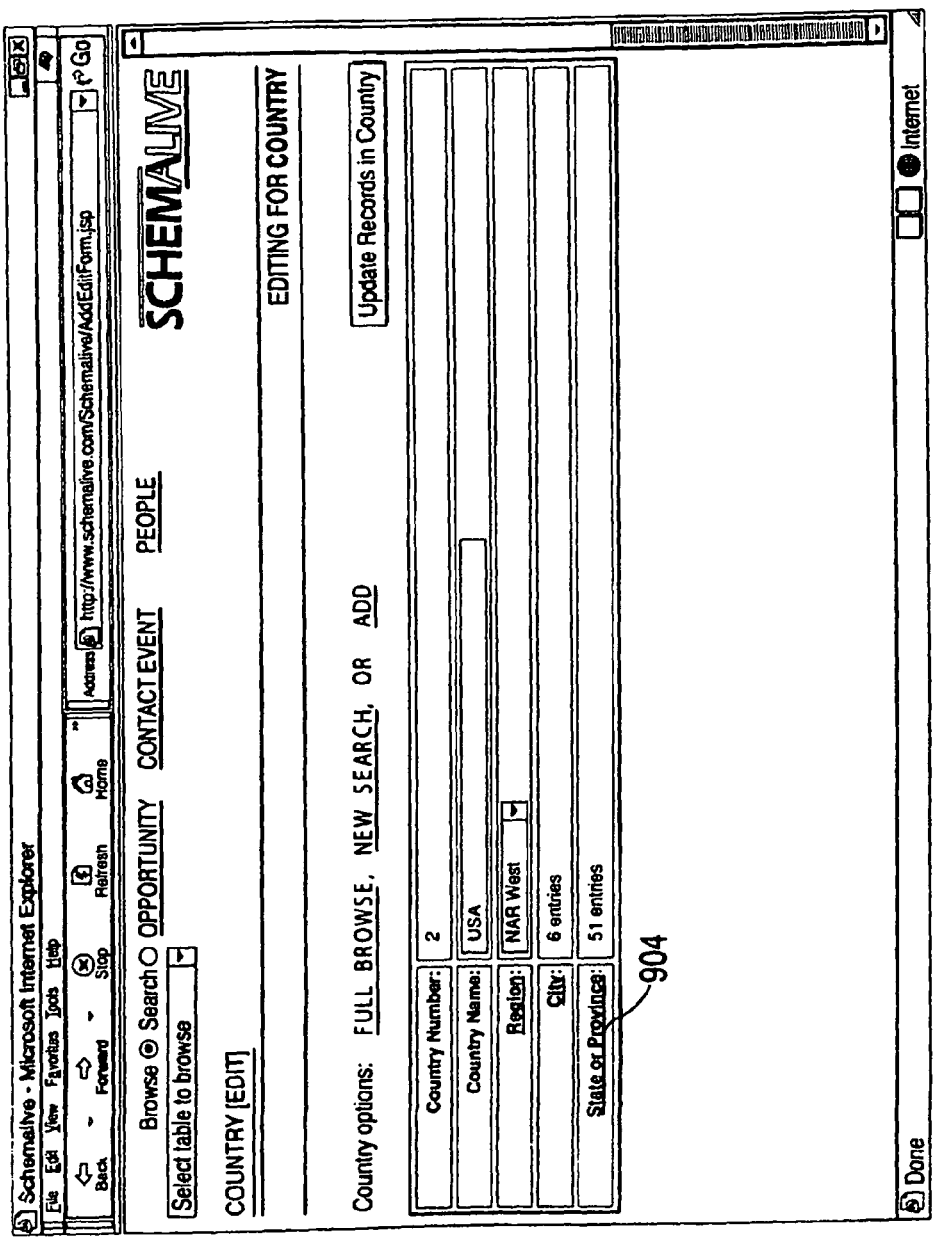

4.2.2) Alternatively, these pseudo fields can also be (and have been, in alternate implementations) readily incorporated into the Browse-, Search-, and Add-mode displays, at the cost of added complexity in supporting views (i.e., correlated-subqueries for Browse-mode displays) and state -management logic (i.e., transitioning to Edit mode for not-yet-completed Add-mode transactions before allowing navigation to associated detail-table contexts where the user might add dependent "child" records), and the attendant performance implications 4.3) To enhance the run-time performance of Browse-mode displays, the system automatically generates a corresponding back-end "view" for every table, which:

4.3.1) Resolves all FK displays, per above 4.3.2) Incorporates any and all default-behavior overrides 4.3.3) By rendering (and, subsequently, executing) this view in the native language of the underlying RDBMS (i.e., SQL), effectively "projects" this extended representation of the table (according to its relationships to other tables) from the software (where it is derived) back into the RDBMS environment itself, for significantly improved rendering performance and reduced network- and application-server loading See the discussion, below, of rules and methods for traversing/navigating the context stack, for more information on the creation and revision of related-table information within the context of a primary table 5) A set of user-interface conventions for signaling other (non-referential) data constraints, and for enforcing adherence to same, across all Add/Edit/Search forms, comprising:
  5.1) For "required" fields (i.e., underlying table-columns with "NOT NULL" CHECK constraints, in the reference implementation), the corresponding data -field labels (descriptive names appearing to the left of the entry areas) are displayed in boldface (see FIG. 3)
  5.2) The physical width of text-entry (vs. dropdown) fields—as well as the maximum permitted length for entered text—is driven directly by the specified data-length of the underlying table columns.
  5.3) For text fields whose length-limit exceeds a certain threshold (globally defined, in the reference implementation, though potentially user-preference configurable), the on-screen field is presented as a multiline, vertically scrollable control with multiple-row visibility, rather than the default single-row (and non-scrollable) entry field. (In the reference implementation, this is an HTML "TEXTAREA" rather than an "INPUT" field.) Note that this functionality is also applied to Browse-mode table cells, so that occasional lengthy cell-entries are made scrollable (and therefore don't distort an otherwise reasonable table-layout)
  5.4) Required fields (per above)—along with numeric, date, and text fields (whose length might exceed the threshold specification described above)—also generate automatic validation logic which prompts the user to correct any erroneous or problematic data-entries locally—that is, on the end-user's (or "client") computer, before any communication with the database takes place. In the reference implementation (which is web-based), this manifests as client -side Javascript routines—along with all requisite invocation logic, automatically embedded into the appropriate entry-field specifications—which are delivered along with the (system-generated) web-page. Failed validation (upon field-exit and/or at page-submission time, depending on the type of validation) puts the "focus" back into the corresponding problem-field (or the first of several), highlights ("selects") the entire field contents, and displays an informational pop-up dialog box explaining the problem. This effectively "projects" constraint-awareness from the back-end RDBMS (where the constraints are defined) into the front-end client, for significantly improved performance and reduced network- and database-loading
6) A hierarchical "context stack" for maintaining (and suspending) the working state of a particular table (comprising selected record, display mode, pending form-field entries, in-effect search-filter parameters, Browse-mode scroll position, and any filter constraints imposed from above stack contexts) while "drilling down" across relationships to work with related information (in a possibly constrained working context) and returning relevant changes to the parent-context table, and a corresponding UI convention for displaying and navigating this stack
7) A set of rules and methods for traversing/navigating the context stack, among them:
  7.1) The user is always working at the "bottom" (or rightmost, within the stack display) level of the context stack. Typically (i.e., at initial system entry, or following direct access via the table-navigation header), there is only one level in the stack (that is, no nested or suspended stack contexts are in effect)
  7.2) Changing modes for a given table (or "stack context") is referred to as "lateral" or "horizontal" movement (see, e.g., FIG. 7) e.g., in the embodiment shown in FIG. 9A, a click on a mode transition button 902 (shown in this example as "19") allows for a "lateral" or "horizontal" mode transition to "edit" (shown in FIG. 9B)
  7.3) Traversing relationships (either cross-reference or master/detail) is referred to as "drill-down" (and, upon return, "pop-up") or "vertical" movement across tables (and nested stack contexts) (see, e.g., FIG. 9) e.g., in the embodiment shown in FIG. 9B, a click on a "drill-down" button 904 (shown in this example as "State or Province") allows for a "drill-down" to related detail records (shown in FIG. 9C)
  7.4) Vertical navigation therefore always increases or decreases the "stack depth", while horizontal navigation merely alters the "view" of the current table—affecting only the current (bottom-most) stack level
  7.5) Drill-downs are supported by enabling "hot-linked" (or "clickable") labels for the related data fields in the primary table (stack context) (see FIGS. 9B and C)
  7.6) A drill-down traversal "suspends" the above stack context
  7.7) Drilling-down across a cross-reference relationship imposes no "context constraints" on the lower stack context, while drilling-down across a master/detail link constrains the subordinate table to only those records "belonging" to the above stack-context table-record (see, e.g., FIG. 9C), such that:
    7.7.1) A superseding filter is applied to all detail-table mode displays, separate from (and invisible to) any lower-context search-filters which may subsequently be applied by the user
    7.7.2) Even a "full browse" request (with no explicit search-filter) therefore shows only related child-records
    7.7.3) The title bar 912, 920, 926 (across all modes) separately indicates the subordinate table context constraint with a "FOR<PARENT-TABLE><PARENT RECORD>"-style suffix (vs. the "(FILTERED)" suffix, which indicates a user applied search-filter). (For example, Title Bar 912 of FIG. 9C shows constraint from above stack context, Title Bar 920 of FIG. 9D still shows the context-constraint, and Title Bar 926 of FIG. 9E reflects both the above context-constraint and the presence of a current-context "filter.")
    7.7.4) In Edit mode (for a specific child-table record), the user is prevented from changing the datum that links the child record to its parent record, by filtering the dropdown-list for the corresponding FK field so that it contains only the parent-record value
  7.8) Full lateral movement (mode-switching) is supported within the subordinate stack context
User can "return" (ascend the context stack) either by "committing" a lower-level action (a database edit or addition), or by abandoning the subordinate stack context (via the context -stack display or table-navigation header). In the former case, committed changes are automatically propagated to the above stack context and displayed in the corresponding mode display (i.e., "results" are "returned") unless the user has enabled POWER ADD in the lower
  7.9) context; in the latter case, any pending changes are abandoned, and the above stack context is restored exactly as originally suspended 7.10) Cross-reference drill-downs are "context sensitive" to the parent-field status: A drill-down from a blank parent-field enters the subordinate stack context in "Add" mode, while a drill-down from a non-blank parent-field enters the subordinate stack context in "Edit" mode for the already-selected (cross-referenced) secondary-table record. Nevertheless, the default drill-down mode can be "overridden" (that is, abandoned) via a lateral or horizontal mode-switch in the lower stack context. In any event (and regardless of intervening actions), a "committed" return from a subordinate stack context will always properly update the parent record 7.11) Master/detail drill-downs generally enter the subordinate stack context in "Browse" mode, although this behavior can be modified as a "business rule" via the described customization mechanisms (see FIG. 9 and the CreateSchema.sql script)

7.12) The user may always return directly to any suspended ("higher") stack-context by clicking on the corresponding stack-display entry 908. Doing so effectively "pops" the stack, and abandons any work-in-progress in all lower contexts. (For the embodiment shown in FIG. 9C, for example, clicking on "COUNTRY[EDIT]" abandons the current stack content and restores the above context exactly as originally suspended, i.e., as shown in FIG. 9B.)

Figure 9D:
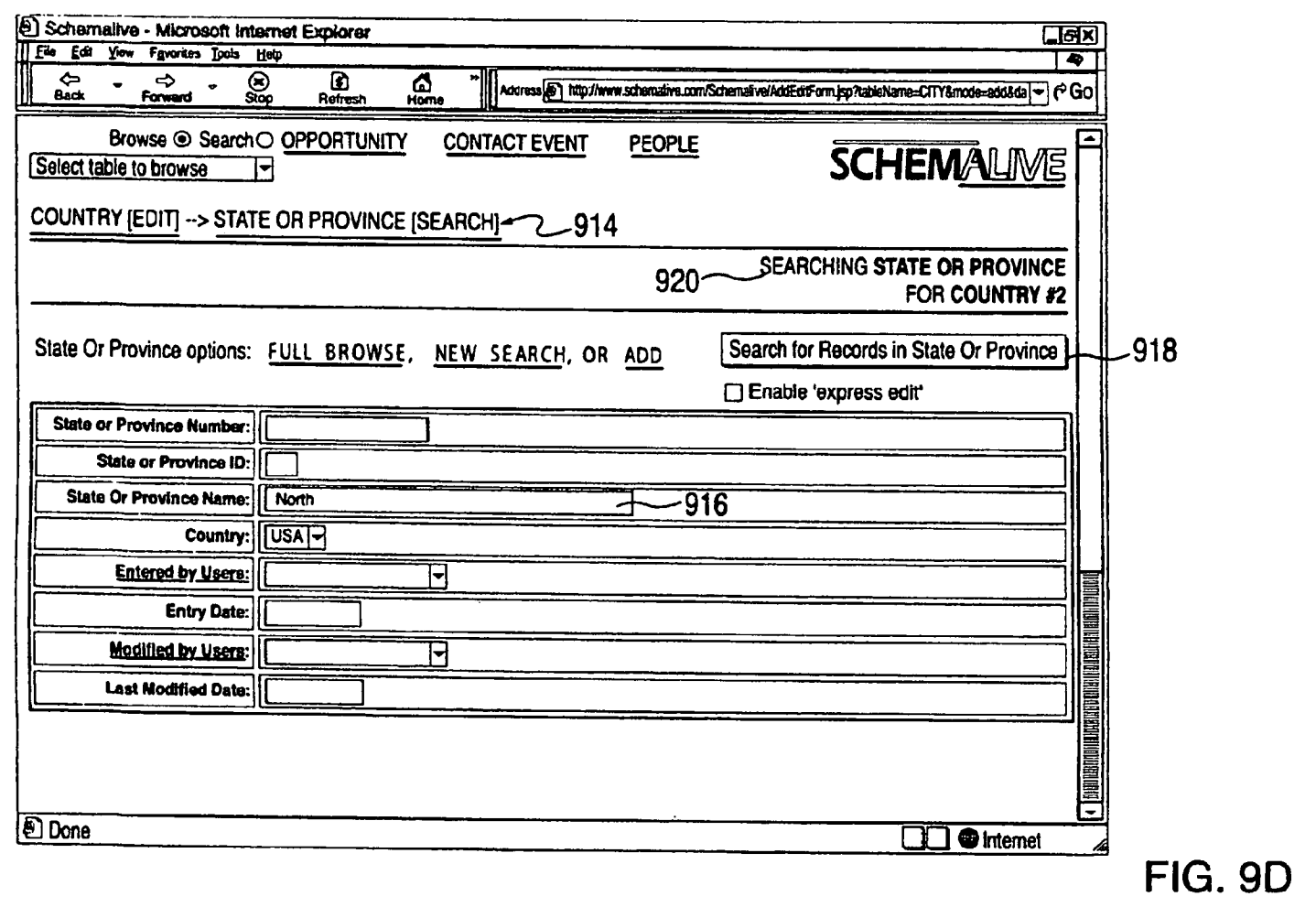

7.13) The user may further search or filter records at the subordinate stack context level by clicking on the "New Search" link in Mode Navigation 910. In the embodiment shown, the further search page (see, e.g., FIG. 9D) comprises the following screen elements:

7.13.1) STACK DISPLAY 914 which still shows the nested contexts 7.13.2) SEARCH FIELD 916 In the embodiment shown in FIG. 9D, search field 916 is free-form text entry, wherein the text "North" adds an additional "filter," requiring that "State or Province Name" begins with "NORTH".

Figure 9E:
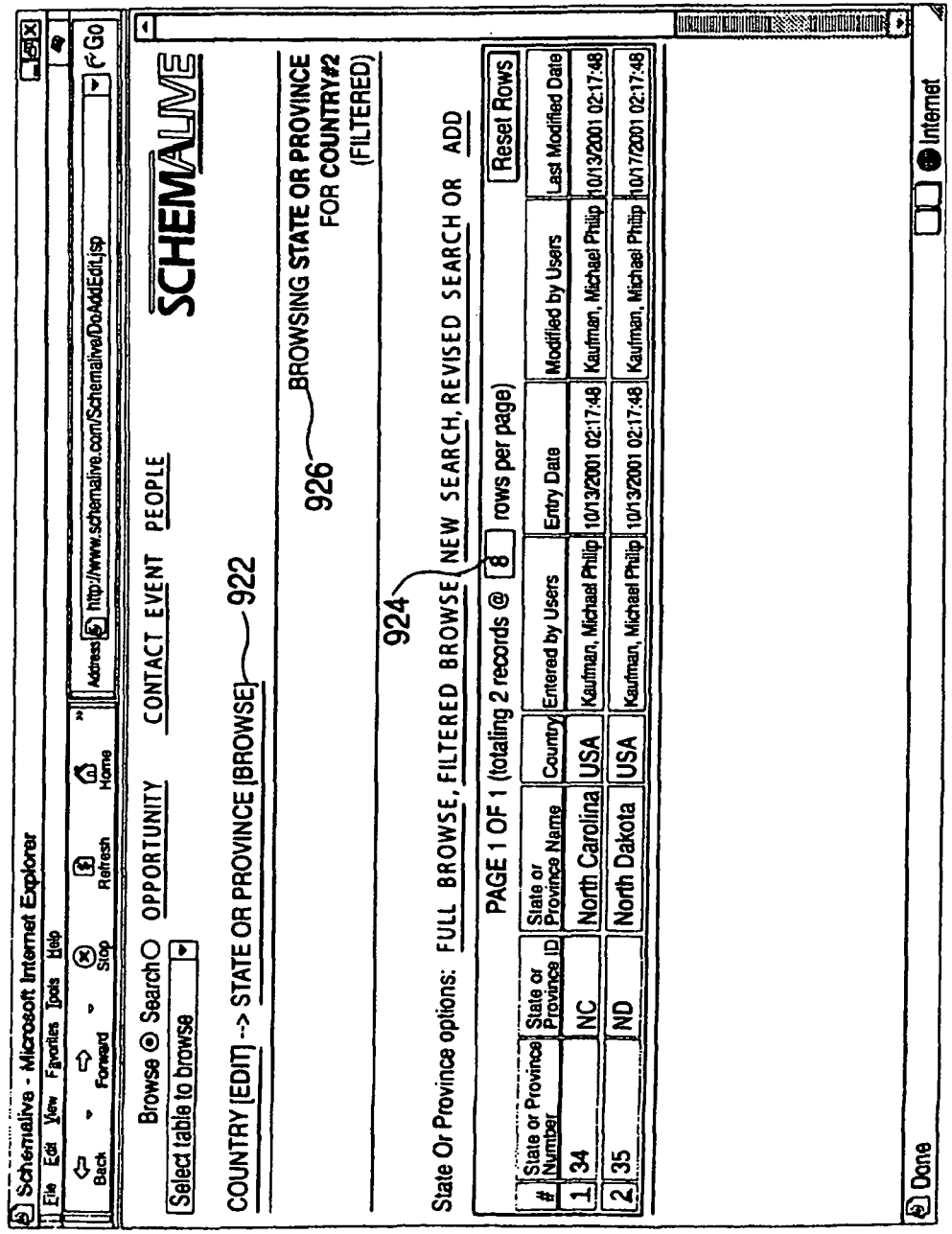

7.13.3) TITLE BAR 920 which still shows the context constraint 7.13.4) SEARCH INITIATING BUTTON 918 which, when clicked, initiates a "lateral" or "horizontal" mode transition to (filtered) "browse" mode (see, e.g., FIG. 9E). The embodiment shown in FIG. 9E comprises the following screen elements:

7.13.5) stack display 922 which still shows nested contexts 7.13.6) TITLE BAR 926 which now reflects both the above context-restraint (as shown, e.g., in FIG. 9D) and the presence of current-context "filter"

7.13.7) SCROLL NAVIGATION 924 allowing the user to navigate through all the records in a table and also allowing the user to dynamically change the number of records displayed. In the embodiment shown in FIG. 9E, manipulating the Scroll Navigation 924 has no effect because all the records under the current constraint and filter are displayed on one page, since only two rows now meet both parent-context constraint and the current "filter."

8) Integrated, group-based security mediation, "granular" both in scope (i.e., global-, table-, row-, or field-level) and by task (browse, edit, add, delete), which dynamically adjusts all system displays (throughout the entire UI paradigm) according to the user's granted access-rights, such that prohibited options are always hidden Note, finally, that while the exemplary embodiment operates according to the particular paradigm described above, it remains possible to effect alternate paradigms which would nevertheless be consistent with the basic principles of this disclosure. For instance, it may be desirable in some instances to realize instead a "modeless" UI paradigm, such that all end-user activities (browsing, searching, editing, adding) are supported by a single, unified display context (such as a "spreadsheet" display).

Software (written in Java and JSP, in the reference implementation) automatically and dynamically ("on-the-fly") generates a fully functional UI system (written in HTML, Javascript, and HTTP/CGI in the reference implementation) based upon, and connected directly to, the underlying data model (as instantiated within the RDBMS), and in full conformance to the described paradigm. In order to generate the UI, the RDBMS is first interrogated or scanned by this software, applying a body of rules to interpret the data model (comprising its tables; their column-complements, datatypes, and constraints; and relationships across the tables), and to correlate same to the UI paradigm (either "on-the-fly", or by building an in-memory representation, or "cache", of said data model, and by automatically deriving enhanced back-end "views" of all tables, which are consistent with the paradigm and which, further, coherently incorporate any and all extensions, customizations, adaptations, or over-rides which may have been specified as described below). In the reference implementation, the results of this RDBMS interrogation are used to construct an internal object representation of the schema, conforming to a graph in which the nodes represent database tables, and the edges represent relationships (i.e., referential integrity links) between these tables. As the UI is rendered for any given database table, this underlying object representation is referenced, and appropriate components for depicting and traversing all cross table links are automatically included in the resulting display.

A core complement of naming conventions and annotational methods (written in XML, in the reference implementation) is used for enhancing and extending the representation of the table structures and relationships (entirely within the back-end representation of the data model, in the reference implementation) so as to more fully support revelation of the schema structure through external interrogation. Said methods consist of "annotations" (or "comments") which are "attached to" (or "associated with") individual tables or table-columns within the back-end RDBMS; in discussing these methods, it is important to note that although there are any number of alternative embodiments for the formatting, storage, and association of such annotations with their corresponding objects—including (but not limited to): formatting as XML-tagged, name/value-paired, or fixed-sequence data; storage within native-RDBMS "comment" fields, application-defined database tables, or external (operating system) disk files; and association via native-RDBMS comment "attachment", explicit object-naming (within the annotations themselves), or pointers or keys (attached to the objects themselves)—the methods ultimately concern the principles by which such embodiments may be designed and applied to illuminating the schema, rather than any particular configuration or embodiment itself. Within the reference implementation, then, the attachment of annotations, as XML-formatted "comments", directly to database objects, should be considered illustrative of, rather than essential to, the methods so described. The core conventions and methods comprise:

1) The indication of column-datatypes not natively (or explicitly) supported by the underlying RDBMS (for example, "binary" or "yes/no" fields in the Oracle8i-based reference implementation) yet subject to special handling within the UI paradigm, via the use of specific object-name suffixes ("_FLAG", in this example)
2) The specification of master/detail relationships between tables (as distinguished from a [reverse-]cross-reference relationship), by associating a table-level annotation with the master (or "parent") table, and indicating both the table name and the parent-referencing FK field for each detail table (see comments in the CreateSchema.sql script)

Following the paradigm, the generated UI comprises all mode displays for all tables, with integrated (-into-the-mode-displays) mechanisms for representing, navigating, and managing relationships across tables (comprising hierarchical context constraint/enforcement, and pass-through/ "pop-up" return, or "propagation", of subordinate-context results). In rendering this UI, the exemplary embodiment applies logic to (re-) convert column- and table -names retrieved through RDBMS interrogation from all-uppercase text, if necessary (as it is with Oracle8i, in the reference implementation) into mixed-case, initial-caps text (where only the first letter of each word—or "token"—is capitalized), and to replace underscore characters with spaces. The case-restoration logic is designed to also consider a list of approved acronyms—or, more generally, "exceptions"—which, when encountered as tokens within object-name strings, are instead cased exactly as they appear in the list. (This could mean all-uppercase, all-lowercase, or any non-conventional mixture of cases, such as "ZIP -code".) This case-exceptions list is provided once, globally, for the entire system, and impacts all table- and column-name references throughout the UI presentation. (In the reference implementation, the list is defined as a string array within a public "CustomCaps" object; this object could in turn be initialized via a disk file, or a special database table.)

The software also constructs and utilizes the above-described hierarchical context stack for maintaining (and suspending) the working state of a particular table (comprising selected record, display mode, pending form-field entries, in-effect search-filter parameters, Browse-mode scroll position, and any filter constraints imposed from above stack contexts) while "drilling down" across relationships to work with related information (in a possibly constrained working context) and returning relevant changes to the parent-context table, and a corresponding UI convention for displaying and navigating this stack (see, e.g., stack display 906 in FIG. 9C, which displays the nested contexts). Note further that, in addition to its core function in supporting nested working contexts (and by virtue of its always being on-screen), the context stack also enables certain ancillary capabilities:

1) Since the current context (or "table-session") always corresponds to the "bottom" of the stack (i.e., the rightmost link in the display), the user can "refresh" his current table-session by clicking on this link. This can be useful, for instance, when the user wishes to "undo" or revert numerous changes made to a current Edit- or Add-mode form (but not yet committed) without having to re-navigate to the current table and record
2) When a system exception (security violation, internal error, etc.) occurs, the resulting error screen also incorporates a stack display. Although the default error-screen behavior is to restart the user's session after a timed delay (and thereby abandon all work in progress), the user will often be able to recover his session by making a selection from the error-page stack display The exemplary embodiment further provides a structured collection of methods, mechanisms, tools, techniques, and facilities for extending, customizing, adapting, or overriding the baseline UI paradigm and software to support non-standard and/or special requirements ("business rules"), comprising:

1) The capability to "override" the default behavior for FK "display-name" resolution with (either or both) "global" and/or "local" custom specifications on how to generate display-names for a given foreign key:
    1.1) Such overrides can be useful, for example, when the foreign (referenced) table lacks a (resolvable) name column; when a composite (multiple-field), treated, or otherwise modified display-name is desired; when the sort-order within display lists should be modified; or when the foreign-table records depend on yet other table-records (foreign, in turn, to the FK-referenced table) for full name construction (for instance, where FKs into a "CITY" table depend in turn on FKs from CITY into a "STATE" table in order to distinguish like-named cities, such as Portland, Oreg. and Portland, Me.)
    1.2) A custom specification consists of an explicit SQL expression that generates key-value/display-name pairs for any and all foreign-table key values
    1.3) Such specifications will automatically propagate throughout the entire UI, including all relevant Browse mode cells and Add/Edit/Search form fields
    1.4) Global display name specifications are associated as table-level annotations (see above) with the referenced foreign table
    1.5) Local specifications are associated instead as column-level annotations with the referencing (foreign-key) column in the base table itself
    1.6) In this way, both "default" (global, or system-wide) and "special-case" (local, or single referencing-table only) custom display-names can be defined for the same foreign table. If a "local" specification is defined for a given FK -column, it will supersede any "global" or "default" specification also defined for the referenced (foreign) table.
    1.7) In the reference implementation, specifications are made via a special XML tag ("<sql>") which is attached to the table or column (for global or local specifications, respectively) as a "comment"
2) Ability to alter the order and visibility of individual table-columns across all mode displays (Browse, Add, Edit, Search) vs. the actual column-complement and -ordering of the associated (underlying) table:
    2.1) This is sometimes desirable in a post production environment, especially when the particular back-end RDBMS product in use makes it impractical or impossible to alter the actual structure of the underlying table once it has been populated with data and is participating in referential integrity relationships with other populated tables
    2.2) A specification consists of a listing of the desired table-columns, in the desired display order (either by name or, alternatively, by ordinal position in the actual underlying table)
    2.3) If a specification is made, then any columns not explicitly included within that specification will be suppressed from the UI mode displays
    2.4) Specifications are associated as table-level annotations with the actual underlying table 2.5) In the reference implementation, specifications are made via a special XML tag ("<columnOrder>") which contains sub tags ("<cl>") indicating the desired columns in order and by name, and is attached to the table as a "comment"

3) Support for composite or "custom views" of multiple-table data which mimic a single base-table. Such a derived (non-table) result-set is typically generated by a "stored query" or "SQL VIEW" within the back-end RDBMS, and nevertheless can be rendered and presented by the UI as if it were an actual single base-table (subject to certain limitations which may be imposed by the underlying RDBMS—particularly, the inability to edit or add "records" for such result-sets, rendering them effectively "read-only")

4) Ability to manually define Search-mode "dropdown fields" (which list the range of possible values for a given column) for such custom views:
    4.1) Because, by its nature, the custom view appears to be an actual table—and therefore obscures the underlying (real) tables on which it is based—the system cannot automatically resolve the referential-integrity (RI) links that would normally serve to identify the appropriate value lists (i.e., foreign-table values)
    4.2) Moreover, the normal value-to-key translations managed by dropdown fields are inappropriate for custom views anyway, since these views actually incorporate the cross-referenced values themselves (rather than foreign keys that point to these values, as base-tables do)
    4.3) To support custom-view dropdown lists that (appear to) behave consistently with the general (actual-table) UI paradigms, then, a manual (explicit) dropdown list specification is made for each corresponding custom-view column
    4.4) A specification identifies the foreign table which contains the dropdown-list values, and the column (either by name or, alternatively, by ordinal position within that table) which supplies the actual values
    4.5) Specifications are associated as column-level annotations with their corresponding custom-view columns
    4.6) In the reference implementation, specifications are made via a special XML tag ("<manualDropDown>") which, in turn, contains sub tags indicating the related foreign-table name ("<foreignTableName>") and key field ("<foreignKeyField>"), and is attached to the corresponding view-column as a "comment"

5) In-place pass-through (drill-down) from custom views to Edit-mode displays for underlying (component) base-table members:
    5.1) Because the "stored queries" or "SQL VIEWs" that underlie custom views are typically non-updateable (according to RDBMS limitations), the usual UI mechanisms for editing data cannot be used with these views. Nevertheless, it is often desirable to provide users with easy access to editing for (at least some of) the data behind the views
    5.2) To enable such editing access, a mechanism is provided to create a (series of) cross-referential link(s) from the individual cells (row-values) in a given column of a Browse-mode display, with each link forwarding the user to a secondary display —most commonly, to an Edit form for the underlying base-table containing that cell's value (although it is, in fact, possible to link -through to any arbitrary table, row, and column, and in any "mode")
    5.3) While such links usually reference the same underlying base-table (and -field) for every row in the column, special-case extension logic can reference different tables for different rows, according to "trigger" or "switching" values from another column in that same display-row
    5.4) A further variation of the mechanism (described below) modifies the behavior of the leftmost-column "row label" links, rather than the interior Browse-mode table-values themselves
    5.5) On-screen, the link appears as a highlighting (in the reference implementation, a "clickable link" or HTML "HREF") of the cell-value itself. (Empty cells display the value "NONE" so as to still enable drilldown navigation.) When the user selects (clicks on) the link, the display forwards (typically) to an Edit form for the corresponding record in the appropriate underlying base-table, with the proper edit-field pre-selected (i.e., given the "focus"). In effect, the system auto-navigates to the same exact base-table Edit form, selected-record, and edit-field that the user could (theoretically) navigate to himself, manually, in order to alter the underlying datum that supplies the custom view
    5.6) The working context for this drilled-down Edit form is constrained by the same mechanisms that govern master/detail drilldowns (as described above) —that is, a stack-context filter is imposed on the edit session in order to prevent the user from changing the datum that links the base-table record to the custom view (note that this also requires a separate, explicit specification of the base-table as a "detail table" to the custom view); and if/when the user "commits" the drilled-down edit session (by pressing the "Update" button), she is automatically returned to the "parent" custom view
    5.7) A specification identifies the underlying (or "target") base-table; the (initial) base-table display-mode (typically, "Edit"); the custom-view column whose corresponding row-value contains the identifying key for the target base-table record; the custom-view column (if any) whose corresponding row-value contains the "constraining" (master/detail) key; and the base-table field-name which should be selected (i.e., the field that contains the target value, and should therefore receive the "focus")
    5.8) Specifications are associated as column-level annotations with their corresponding custom-view columns
    5.9) A special-case extension of the specification can be associated as a table-level annotation with the custom view itself (rather than one of its columns). In this context, the specification will modify the behavior of the leftmost-column "row label" links (which, in normal-table Browse-mode displays, link to Edit-mode displays for the corresponding table-records). A common use for such specifications is to support master/detail-style transitions to secondary Browse mode displays of records which "belong to" the selected custom-view record
    5.10) In the reference implementation, specifications are made via a special XML tag ("<customDrillDown>") which, in turn, contains sub tags indicating the target base-table ("<tableName>"), display-mode ("<mode>"), identifying-FK field within the custom view ("<keyColumn>"), constraining-context or master/detail key, if any ("<parentColumn>"), and target field ("<focusField>"), and is attached to the corresponding view-column as a "comment"

The exemplary embodiment also supports the specification and enforcement of both global and granular (by table and function) access rights and activity-stamping, according to a group-based (rather than hierarchical) permissions scheme, and based on table entries which themselves can be entered and maintained via the system:

1) In the reference implementation, six tables support these security features: PEOPLE, USERS, SECURITY_TABLE, SECURITY_GROUP, SECURITY_GROUP_USERS, and SECURITY_GROUP_TABLE:
   1.1) The PEOPLE table contains an Active_Flag field, which allows for "deactivation" of individuals without destroying existing RI links throughout the database. Every system user must appear in the PEOPLE table (among other reasons, to support full-name resolution when displaying usage-tracking fields through the UI), and if/when a user's PEOPLE.Active_Flag is turned off, the user is immediately blocked from all further system access
   1.2) The USERS table incorporates (among others) a Login_ID field, which is correlated against the system-user's operating-environment credentials. (In the reference implementation, this is the UID which has been authenticated and forwarded by the web server; alternatively, it could be the user's OS login.) When the system establishes a new user-session (upon the user's initial contact), it attempts this correlation to a valid USERS.Login_ID. If no correlation can be made, access to the system is denied; otherwise, the corresponding USERS.Users_Key value is henceforth associated with that user's session
   1.3) SECURITY_TABLE maintains a list of all security-mediated tables and custom views. (Alternatively, this list could be automatically derived from the system's data-model interrogation; the use of an explicit and hand-managed table supports the manual exclusion of "special" or "hidden" tables and/or views)
   1.4) SECURITY_GROUP supports the definition of functional security roles. In and of themselves, entries to the SECURITY_GROUP table are little more than descriptive names; their primary purpose is to serve as "connective conduits" between USERS and SECURITY_TABLEs. It is important to note (again) that SECURITY_GROUPs are non-hierarchical; that is, each group can be granted any mix of rights to any arbitrary set of tables, without respect to the rights of other groups. And USERS can be assigned to any number of SECURITY_GROUPs; When a user belongs to multiple groups, her aggregate rights comprise a superset of the rights for each of the groups to which she belongs
   1.5) SECURITY_GROUP_USERS simply effects many-to-many relationships between USERS and SECURITY_GROUPs, and is defined (via the methods described above) as a "detail" table to both of these
   1.6) Similarly, SECURITY_GROUP_TABLE supports many-to-many relationships between SECURITY_GROUPs and SECURITY_TABLEs (and is a "detail" table to both). Additionally, however, the SECURITY_GROUP_TABLE incorporates Boolean (true/false) columns which indicate permission for the related SECURITY_GROUP to (respectively) browse, add to, edit, or delete from the corresponding SECURITY_TABLE. This forms the nexus of access-rights control 2) All UI displays automatically adjust to the current user's access rights. In particular, the following navigational elements ("links", as defined in the reference implementation), appear or are suppressed according to the user's rights:
   2.1) Mode-navigation bar links 710 (browses/searches/add); here, suppressed links are entirely removed from the display, rather than simply "disabled" (or made "non-clickable", as is done for all other links, below)
   2.2) Record-edit links 706 (in the first column of Browse-mode displays)
   2.3) Drill-through cross-reference links (on the labels of Add/Edit/Search dropdown fields)

3) Drill-down master/detail links (on the labels of Edit-form master/detail summary-counts)

4) Note that custom views with custom-drilldown specifications are subject to "double" security mediation: If edit permission to the custom view itself is withheld for a given user, then all custom-drilldown links will also be disabled. But (even) if the custom-view edit permission is granted, the user must also have the necessary rights to support each particular drilldown (e.g., edit or browse permission on an underlying table) before the corresponding link will be enabled 5) Separately (and assuming the necessary access rights have been granted), all system add/edit activity can be time- and user-stamped at the table-record level (optionally, on a per-table basis). Security-stamping is completely automatic, and is governed (in the reference implementation) by the presence of four special columns within the table: Entered_By_Users_Key, Entry_Date, Modified_By_Users_Key, and Last_Modified_Date. If these columns exist, then any "add" event causes the current USERS.Users_Key (from the user's session) to be recorded in both the Entered_By_Users_Key and Modified_By_Users_Key columns, and the current system time to be stamped into both the Entry_Date and Last_Modified_Date columns. "Edit" events, of course, update only the Modified_By_Users_Key and Last_Modified_Date columns. Note further that when they exist in a table, these fields are visible only in Browse and Search displays; they are hidden (but automatically updated) from Add and Edit displays 6) Although not present in the reference implementation, the granularity of this model can be readily extended with both row- and column-level access mediation:
   6.1) ROW-LEVEL SECURITY allows for the individual rows (records) of any given table to be made visible or invisible (and, therefore, accessible or inaccessible) to a given user:
      6.1.1) In a sense, row-level security can be said to affect only "content" visibility, rather than "structural" visibility (as with other security axes); a row-level security filter impacts which particular table-entries are presented, but never which classes or types of data elements
      6.1.2) A specification thus identifies the filter condition (i.e., WHERE clause) that relates one or more table-columns to (some transformation/JOIN-sequence on) the current user. (Note that such "user relations" may optionally involve attributes of the particular user, and/or those of "security groups" to which the user belongs)
      6.1.3) Specifications are associated as table-level annotations with the actual underlying table
      6.1.4) Because there are no effects upon the structure or "shape" of the data, these filters can be "encapsulated", effectively, and introduced as a (logical)

"shim" layer between the raw back-end tables and the data-dictionary object model.

6.1.5) By exploiting the identical column structure of each such "shim view" to its underlying base-table, on the one hand, and to the "virtualized" schema view (as constructed during the interrogation phase) of that table, on the other, the rest of the system logic and infrastructure can be insulated from any awareness of (or sensitivity to) this mechanism 6.1.6) Application of the row-level filter consists of "surgical" modifications to the defining SQL for the corresponding Browse-mode view (see above), so as to incorporate the requisite additional WHERE clause (and any additional FROM-clause tables, utilizing the same view-integration and alias-merging logic already employed within the reference implementation in generating said view)

6.1.7) Function-oriented mediation (i.e., Browse/Edit/Add/Delete granularity) is supported via (optional) separate specifications (per table) for each function (and with a "default/override" hierarchy among these specifications—such that Browse rights obtain for editing, for instance, unless explicit Edit rights have been specified). The UI-generation logic then compares record-presence across the respective (resulting) views to resolve specific rendering and action decisions (i.e., is this record editable?)

6.2) COLUMN-LEVEL SECURITY allows user access to be governed on a field-by-field basis:

6.2.1) Specifications are analogous to those described in the reference implementation for table-level security (see the discussion of SECURITY_GROUP_TABLE, above), except that only "Browse" and "Edit" rights are meaningful on a per-column basis (that is, there is no way to "Add" or "Delete" only individual columns)

6.2.2) Column-level specifications are treated as "subtractive overrides" to table-level specifications, such that table-level specifications serve as "defaults" that can be further restricted—but not expanded—by column-level specifications 6.2.3) Application of column-level security to the Browse function consists of an additional "overlay" view which hides additional columns as necessary 6.2.4) Edit-function mediation is processed by the UI on a per-field basis, either (or both) during rendering (where display conventions utilize read-only fields, or otherwise signal non-editability via labeling conventions [such as italicized text]) and/or processing (where attempts to change non-editable fields are rejected, with an alert notification to the user)

Also incorporated into the exemplary embodiment are both generalized and special-case exception-handling mechanisms, with integrated session-recovery support:

1) The generalized exception-handling mechanism guarantees a controlled recovery from any unanticipated error condition. This mechanism:

1.1) Presents as much diagnostic information as possible, within a paradigm-consistent UI display, comprising:

1.1.1) A pass-through errortext from the underlying program-execution environment 1.1.2) A complete "(program call-) stack dump" indicating the suspended (and nested) program-function calls in effect at error-time 1.1.3) The entire current context-stack display 1.2) Permits user recovery either by:

1.2.1) Controlled reinitiation of a(n entirely) new session 1.2.2) Navigation through the context-stack display to a pre-error session context, thereby (generally) enabling the user to recover his session-in-progress (more-or-less) intact, vs. requiring a restart from scratch 2) Special-case exception-handling mechanisms are defined separately for certain types of system errors which are common or "normal" (such as authorization failures or session timeouts). In such cases, these "customized" exception-handlers can suppress unnecessary technical detail (which can be confusing or alienating to end-users and give the misimpression of software failure), and provide additional (end-user suitable) information specific to the user's particular error context. The reference implementation can identify and separately handle the following common exceptions:

2.1) SESSION-SEQUENCE ERRORS: In the reference implementation (which, again, is web-based), it is important that the system govern the "flow" or sequence of pages passed back and forth between the (web-) server and the client (web-browser); as a result, the system incorporates several mechanisms to track and enforce this flow (comprising back-button "defeat" logic, and incremental serialization of all URLs [such that the system always knows what serial number to "expect" along with the user's next page-submission]). If the user manages to violate this flow, either intentionally or inadvertently (perhaps by selecting a "favorite" or "bookmark", or by clicking multiple links on the same page before the server can respond), the system can detect this particular error, provide a detailed explanation of how and why it might have occurred, and (per above) allow the user to recover her session-in-progress without any loss of work 2.2) SECURITY VIOLATIONS: Generally, the system proactively prevents the user from attempting access to any authorized system modes or functions. However, in the (web-based) reference implementation, it is not impossible for the user to navigate to a situation where he might possibly attempt an illegal transition—or to manually adjust a URL so that it attempts such unauthorized access without triggering a session-sequence error (as described above). In these cases—and in the simpler case, when a user attempts access without any system rights whatsoever—the system provides a plain-English report of exactly what access rights the user has tried to violate 2.3) SESSION TIMEOUT: Because the system maintains a "user session" in which various context, sequence, and configuration information is tracked, and which (because it consumes system resources) can expire after a (configurable) period of disuse—and also because (in the web-based reference implementation) the dialog between client and server is "connectionless" (meaning that there can never be any automatic detection by the server that a user has "quit" or "broken" a connection)—it is entirely possible that a user may try to continue or resume a session which appears perfectly intact from his perspective (i.e., in his web-browser) but for which the system has discarded the corresponding user-session. In this case, a full session-reinitiation is still required but it can at least be delivered along with a meaningful explanation of what has occurred These special-case error handlers dovetail and integrate smoothly with the generalized exception handling facility, and share many of the same features (including, when available, the session-stack display). Within the reference implementation, these handlers are hard-coded, but they describe the basis of a subsystem which can be readily extended—abstractly and dynamically—in several ways:

2.4) Specific exceptions—and their corresponding, customized error displays—can be defined and administered via a central list (or table), and automatically detected (and their respective displays invoked) at runtime, within the framework of a generalized facility and without the need for custom programming 2.5) Information can be "mined" from the pass-through errortext—and, potentially, from the runtime environment as well—according to the nature of the particular error, and used (if appropriate) in the construction of dynamic error displays (via templates, for example)

2.6) Custom follow-on actions can be associated with specific errors, so that special-case recovery procedures can be specified. (For instance, a database-detected data-entry violation might cause a return to the previous data-entry form.) "Mined" runtime-environment information can also be used here to govern the behavior of said follow-on actions A generalized, extensible, and data-driven "pop-up help" facility is also included in the reference implementation. This facility allows for the specification of descriptive text which can be associated both with specific on-screen navigational elements, and with (any) individual schema elements (i.e., table-columns). When the user positions his mouse over a described object (or data-field) and pauses for a specified timeout interval, the system will flash a pop-up window (or "balloon") displaying the corresponding description. The system thereby becomes self-documenting with respect to both the UI paradigm itself, and the meaning of its data-fields. Within the reference implementation, the specifications are stored within back-end tables—so that they, too, may be administered via the system UI—although any of the above-described annotational methods could alternatively be used.

Except as noted, the detailed implementation of each of the foregoing capabilities is set forth in full in the accompanying source code, which represents the complete source code for a working version of the reference implementation. A full demonstration RDBMS schema upon which this system can operate has been provided, and accompanies this application and is incorporated herein by reference (see FIG. 5 and the CreateSchema.sql script).

Numerous extensions of the above-described scheme are of course possible:

1) Most importantly, while the reference implementation is in various instances custom-coded to the data-dictionary architecture of its particular underlying RDBMS (i.e., Oracle8i), the scheme is nevertheless readily converted to a "generic" (or "RDBMS-agnostic") architecture through the introduction of a platform-neutral "middleware" layer. (The DatabaseMetaData class within the Java 2 Platform Standard Edition v1.3.1 API Specification, for instance, is easily applied toward this end.) The claimed invention, therefore, is by no means limited to a specific RDBMS product 2) A set of mechanisms, rules, and methods may be provided through which each end-user can evolve (and manage) personalizations to the UI architecture (with persistent back-end storage and tracking by user and/or group)—including (but not limited to) preferred table-navigation hierarchies; UI "entry points" based on usage-frequency patterns; default (or most-recent) searches/filters for each back-end table; default "page size" for Browse-mode lists (adjusted for the particular user's screen resolution, for example); default sort-orders for each table; and default "Power Edit" and "Power Add" settings. Because user-tracking is already integrated (for security purposes), it is a simple matter to add the supporting tables and UI-application "hooks" to collect, store, and utilize such preference information 3) Expanded concurreny-control options are easily incorporated into the scheme. Many database-related systems offer a range of behaviors which extend from unfettered write-back of edited table-records (offering maximum system performance, at the cost of minimal overwrite protection), through competing-update detection with approval/abandonment of data overwrites (a blend of performance and protection, at the cost of added complexity), to full edit-record locking (offering maximum protection at the cost of performance); and while the reference implementation incorporates only the first of these behaviors, the others can certainly be added—along with a system-configuration mechanism for choosing among them—in a straightforward manner 4) A generalized journaling/auditing subsystem may also be integrated. Such a subsystem could, for instance, utilize database "triggers" to update a master table with a new tuple (comprising table-name, record-key, column-name, old-value, new-value, user-key, and timestamp) whenever any table-record is modified. Such a mechanism would (at a cost in system performance, of course) permit complete backtracking/"rollback" to previous database states, and guarantee the ability to recover from any rogue data modifications (whether accidental or malicious) and identify the actors 5) A further extension to journaling/auditing support is the ability to require a user to explain his justification for (only) certain data-field changes, and then either record that explanation to the system journal or audit log (along with the other tuple information), or (possibly) roll-back the transaction (if the user declines to supply an explanation). Such a facility could be implemented with additional text-entry fields integrated into the primary Edit-mode display, or alternatively, with "pop-up window" logic (which, within World Wide Web presentation, could comprise additional browser windows or DHTML "simulated" pop-ups, for instance). The specification of which data-fields should require such justification would be considered a "business rule", and could be implemented via any of the annotational methods described elsewhere in this document. Such specifications could also be assigned at various levels of global vs. local "scoping" (i.e., perhaps automatically for all date fields, or only for specifically assigned text fields)

6) Within the current (World Wide Web-based) reference implementation, it is possible to select certain navigational links (for example, from the context-stack display or the mode-navigation bar) which will abandon the user's current screen display and, with it, any data entries or modifications which may have been made but not yet committed to the database. Although this behavior is by design, it may be desirable to add a pop-up "warning" mechanism for such cases, so as to alert the user to the imminent loss of data (and to provide for aborting said action). Such a mechanism could utilize client-side Javascript logic to:

6.1) Set an internal flag each (and every) time any on-screen change is made
6.2) Invoke a "cover function", each time a screen-abandoning link is clicked, which will display a confirmation dialog (pop-up window) if the "change flag" has been set (or, if the flag is not set, will simply execute the link)
6.3) Proceed with the link action (and abandon the current screen) only if the user supplies explicit confirmation 7) A variety of extensions can be made to the Browse-mode display paradigm, comprising:
   7.1) The ability to sort Browse-mode listings (by any combination of columns) by clicking on the corresponding column-headings. Successive clicks on the same column-heading would invert the sort-order for that column; successive clicks on different columns would effectively produce "ordered sorting" (where the most-recently clicked column is the "primary" sort, and each successively less-recently clicked column is the next "subordinate" sort)
   7.2) Support for "random-access" page navigation, wherein the table-header (which, in the reference implementation, allows direct entry only for the number of rows per page) would also allow direct entry of the desired page number. For instance, a Browse-mode display whose table-header said "PAGE 5 OF 12 (TOTALING 300 RECORDS AT 25 ROWS PER PAGE)" would thus render both the "5" and the "25" as text-entry fields, so that in addition to resizing the page length (by changing the rows-per-page entry), the user could also "zoom" to a specific page just by changing the page-number entry. This would eliminate the need to scroll, page-by-page, from either the top or bottom of the result-set
   7.3) Similarly, another form of random-access page navigation could be introduced via the addition of phone-book-style "tab" links (for instance, "A B C D . . . ") such that clicking a particular link would jump to the first record in the result-set whose corresponding-column entry began with that character:
      7.3.1) Said "corresponding column" could be (initially) determined according to similar default-processing rules to those embodied in the reference implementation for FK display-name resolution (for instance, the first column whose name ends in "_NAME", if any)
      7.3.2) Alternatively, the corresponding column could simply track the current (primary) sort-order column (as described above), if implemented
      7.3.3) Yet another option would be to allow explicit designation of the corresponding column via an associated dropdown-list of all table-columns
      7.3.4) However selected, any change in the corresponding column would then automatically regenerate the tab list, according to the range of actual (sorted) leading characters appearing within that column. In this way, numeric tabs would appear for a "social-security number" column, vs. alphabetic tabs for a "last name" column 8) A variety of extensions can be made to the Search-mode display paradigm, comprising:
   8.1) In the reference implementation, field-value filters are applied by default as prefix matches (i.e., as "starts with" comparisons), with optional support for explicit relational-operator prefixing (comprising <, <=, >=, >, and exactly =). Relational options could be further extended to support ranges ("between x and y"), NULL/NOT-NULL conditions, and other arbitrarily complex transformations on the corresponding field-values (such as field-value substitution into a complex string-manipulation or arithmetic expression)
   8.2) The reference-implementation Search-form paradigm comprises a single set of fields (corresponding to the underlying table-columns), where any entered filter-values (for the respective columns) are logically "AND"ed together. A more general and flexible search facility could:
      8.2.1) Allow toggling between logical "AND" and "OR" combination of a search form's filter-values
      8.2.2) Allow "stacking" of multiple search-form copies, such that the fields in each individual (sub-) form comprise a parenthetical filter "phrase", which is "AND"ed or "OR"ed together (selectably, as above) with the parenthetical phrases for other sub-forms 9) A variety of extensions can be made to the Edit-mode and Add-mode display paradigms, comprising:
   9.1) In the reference implementation, violations of any extant "unique" constraints on underlying table-columns are intercepted and reported only upon violation, and then only via the generalized exception-handling mechanism (in response to a back-end RDBMS exception "throw"). Alternatively:
      9.1.1) Special-case exception handling (as described above) could still exploit the thrown back-end exception, but provide clearer diagnostics (i.e., exactly— and only—the field-value that has violated a "unique" constraint), and then restore the data-entry form with the problem-field contents pre-selected; or
      9.1.2) Employ separate database-interrogation logic for each "unique"—constrained field, so as to "pre-qualify" data-entries—and, thereby, allow for "in-place" duplicate-entry detection and signaling (without ever leaving the data-entry form, and without invoking formal exception-handling mechanisms)
   9.2) Similarly—but more generally—violations of any arbitrary "check" constraints (such as imposed value-ranges, or required satisfaction of algebraic expressions) are intercepted and reported only upon violation within the back-end RDMBS. Instead, such constraints could be extracted from the back-end and "projected" into the client-side UI display (for the reference implementation, via custom-generated Javascript routines). Doing so would allow the detection and signaling of constraint violations immediately upon data-entry, without (additional) contact with the back-end RDBMS (and this, in turn, would obviate the need for any display/session recovery logic)
   9.3) When adding new records, the reference-implementation Add-form logic does not "initialize" fields for which the back-end defines "default" values—that is, although the underlying table-column will (properly) be set to its default value if the corresponding Add-form field is not explicitly set, the user has no indication (prior to committing the new record) of that default value. Instead, the form could automatically pre-populate the appropriate fields with their corresponding default values (as determined through interrogation of the underlying column-constraints)

10) In certain situations, it may be desirable during schema interrogation to "deduce" relational interdependencies between tables where no explicit referential-integrity constraints have been defined. In such cases, it is possible to further compare field-names and associated attributes across tables, so as to identify columns which (for instance) are identically named, and (only) one of which is the primary key for its respective table. Under these conditions, it could (optionally) be assumed that the other-table column is a foreign-key cross-reference to the first column. Note that, in so doing, the UI paradigm would then enforce referential integrity for this relationship, even absent the explicit back-end constraint.

11) Additional mechanisms for further customizing or adapting the baseline UI paradigm and software to meet non-standard and/or special requirements ("business rules") are also indicated, such as:

11.1) Specification and enforcement of correlations, interactions, or interdependencies between disparate data-elements (either within or across base-tables), comprising:

11.1.1) "Context-sensitive dropdown controls", whose dropdown-lists are filtered (or "constrained") based on user-defined relations to superior stack-contexts (other than direct master/detail constraints, which already are included as a part of the core UI paradigm). Such controls could be specified via any of the aforementioned annotational methods. Specifications would "attach" to the subordinate-level table-column (i.e., the column whose dropdowns should be "filtered" or "sensitized"), and would consist of tuples indicating (at least) the superior-level table, relevant table-column, and a relation between the superior and subordinate columns. Each tuple could (optionally) be further qualified so as to "scope" the relation—for instance, so that the filter should consider only so many levels above the current stack-context, or that the filter only applies if certain other tables also do (or do not) appear in intervening levels—and possibly, even, only in a specific sequence. It would also, of course, be further possible to assign multiple such "sensitivities" to the same target-column. Consider, as an example, a project-management schema, in which both equipment and technicians are assigned to projects; technicians have specific equipment certifications; and schedules apply both to projects and to technicians. In assigning new technicians to a given project, one may wish to automatically "pre-qualify" the dropdown-list of available technicians such that it only includes technicians who are certified on (at least some of) the project's equipment, and who also are currently available during the lifetime of the project 11.1.2) "Interactive dropdown controls" are similar, but effect relations between multiple elements within a single mode-display, rather than across context-stack levels. Using the above example, a single many-to-many table might connect technicians to projects; if the table is accessed directly (that is, at the topmost stack-level, rather than by drilling-down to it from the associated project record), then each time the "project"-dropdown is altered, the "technician" dropdown-list would be automatically regenerated according to the above-described criteria. Again, (potentially multiple) specifications per target-column would resemble those for context-sensitive dropdowns, except (of course) that the "superior-level table" and "scoping extensions" would be irrelevant here. Note that although these two dropdown-types are similar—and that, in some cases (namely, where context-sensitive dropdowns utilize only direct drill-down relations), the former could be simulated with the latter—each offers (or lacks) functionality which makes it more suitable for certain types of use 11.1.3) "Context-sensitive and interactive column-level security" would allow data-entry fields to "lock" (or unlock) according to values of (and changes in) other data-fields (for instance, once a project has reached a certain "status" designation). Again, specifications could be effected via any of the aforementioned annotational methods, would "attach" to the "target" table-column (i.e., the column whose security is being mediated), and would resemble those for context-sensitive and interactive dropdowns, respectively, except that the "relation" specification would be supplanted by a Boolean evaluation on the controlling data-field. Note that this same mechanism is easily generalized further to support the toggling of arbitrary column-level constraints (by adding a "constraint definition" field to the specification tuple).

11.2) Triggering of custom software subprocesses—on the front- and/or back-end—under specified data conditions and/or at specified system-transition events, such as the "data-change justification" pop-up mechanism described above in detail 12) Various mechanisms for enhancing web-client (or client/server) user-interface performance and functionality can be introduced, comprising:

12.1) "Buffered" dropdown controls, which maintain their own separate connections to the back-end RDBMS, and allow the screen display to be rendered before their dropdown lists have been completely populated. Such dropdowns can further be made "typeable", so that a user could begin typing a desired value and "home-in" on matching list-entries; in this case, list-retrieval from the RDBMS can by dynamically revised to retrieve a successively smaller (i.e., closer-matching) result-set.

12.2) "Caching" or "sharing" of duplicate dropdown lists, when such lists are lengthy and their retrieval significantly impacts front-end performance and network traffic. For instance, the user-stamping fields described above (Entered_By_Users_Key and Modified_By_Users_Key) generally appear together within the same tables, always share identical dropdown lists, and can (potentially) grow quite long over time; logic to retrieve the shared list once from the RDBMS—rather than twice—for use within both dropdown controls can effect meaningful gains in system responsiveness.

12.3) "Back-link" support, to provide functionality similar to that of the standard web-browser "back" button, but without violating the integrity of the user-session or the hierarchical context stack.

12.4) "Bookmarking" support, to provide compatibility with standard web-browser "bookmarks" or "favorites" functions: By clicking a special button or link, users can re-render their current display with a re-formed URL, which completely describes the current user-session and context-stack (or, alternatively, a limited and "cauterized" subset of same) so as to allow bookmark-based return to an equivalent display at a later date.

13) Although the exemplary embodiment comprises a stand-alone application which interacts (on a client/server basis) with a back-end RDBMS, it may in some circumstances become desirable instead to integrate some or all of the features of the exemplary embodiment directly into said RDBMS product (or a tightly-coupled extension to or utility for same). Of course, any such alternative embodiment would still conform to the principles of the described invention.

Finally, the implementation described herein could be further varied in numerous respects, but still be within the principles herein illustrated. For instance, while the reference implementation uses a World Wide Web presentation mechanism, a more conventional client-server or native-GUI system could instead be delivered. Also, while the reference implementation depends on adherence to certain structural requirements and naming conventions in the design of any underlying or "target" schema (comprising the use of a single unique, auto-generated primary-key field for every table; the existence of a supporting "sequence" [i.e., reference-implementation RDBMS mechanism for auto-generating primary keys] for every table, and that each sequence be named for its corresponding table plus a "_SEQ" suffix; the reservation of "_VIEW"-suffixed names across the entire table/view namespace [for use by auto-generated system views]; the use of certain column-name suffixes as alternatives to or substitutes for direct datatype- or other attribute-driven discovery [such as a "_FLAG" suffix to connote "yes/no" or "binary" fields, or a "_DATE" suffix to indicate time/date data]; and a specific complement of security-related tables, as described below), such requirements and conventions can be easily supplanted, circumvented, or removed, and do not in any way define or limit the scope of the invention.

RUN-TIME ENVIRONMENT FOR THE SCHEMALIVE REFERENCE IMPLEMENTATION

Overview

The following is specific to the Schemalive Reference Implementation (SRI). The SRI is a web application which conforms to Sun Microsystems' PEE (Java 2 Enterprise Edition) Platform, which in turn incorporates the JSP (Java Server Pages) 1.2, Servlet 2.3, and JDBC (Java Database Connectivity) 2.0 specifications on which the SRI explicitly depends. More information on the structure of web applications can be found at jcp.org/aboutJava/communityprocess/first/jsr053/index.html. The web application can be placed in any J2EE-compliant container (i.e., application-server software), including such products as BEA WebLogic, Macromedia JRun, and Apache Tomcat.

Directory Structure

A root directory named Schemalive is required; the system's JSP files and static content (i.e., images) are located in this directory. A subdirectory Schemalive/WEB-INF is also required, and must contain a file named web.xml, which is the deployment descriptor (see below) for the application. Supporting classes for the JSP are located in a subdirectory Schemalive/WEB-INF/classes. The web.xml references the application's custom tag libraries (see below) through tag library descriptor files. These XML descriptors are located in a subdirectory Schemalive/WEB-INF/taglib, and have a .tld ile extension. Following is a tree diagram for the SRI directory structure:

```
+Schemalive
    -AddEditForm.jsp
    -BalloonHelp.jsp
    -Browse.jsp
    -DataDictionary.jsp
    -DoAddEdit.jsp
```

-continued

```
    -DoViewGenerator.jsp
    -Error500.jsp
    -ExpiredSession.jsp
    -OutOfSequence.jsp
    -showSession.jsp
    +common
        -EmptyParamCheck.jsp
        -EntryPoints.jsp
        -GlobalFooter.jsp
        -GlobalHeaderHTML.jsp
        -GlobalHeaderJavascript.jsp
        -GlobalHeaderVARS.jsp
    +images
        -logo.gif
        -logo-width.gif
    +WEB-INF
        -web.xml
        +classes
            -Connection.properties
            +common
                -Debug-class
            +dbUtils
                -CustomCaps.class
                -CustomDrillDown.class
                -CustomDropDown.class
                -CustomDropDownComponent.class
                -DataDictionary.class
                -DataDictionaryServlet.class
                -DataDictionaryTD.class
                -MasterDetail.class
                -MasterDetailServlet.class
                -SQLUtil.class
                -TableDescriptor.class
                -ViewGenerator.class
            +HTMLUtils
                -Balloon.class
                -BalloonHelp.class
                -TableDescriptorDisplay.class
            +sessionUtils
                -ManageSession.class
                -StackElement.class
                -StackTag.class
                -StackTagExtraInfo.class
            +tagUtils
                -ViewTag.class
                -ViewTagExtraInfo.class
        +taglib
            -stack.tld
            -view.tld
```

Deployment Descriptor

The deployment descriptor (web.xml) is an XML (eXtensible Markup Language) file which contains all pertinent configuration information for running the web application. The SRI relies on the following portions of the deployment descriptor: servlet definitions; tag library references; and security constraints. The XML parsing rules for this file are contained in a DTD (Document Type Definition) which can be found at java.sun.com/j2ee/dtds/web-app.sub.-2.sub.-2.dtd. Refer to the JSP specification (above) for more information on deployment descriptors.

Servlet Definitions

The SRI incorporates a number of utility servlets (server-side Java applets which conform to the CGI specification). Servlets are identified in a <servlet> section within web.xml. A name is assigned to each servlet (which is used in creating a servlet mapping, described below), and this name is equated with the appropriate class-file name (specified relative to the Schemalive/WEB-INF/classes subdirectory). For example, a given servlet might be identified as follows:

```
<servlet>
    <servlet-name>DataDictionaryServlet</servlet-name>
    <servlet-class>
        dbUtils.DataDictionaryServlet
    </servlet-name>
</servlet>
```

By this definition, the following path should exist:

Schemalive/WEB-INF/classes/dbUtils/DataDiction-
aryServlet.class

Note that the <servlet-name> does not represent the actual URL (Uniform Resource Locator) for the servlet; a separate mapping from <servlet-name> to URL occurs in a <servlet-mapping> section:

```
<servlet-mapping>
    <servlet-name>DataDictionaryServlet</servlet-name>
    <url-pattern>DataDictionaryServlet</servlet-name>
</servlet-mapping>
```

By this definition (and assuming the root directory is Schemalive), the URL:

<host name>:<port>/Schemalive/DataDictionary-
Servlet would cause the J2EE container to execute the code found in Schemalive/WEB-INF/classes/dbUtils/DataDiction-
aryServlet.class Tag Library References A tag library contains Java code that implements custom HTML tags for use within JSPs. When the JSP engine encounters such tags, it makes corresponding Java calls into the tag libraries. For more information, refer to the JSP specification.

A <taglib> section within web.xml maps a URI (as used from within the JSP) to a tag library descriptor (which contains information about the associated class name, method calls, tag parameters). Below is a sample <taglib> section:

```
<taglib>
    <taglib-uri>view</taglib-uri>
    <taglib-location>WEB-INF/taglib/view.tld</taglib-location>
</taglib>
```

See java.sun.com/j2ee/dtds/web-jsptaglib.sub.--1.sub.--1.dtd for the XML DTD for taglib.

The following is the contents of Schemalive/WEB-INF/taglib/view.tld:

```
<taglib>
    <tlibversion>1.0</tlibversion>
    <jspversion>1.2</jspversion>
    <tag>
        <name>setVars</name>
        <tagclass>tagUtils.ViewTag</tagclass>
        <teiclass>tagUtils.ViewTagExtraInfo</teiclass>
        <bodycontent>JSP</bodycontent>
        <attribute>
            <name>defaultEntryPoint</name>
            <required>true</required>
            <rtexprvalue>true</rtexprvalue>
        </attribute>
```

-continued

```
        <attribute>
            <name>dbName</name>
            <required>true</required>
            <rtexprvalue>true</rtexprvalue>
        </attribute>
        <attribute>
            <name>dbConn</name>
            <required>true</required>
            <rtexprvalue>true</rtexprvalue>
        </attribute>
    </tag>
</taglib>
```

The important parts are the <name>, <tagclass>, and <attribute> tags. The classes referenced in <taglclass> must lie along the J2EE-container's CLASSPATH (note that the Schemalive/WEB-INF/classes directory is automatically included in the CLASSPATH). Combined with <taglib-uri>, there is enough information now to use the custom tag within a JSP. One such invocation would look like this:

```
<view:setVars defaultEntryPoint="<%= entryPoints[0] %>"
    dbName="
        <%= dbName %>" dbConn="<%= dbConnName %>">
</view:setVars>
```

Notice the use of <taglib-uri>, <name>, and <attributes> within the custom tag. Also, it is perfectly legal to use JSP inline variables, such as <%=entryPoints[0]%>, as the example shows.

Security Constraints web.xml contains information about how the SRI web application should handle security. This includes specifying what to secure, and how—as well as who can access the application (which is governed by the role names to which the user is assigned). The assignment of users to roles, however, is the responsibility of the J2EE container, and is handled differently by the different containers. The <security-constraint> section controls what is protected, and establishes the corresponding role. name, while the <login-config> section establishes the user-authentication method. Here is a sample:

```
<security-constraint>
    <web-resource-collection>
        <web-resource-name>Schemalive</web-resource-name>
        <url-pattern>/*</url-pattern>
        <http-method>GET</http-method>
        <http-method>POST</http-method>
    </web-resource-collection>
    <auth-constraint>
        <role-name>Schemalive</role-name>
    </auth-constraint>
</security-constraint>
<login-config>
    <auth-method>BASIC</auth-method>
    <realm-name>Schemalive</realm-name>
</login-config>
```

Within the <web-resource-collection> section, the <url-pattern> tag protects the entire application (i.e., "/*") for the GET and POST methods. The <auth-constraint> tag references a role named Schemalive; somewhere within the container's configuration, this role is defined and a set of userids and passwords associated with it. The 5<login-config> section establishes BASIC as the authentication method; this is what will cause the userid/password prompt to pop-up when first accessing the site.

Connection Pooling

The SRI accomplishes database connectivity through the use of connection pooling, as defined in the JDBC 2.0 specification. (For documentation, see java.sun.com/j2se/1.3/docs/guide/jdbc/index.html.)

In connection pooling, a specified number of connections are pre-made to the underlying RDBMS (Oracle, in the reference implementation) at container start-up time. Connections are "borrowed"—that is, checked in and out of this pool—by program threads on an as-needed basis, without being opened, initialized, closed each time. This provides a dramatic improvement in the application's performance. The mechanics of the connection pool are largely hidden from the software; the standard API calls for opening and closing connections are used, although in actuality the corresponding connections are merely being checked in and out of the pool. The particular interfaces used for connection pooling can be found in the API documentation at java.sun.com/products/jdbc/jdbc20.stdext.javadoc/. (The pertinent classes are javax.sql.ConnectionPoolDataSource and javax.sql.PooledConnection.)

A static handle to the connection pool is managed through the dbUtils.SQLUtil class, which is implemented in Schemalive/WEB-INF/classes/dbUtils/SQLUtil.java. This class obtains handles to pool connections using the Oracle JDBC 2.0 driver interface; the Javadocs for this API can be found at download.oracle.com.otn/utilities_drivers/jdbc/817/javadoc.tar.

A file named Schemalive/WEB-INF/classes/Connection.properties will need to be customized for each particular installation. JDBCURL contains a (properly formatted) string to reference the Oracle database-server instance. The SRI currently references the Type 2 JDBC driver, and the corresponding URL is in the formal jdbc.oracle:ocl8:@<tns name>. The user and pwd properties refer to the credentials the SRI will use for database access; if/when these values need to change, the server must be restarted in order for those changes to take effect.

Run-Time Maintenance

To enhance system performance (by reducing the need for real-time database qtleries), the SRI maintains two caches of information.

The first is called the DataDictionary, and contains all of the metadata derived by interrogating the schema (comprising table and column names, column datatypes and sizes, referential-integrity constraints, check constraints, and view definitions). The second is called BalloonHelp, and contains all of the help information specified in the base-tables HELP_OBJECT and HELP_SCHEMA.

When changes are made to the schema structure, or to the records in the help tables, these cached objects must (variously) be refreshed. This can be done dynamically, without having to restart the container.

The DataDictionary is rebuilt by referencing the JSP DataDictionary.jsp. There are three options when rebuilding the DataDictionary: Only, Views (with check), and Views (without check). The "Only" option simply rebuilds the DataDictionary object (i.e., re-interrogates the database) without rebuilding any (system-generated) views. The other two modes regenerate these views on the fly; the "with check" mode checks to see if a given view (for a corresponding table) already exists, and rebuilds the view only if it is not found. The "without check" option does a brute-force rebuild of all system-generated views, regardless of whether or not they are already defined.

Note that while the DataDictionary is being rebuilt (which can be a lengthy process, depending on the size of the schema), users will be blocked from accessing the application.

BalloonHelp is rebuilt by referencing the JSP BalloonHelp.jsp. The current contents of the BalloonHelp object are displayed along with a link to rebuild. When the link is clicked, the cached object is refreshed from the base-tables.

Changes that are stored to these cached objects are immediately reflected within the application.

Because of its adherence to various open-standard specifications, the SRI is not dependent on anyone container, but rather, can operate in any J2EE compliant container. The only customization that should be required to run the SRI in a particular environment are the variables (mentioned above and) defined within the Schemalive/WEB-INF/classes/dbUtils/SQLUtil.java file.

While a number of embodiments have been described in detail, it will be apparent to those skilled in the art that the principles of the invention are realizable by other implementations, structures, and configurations without departing from the scope and spirit of the invention, as defined in the appended claims.

We claim:

1. A method for displaying, within a user interface operating under control of a processor, an enhanced representation of data from a relational database, the relational database comprising machine-readable data representing a plurality of tables, constraints, and relationships and also operating under control of a processor, wherein the plurality of tables comprises a primary table and a foreign table, wherein each one of the primary table and the foreign table comprises at least one row, and wherein each row comprises a plurality of columns, the method comprising:

using a processor to automatically construct a representation of data from a row of the primary table (primary-table row) by:

using a processor to identify a foreign key (FK) value in an FK column in the primary-table row, wherein the FK column references the foreign table;

using a processor to locate a row in the foreign table (foreign-table row) whose primary key (PK) value matches the identified FK value;

using a processor to select a value from the foreign-table row other than the PK value based on at least one of the following attributes of the column in the foreign table that contains the selected value:

column name;

column datatype;

at least one column constraint; or column position within the foreign table;

using a processor to derive a description of the foreign-table row using the selected value; and using a processor to augment or supplant the FK value with the description in constructing the representation; and using a processor to display the constructed representation.

2. The method of claim 1, further comprising allowing, in the machine representation of the tables within the database, for explicit specification of instructions to derive the description of the foreign-table row.

3. The method of claim 2, wherein the explicit specification can optionally supplant the default derivation as determined in accordance with claim 1.

4. The method of claim 3, further comprising the scoping of explicit specifications, so as to enable both database-wide (global) and primary-table specific (local) use of the explicit specification.

5. A non-transitory machine-readable medium, on which there has been recorded machine-readable code for a program executable on a processor, said program comprising routines for displaying, within a user interface operating under control of a processor, an enhanced representation of data from a relational database, the relational database comprising machine-readable data representing a plurality of tables, constraints, and relationships and also operating under control of a processor, wherein the plurality of tables comprises a primary table and a foreign table, wherein each one of the primary table and the foreign table comprises at least one row, and wherein each row comprises a plurality of columns, the routines comprising:
- a routine to automatically construct a representation of data from a row of the primary table (primary-table row) by:
  - a routine to identify a foreign key (FK) value in an FK column in the primary-table row, wherein the FK column references the foreign table;
  - a routine to locate a row in the foreign table (foreign-table row) whose primary key (PK) value matches the identified FK value;
  - a routine to select a value from the foreign-table row other than the PK value based on at least one of the following attributes of the column in the foreign table that contains the selected value:
    - column name;
    - column datatype;
    - at least one column constraint; or
    - column position within the foreign table;
  - a routine to derive a description of the foreign-table row using the selected value; and
  - a routine to augment or supplant the FK value with the description in constructing the representation; and
- a routine to display the constructed representation.

6. The non-transitory machine-readable medium of claim 5, further comprising a routine for allowing, in the machine representation of the tables within the database, for explicit specification of instructions to derive the description of the foreign-table row.

7. The non-transitory machine-readable medium of claim 6, wherein the explicit specification can optionally supplant the default derivation as determined in accordance with claim 5.

8. The non-transitory machine-readable medium of claim 6, further comprising a routine for the scoping of explicit specifications, so as to enable both database-wide (global) and primary-table specific (local) use of the explicit specification.

9. The method of claim 1, wherein the derivation of the description is based on at least one of the following attributes of the foreign table:
- column datatypes;
- column names;
- column constraints; and
- the order of columns.

10. The method of claim 1, wherein the derivation of the description is based on the column datatypes within the foreign table.

11. The method of claim 1, wherein the derivation of the description is based on the column names within the foreign table.

12. The method of claim 1, wherein the derivation of the description is based on the column constraints within the foreign table.

13. The method of claim 1, wherein the derivation of the description is based on the order of columns within the foreign table.

14. The method of claim 1, wherein the derivation of the description comprises:
- identifying an FK value in an FK column in the located foreign-table row, wherein the FK column in the located foreign-table row corresponds to a third table of the plurality of tables;
- locating a row in the third table (third-table row) whose PK value matches the identified FK value in the located foreign-table row; and
- using at least one value from the third-table row other than the PK value to derive the description.

15. The method of claim 2, wherein the derivation of the description comprises:
- specifying an FK value in an FK column in the located foreign-table row, wherein the FK column in the located foreign-table row corresponds to a third table of the plurality of tables;
- locating a row in the third table (third-table row) whose PK value matches the specified FK value in the located foreign-table row; and
- using at least one value from the third-table row other than the PK value to derive the description.

16. The non-transitory machine-readable medium of claim 6, wherein the derivation of the description is based on at least one of the following attributes of the foreign table:
- column datatypes;
- column names;
- column constraints; and
- the order of columns.

17. The non-transitory machine-readable medium of claim 6, wherein the derivation of the description is based on the column datatypes within the foreign table.

18. The non-transitory machine-readable medium of claim 6, wherein the derivation of the description is based on the column names within the foreign table.

19. The non-transitory machine-readable medium of claim 6, wherein the derivation of the description is based on the column constraints within the foreign table.

20. The non-transitory machine-readable medium of claim 6, wherein the derivation of the description is based on the order of columns within the foreign table.

21. The non-transitory machine-readable medium of claim 6, wherein the derivation of the description comprises:
- identifying an FK value in an FK column in the located foreign-table row, wherein the FK column in the located foreign-table row corresponds to a third table of the plurality of tables;
- locating a row in the third table (third-table row) whose PK value matches the identified FK value in the located foreign-table row; and
- using at least one value from the third-table row other than the PK value to derive the description.

22. The non-transitory machine-readable medium of claim 7, wherein the derivation of the description comprises:
- specifying an FK value in an FK column in the located foreign-table row, wherein the FK column in the located foreign-table row corresponds to a third table of the plurality of tables;
- locating a row in the third table (third-table row) whose PK value matches the specified FK value in the located foreign-table row; and
- using at least one value from the third-table row other than the PK value to derive the description.

* * * * *

UNITED STATES PATENT AND TRADEMARK OFFICE
CERTIFICATE OF CORRECTION

PATENT NO. : 10,025,801 B2
APPLICATION NO. : 14/324414
DATED : July 17, 2018
INVENTOR(S) : Michael Philip Kaufman et al.

Page 1 of 2

It is certified that error appears in the above-identified patent and that said Letters Patent is hereby corrected as shown below:

In the Claims

In Column 37, Lines 47-53, Claim 9, delete "is based on at least one of the following attributes of the foreign table: column datatypes; column names; column constraints; and the order of columns" and insert -- uses the selected value and at least one other value from the foreign-table row --, therefor.

In Column 37, Lines 54-56, Claim 10, delete "the derivation of the description is based on the column datatypes within the foreign table" and insert -- the value is selected based at least in part on the column name of the column in the foreign table that contains the selected value --, therefor.

In Column 37, Lines 57-59, Claim 11, delete "the derivation of the description is based on the column names within the foreign table" and insert -- the value is selected based at least in part on the column datatype of the column in the foreign table that contains the selected value --, therefor.

In Column 37, Lines 60-62, Claim 12, delete "the derivation of the description is based on the column constraints within the foreign table" and insert -- the value is selected based at least in part on at least one column constraint of the column in the foreign table that contains the selected value --, therefor.

In Column 37, Lines 63-65, Claim 13, delete "the derivation of the description is based on the order of columns within the foreign table" and insert -- the value is selected based at least in part on the column position within the foreign table of the column in the foreign table that contains the selected value --, therefor.

In Column 38, Line 3, Claim 14, delete "corresponds to" and insert -- references --, therefor.

In Column 38, Line 10, Claim 15, delete "claim 2" and insert -- claim 3 --, therefor.

In Column 38, Line 15, Claim 15, delete "corresponds to" and insert -- references --, therefor.

In Column 38, Line 23, Claim 16, delete "claim 6" and insert -- claim 5 --, therefor.

Signed and Sealed this
Twenty-seventh Day of October, 2020

Andrei Iancu
*Director of the United States Patent and Trademark Office*

CERTIFICATE OF CORRECTION (continued)
U.S. Pat. No. 10,025,801 B2

In Column 38, Lines 23-29, Claim 16, delete "is based on at least one of the following attributes of the foreign table: column datatypes; column names; column constraints; and the order of columns" and insert -- uses the selected value and at least one other value from the foreign-table row --, therefor.

In Column 38, Line 31, Claim 17, delete "claim 6" and insert -- claim 5 --, therefor.

In Column 38, Lines 31-32, Claim 17, delete "the derivation of the description is based on the column datatypes within the foreign table" and insert -- the value is selected based at least in part on the column name of the column in the foreign table that contains the selected value --, therefor.

In Column 38, Line 35, Claim 18, delete "claim 6" and insert -- claim 5 --, therefor.

In Column 38, Lines 35-36, Claim 18, delete "the derivation of the description is based on the column names within the foreign table" and insert -- the value is selected based at least in part on the column datatype of the column in the foreign table that contains the selected value --, therefor.

In Column 38, Line 38, Claim 19, delete "claim 6" and insert -- claim 5 --, therefor.

In Column 38, Lines 38-39, Claim 19, delete "the derivation of the description is based on the column constraints within the foreign table" and insert -- the value is selected based at least in part on at least one column constraint of the column in the foreign table that contains the selected value --, therefor.

In Column 38, Line 41, Claim 20, delete "claim 6" and insert -- claim 5 --, therefor.

In Column 38, Lines 41-42, Claim 20, delete "the derivation of the description is based on the order of columns within the foreign table" and insert -- the value is selected based at least in part on the column position within the foreign table of the column in the foreign table that contains the selected value --, therefor.

In Column 38, Line 44, Claim 21, delete "claim 6" and insert -- claim 5 --, therefor.

In Column 38, Line 47, Claim 21, delete "corresponds to" and insert -- references --, therefor.

In Column 38, Line 59, Claim 22, delete "corresponds to" and insert -- references --, therefor.